(12) United States Patent
Altarkawi et al.

(10) Patent No.: US 12,129,666 B2
(45) Date of Patent: Oct. 29, 2024

(54) CUSTOM DECORATIVE ARTICLES AND SYSTEMS, APPARATUS, AND METHOD FOR PROVIDING THE SAME

(71) Applicant: SHAW INDUSTRIES GROUP, INC., Dalton, GA (US)

(72) Inventors: Jacob Daniel Altarkawi, Cartersville, GA (US); Thomas Odum, Tunnel Hill, GA (US); Katelyn Marianetti, Smyrna, GA (US); Anthony Patrick Raymond Hohol, Rocky Face, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/569,884

(22) PCT Filed: Jun. 6, 2023

(86) PCT No.: PCT/US2023/024580
§ 371 (c)(1),
(2) Date: Dec. 13, 2023

(87) PCT Pub. No.: WO2023/239722
PCT Pub. Date: Dec. 14, 2023

(65) Prior Publication Data
US 2024/0263462 A1    Aug. 8, 2024

Related U.S. Application Data

(60) Provisional application No. 63/349,444, filed on Jun. 6, 2022, provisional application No. 63/423,305, filed on Nov. 7, 2022.

(51) Int. Cl.
*E04F 19/04* (2006.01)
(52) U.S. Cl.
CPC .... *E04F 19/045* (2013.01); *E04F 2019/0422* (2013.01)
(58) Field of Classification Search
CPC .......... G01B 21/20; E04F 21/04; E04F 21/20; E04F 19/045
USPC ........................................................ 702/167
See application file for complete search history.

(56) References Cited

U.S. PATENT DOCUMENTS

| 2,776,493 A | 1/1957 | Jerand |
| 2,795,854 A | 6/1957 | Perkal |
| 8,868,375 B1 | 10/2014 | Christian |
| 2019/0309526 A1* | 10/2019 | De Jaeger ............... G06F 30/13 |

(Continued)

*Primary Examiner* — John H Le
(74) *Attorney, Agent, or Firm* — Ballard Spahr LLP

(57) ABSTRACT

A method for determining an edge profile of a custom decorative article to be installed in an installation area is disclosed, the installation area having a perimeter having a plurality of corners. A computing device receives data indicative of a plurality of coordinates corresponding to the plurality of corners of the perimeter of the installation area. Based on at least first, second, and third coordinates respectively corresponding to first, second, and third corners of the plurality of corners of the perimeter of the installation area, the computing device determines dimensional and/or geometric characteristics of a pair of opposed portions of the edge profile that, in an installed position, are configured to meet to form a corner of the custom decorative article when installed at the second corner of the perimeter of the installation area.

7 Claims, 37 Drawing Sheets

(56) References Cited

U.S. PATENT DOCUMENTS

2020/0100066 A1    3/2020  Lewis et al.
2021/0207384 A1    7/2021  Lozie

* cited by examiner

FIG. 18
CONTINUED

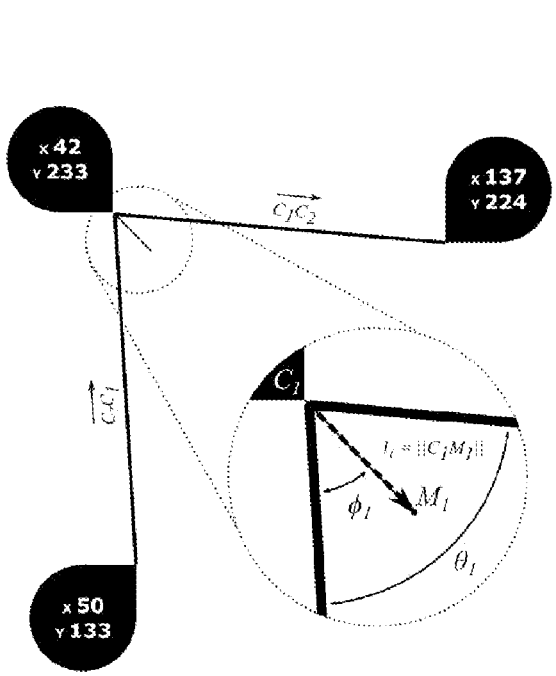
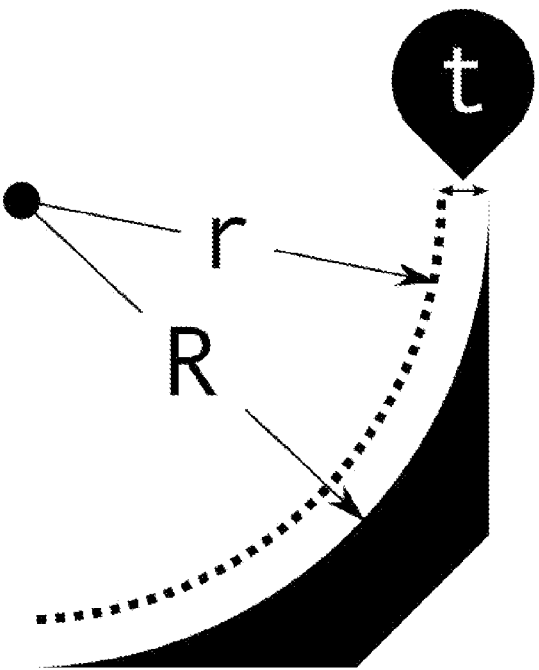
FIG. 34  FIG. 35
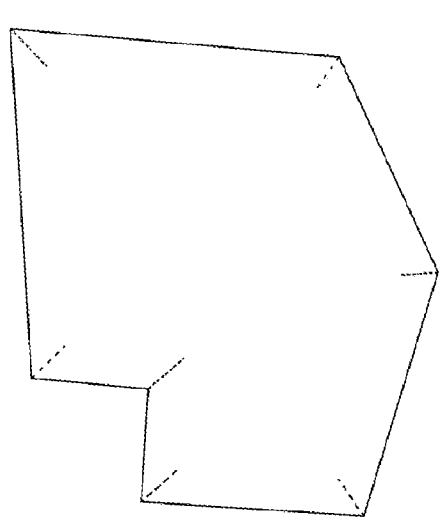
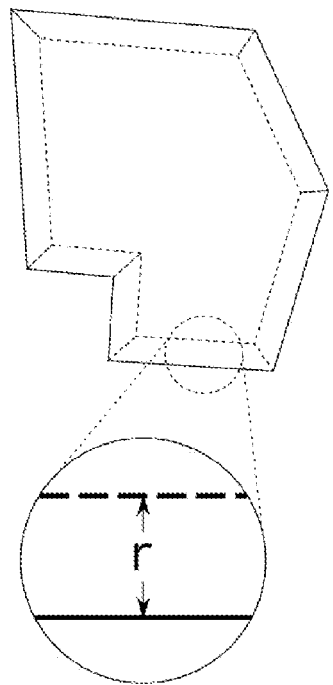
FIG. 36  FIG. 37

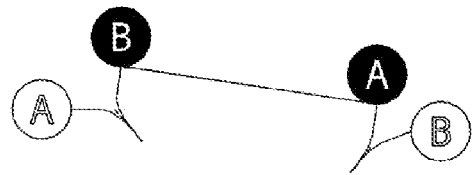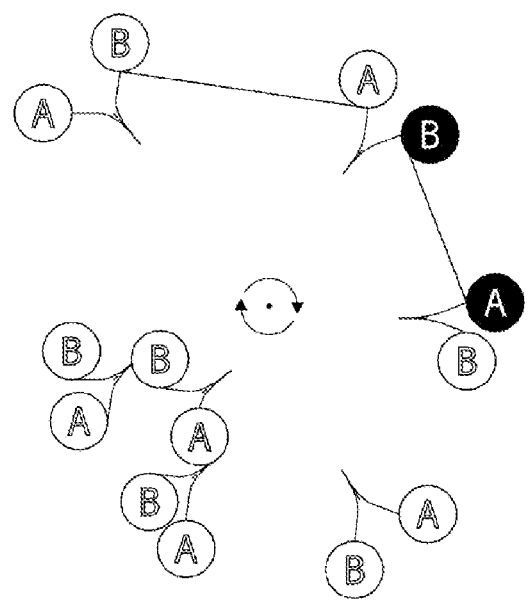
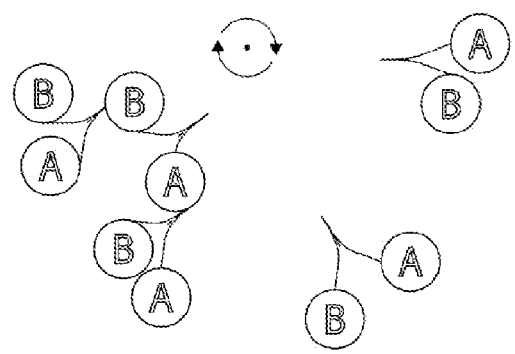
FIG. 48    FIG. 49
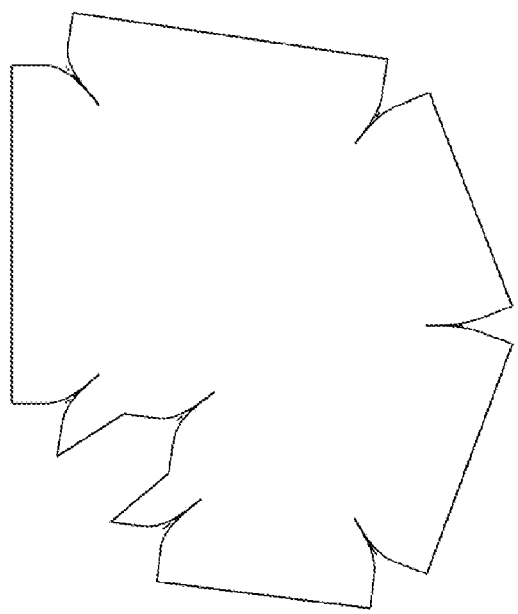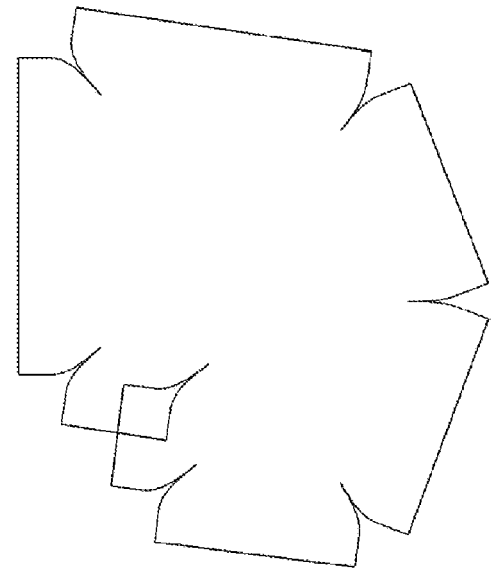
FIG. 50    FIG. 51

CUSTOM DECORATIVE ARTICLES AND SYSTEMS, APPARATUS, AND METHOD FOR PROVIDING THE SAME

CROSS REFERENCE TO RELATED APPLICATIONS

This is a U.S. National Phase Application of International Application No. PCT/US2023/24580, filed Jun. 6, 2023, which claims priority to and the benefit of the filing date of U.S. Provisional Patent Application No. 63/349,444, filed Jun. 6, 2022, and U.S. Provisional Patent Application No. 63/423,305, filed Nov. 7, 2022, the entirety of each of which is hereby incorporated by reference herein.

FIELD

This application is related to decorative articles, in general, and, in particular, to systems and methods for providing custom decorative articles.

BACKGROUND

Decorative articles find applications in many areas such as commercial spaces, residential spaces, wet environments, sanitary spaces in healthcare, etc. In many such applications, it can be desirable to provide custom decorative articles.

SUMMARY

Disclosed herein, in one aspect, is a method for determining an edge profile of a custom decorative article to be installed in an installation area, the installation area having a perimeter comprising at least one corner. The method comprises receiving, by an edge profile determining device, data indicative of coordinates corresponding to the at least one corner of the perimeter of the installation area. Further, the method comprises generating, by the edge profile determining device, an edge profile of the custom decorative article that is to be installed in the installation area based on at least the received coordinates of the at least one corner. Generating the edge profile of the custom decorative article comprises determining dimensional and/or geometric characteristics (or parameters) of: (a) at least one edge (also referred to as 'linear segment') of the edge profile of the custom decorative article, and (b) a pair of opposed portions of the edge profile of the custom decorative article. The pair of opposed portions may correspond to the at least one corner of the installation area, and in an installed form, the pair of opposed portions are configured to meet to form a corner (also referred to as a 'formed corner') of the custom decorative article. The formed corner of the custom decorative article is to be disposed at or adjacent the at least one corner of the perimeter of the installation area such that the formed corner of the custom decorative article covers (fully or partially) the at least one corner. In some examples, in addition to the coordinates of the at least one corner, the edge profile determining device may further consider a cove formation and a flashing (height to which decorative article extends up the wall) to generate the edge profile of the custom decorative article. The coving and flashing may factor in when the custom decorative article is configured to transition from a first surface to a second surface in the installation area, where the first surface is at an angle (e.g., non-zero angle) to the second surface and shares a common edge with the first surface (e.g., from floor to wall, or wall to ceiling, or vice-versa).

In one aspect, a method for determining an edge profile of a custom decorative article to be installed in an installation area is disclosed. The installation area having a perimeter comprising a plurality of corners (e.g., at least three corners). The method comprises receiving, by an edge profile determining device, data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area. The second corner is positioned between the first and third coordinates along the perimeter of the installation area. Further, the method comprises generating, by the edge profile determining device, generating an edge profile of the custom decorative article based on at least the first, second and third coordinates. In one or more example embodiments, generating the edge profile comprises determining dimensional and/or geometric characteristics (or parameters) of: (a) at least one edge (also referred to as 'linear segment') of the edge profile of the custom decorative article, and (b) a pair of opposed portions of the edge profile of the custom decorative article. The pair of opposed portions correspond to the second corner, and in an installed form, the pair of opposed portions are configured to meet to form a corner (also referred to as 'formed corner') of the decorative article. Said formed corner that corresponds to the second corner is to be disposed at or adjacent the second corner of the perimeter of the installation area such that said formed corner of the custom decorative article covers (fully or partially) the second corner. The method can also include determining other pairs of opposed portions that are configured to meet and form other corners of the decorative article when installed at other corners of the perimeter of the installation area, such as the first and third corners. In some examples, in addition to the coordinates of the at least one corner, the edge profile determining device may further consider a cove formation and a flashing (height to which decorative article extends up the wall) to generate the edge profile of the custom decorative article. The coving and flashing may factor in when the custom decorative article is configured to transition from a first surface to a second surface in the installation area, where the first surface is at an angle (e.g., non-zero angle) to the second surface and shares a common edge with the first surface (e.g., from floor to wall, or wall to ceiling, or vice-versa).

In one aspect, method for determining an edge profile of a custom decorative article to be installed in an installation area is disclosed, the installation area comprising at least one corner. The method comprises receiving and transmitting, by a computing device, data indicative of coordinates corresponding to the at least one corner of the perimeter of the installation area. In some examples, the computing device may be configured to determine the coordinates corresponding to the at least one corner and/or measure and determine the geometry of the installation area. In said examples, the computing device may have the capability (such as sensors, lasers, etc.) to measure, calculate, and determine the coordinates or the corners or geometry of an installation area (e.g., a room). In some examples, the computing device may be a portable computing device. In one or more examples, the computing device may be configured as a client-side embodiment of edge profile determining device. Responsive to transmitting the data indicative of the coordinates corresponding to the at least one corner, the method comprises receiving from the edge profile determining device and displaying a geometry of the installation area with an initial arrangement of the corners as measured. The geometry having been generated based on the coordinates of the at least one corner. The method further comprises generating, by the computing device, a prompt for a user to confirm the initial arrangement of the corners and/or the geometry of the installation area or to correct the arrangement of the corners if it is incorrect. Responsive to confirming the arrangement of the corners or correcting and then confirming the arrangement of the corners, the method comprises transmitting the corrected and/or confirmed geometry of the installation area. The confirmation and/or correction may be inputted using a user interface of the computing device.

Responsive to transmitting the confirmation of the geometry of the installation area and/or the corrected arrangement of the corners, the method comprises receiving from an edge profile determining device, data associated with an edge profile of the custom decorative article that is to be installed in the installation area. Said data associated with an edge profile having been determined by the edge profile determining device based on at least the received coordinates of the at least one corner. Data associated with edge profile of the custom decorative article comprises dimensional and/or geometric characteristics (or parameters) of: (a) at least one edge (also referred to as 'linear segment') of the edge profile of the custom decorative article, and (b) a pair of opposed portions of the edge profile of the custom decorative article. The pair of opposed portions may correspond to the at least one corner of the installation area, and in an installed form, the pair of opposed portions are configured to meet to form a corner (also referred to as a 'formed corner') of the custom decorative article. The formed corner of the custom decorative article is to be disposed at or adjacent the at least one corner of the perimeter of the installation area such that the formed corner of the custom decorative article covers (fully or partially) the at least one corner. In some examples, if there are overlapping segments at the at least one corner, the method comprises providing the user an option to select and separate a boot segment. In some examples, the method comprises receiving and transmitting a cove radius value and a flashing height value to the edge profile determining device. In addition to the coordinates of the at least one corner, said flashing height and cove radius may be used to generate the edge profile of the custom decorative article. The coving and flashing may factor in when the custom decorative article is configured to transition from a first surface to a second surface in the installation area, where the first surface is at an angle (e.g., non-zero angle) to the second surface and shares a common edge with the first surface (e.g., from floor to wall, or wall to ceiling, or vice-versa). The method further comprises transmitting the data associated with the edge profile of the custom decorative article to another computing device that is configured to either cut a decorative article based on the edge profile to create the custom decorative article or mark the decorative article with the edge profile to provide a guide for a user to cut along the marked edge profile outline to generate the custom decorative article on site. In some examples, the computing device may be configured to receive other additional input such as pattern, color, etc., of the decorative article that the user desires.

In one aspect, an apparatus for determining an edge profile of a custom decorative article to be installed in an installation area is disclosed. The installation area has a perimeter having a plurality of corners. The apparatus comprises an edge profile determining device (e.g., a server) comprising at least one processor, various engines, and a memory in communication with the at least one processor. The memory comprises instructions that, when executed by the at least one processor, cause the at least one processor to operate in concert with the various engines to: a) receive data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area, wherein the second corner is positioned between the first and third coordinates along the perimeter of the installation area; b) determine, based on at least the first, second and third coordinates, the edge profile of the custom decorative article; and c) output the edge profile to a second computing device. Determining the edge profile of the decorative article comprises determining dimensional and/or geometric characteristics (or parameters) of: (i) at least one edge (also referred to as 'linear segment') of the decorative article, and (ii) a pair of opposed portions of the edge profile of the custom decorative article. The pair of opposed portions correspond to the second corner, and in an installed form, the pair of opposed portions are configured to meet to form a corner (also referred to as "formed corner") of the decorative article. Said formed corner that corresponds to the second corner is to be disposed at or adjacent the second corner of the perimeter of the installation area such that said formed corner of the custom decorative article covers (fully or partially) the second corner. The method can also include determining other pairs of opposed portions that are configured to meet and form other corners of the decorative article when installed at other corners of the perimeter of the installation area, such as the first and third corners. In some examples, in addition to the coordinates of the at least one corner, the edge profile determining device may further consider a cove formation and a flashing (height to which decorative article extends up the wall) to generate the edge profile of the custom decorative article. The coving and flashing may factor in when the custom decorative article is configured to transition from a first surface to a second surface in the installation area, where the first surface is at an angle (e.g., non-zero angle) to the second surface and shares a common edge with the first surface (e.g., from floor to wall, or wall to ceiling, or vice-versa).

In one aspect, an apparatus enables a user to generate an edge profile. The apparatus comprises a client instance of an edge profile determining device comprising at least one processor, various engines, a memory, and/or a measuring device in communication with the at least one processor. The memory comprises instructions that, when executed by the at least one processor, cause the at least one processor to operate in concert with the various engines to receive a user to input a data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area, wherein the second corner is positioned between the first and third coordinates along the perimeter of the installation area. Further the apparatus can receive other user input such as, but not limited to, cove radius, flash height, ambient environment conditions in the installation site, etc. In some examples, the apparatus is configured to measure or obtain a geometry of an installation area via the measuring device of the apparatus (i.e., provided the measuring device is part of or operative coupled to the apparatus). Responsive to receiving the geometry or the coordinates of the installation area, the apparatus can transmit said geometry or coordinates to the edge profile determining server device. If the coordinates are sent, the apparatus may responsively receive a geometry of the installation area generated by the edge profile determining device based on the coordinates. Responsive to receiving the geometry, the apparatus can allow the user to verify the accuracy of the geometry of order of coordinates and/or correct the geometry or coordinates. The apparatus can permit the user to modify the edge profile. For example, the apparatus can provide a user interface on the display device that permits the user to perform one or more of: adding a point corresponding to a corner of a room; deleting a point corresponding to a corner of a room; moving a point corresponding to a corner of a room: or changing an order in which corners are connected. In further aspects, the apparatus can provide a user interface on the display device that permits the user to generate and extract a boot segment. In further aspects, the apparatus can provide a user interface on the display device that permits the user to adjust or rearrange the position of edge profile, or a segment thereof, relative to a virtual material sheet. Responsive to receiving one or more of the correction data, verification of the accuracy of the geometry of the installation area, selection the boot segment, installation direction, segment information etc., the apparatus can transmit said data to the edge profile determining device that is configured to generate, based on at least the first, second and third coordinates, an edge profile of the custom decorative article. The apparatus can receive and output the edge profile on. In further aspects, the apparatus can provide a user interface on the display device that permits the user to provide user input.

In one aspect, a non-transitory computer readable medium comprises instructions that, when executed by an edge profile determination device, cause the edge profile determination device to perform operations comprising a) receiving data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area, wherein the second corner is positioned between the first and third coordinates along the perimeter of the installation area; b) determining, based on at least the first, second and third coordinates, the edge profile of the custom decorative article; and c) outputting the edge profile to a second computing device.

In one aspect, a system for determining an edge profile for a custom decorative article is disclosed. The system comprises an optical distance measuring device and a template that orients the optical distance measuring device relative to an origin. The template comprises a surface having indicia that marks the origin and an arm having a first point that is configured to be positioned at the origin. The optical distance measuring device is coupled to the arm. The arm is configured to angularly orient the optical distance measuring device relative to the origin and radially offset the optical distance measuring device relative to the origin by a known distance.

In one aspect, a method comprises receiving a first plurality of polar measurements corresponding to corners of an installation area, each polar measurement of the plurality of polar measurements comprising a respective angle and a respective distance; determining a second plurality of polar measurements by adjusting the respective distances by a known radial offset; and cutting a decorative article to form a custom decorative article having a perimeter comprising lines (or other segments) that extend between sequential polar measurements of the second plurality of polar measurements.

In one aspect, a method comprises receiving a first plurality of polar measurements corresponding to corners of a room, each polar measurement of the plurality of polar measurements comprising a respective angle and a respective distance; determining a second plurality of polar measurements by adjusting the respective distances by a known radial offset; and marking a decorative article to show a perimeter comprising lines that extend between sequential polar measurements of the second plurality of polar measurements.

In one aspect, a custom decorative article for an installation area comprises a body and an edge profile that defines the edges of the body, where the edge profile is customized to fit the installation area. The edge profile that is customized comprises at least one linear segment and at least one pair of opposed portions, where dimensional and/or geometric characteristics (or parameters) of the at least one linear segment and the at least one pair of opposed portions are determined based on data indicative of, for example, a perimeter/geometry of the installation area or a plurality of coordinates corresponding to the plurality of corners of a perimeter of the installation area, or, as another example, a perimeter or a plurality of coordinates corresponding to an area of an installation area comprising an exposed portion of a stair tread and nose. Each pair of opposed portions of the edge profile of the custom decorative article corresponds to a respective corner of the installation area and are configured to meet to form a corner (formed corner) of the custom decorative article for installation at (or adjacent to) and to cover said respective corner of the installation area. In one or more embodiments, the edge profile may be customized to include the formation of a cove and flashing (height to which decorative article extends up the wall) when the decorative article transitions from one surface to another surface of the installation area, where said surfaces meet each other, are at an angle with each other, and have a common edge. In one or more embodiments, the edge profile may be customized to include formation of a decorative article that covers exposed portions of a stair tread and nose. Said decorative article can wrap around outer and/or circumferential edges of the stair tread and nose (e.g., front and side edges of the stair tread and nose). In some aspects, an entirety of the edge profile of the custom decorative article can be cut out from a larger decorative article sheet so that no factory edges are used.

In one aspect, a custom decorative article for an installation area may not be precut. Instead, it may be configured to be cut on-site. In said aspect, the custom decorative article comprises a body and a marking formed on the body outlining a pattern of an edge profile. The markings may be erasable or permanent and/or visible or invisible. In some examples, the markings of the edge profile may be provided on a separate sheet, like a paper template with the edge profile. The markings are configured to provide a guide for a user to cut the body along said markings on-site to obtain a body having edges corresponding to or defined by the edge profile that is customized to fit the installation area. In said aspect, prior to cutting, the body is not customized to fit the installation area. In some examples, prior to cutting, the body may be rectangular or square shaped.

Additional advantages of the disclosed systems and methods will be set forth in part in the description which follows, and in part will be understood from the description, or may be learned by practice of the disclosed systems and methods.

The advantages of the disclosed systems and methods will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

FIG. 21B is a close-up view of a cut shown in FIG. 21A, in accordance with example embodiments of the present disclosure.

FIG. 34 illustrates a miter vector of the corner $C_1$, in accordance with example embodiments of the present disclosure.

FIG. 35 illustrates a radial offset of a curve for accounting for material thickness, in accordance with example embodiments of the present disclosure.

FIG. 36 shows a miter vector at each corner, in accordance with example embodiments of the present disclosure.

FIG. 37 shows an inner profile from the connected miter vectors, in accordance with example embodiments of the present disclosure.

FIG. 38 shows a representation of a cove as one quarter of a circle cylinder. FIG. 39 shows Unit Sine Wave of period $2x$. FIG. 40 shows the line y=x is plotted from y=0 to y=1. The second line, y=1, is plotted from x=π/2 to an arbitrary length. FIG. 41 shows the quarter Unit Sine Wave and the line, y=1 of arbitrary length, mirrored about the tangent line y=x.

FIG. 48-49 show sequential connection of ends of the miter curves of adjacent pairs with linear segments, in accordance with example embodiments of the present disclosure.

FIG. 50 shows each of the miter curves being connected with linear segments, in accordance with example embodiments of the present disclosure.

FIG. 51 shows a correction of the connections of the miter curves, in accordance with example embodiments of the present disclosure.

Figure 1:
FIG. 1 is a block diagram of an exemplary system for providing custom cut decorative article as disclosed herein, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis is instead placed on clearly illustrating the principles of the example embodiments. Additionally, certain dimensions of positioning may be exaggerated to help visually convey such principles.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a corner" includes one or more of such corners, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 20%, up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

The terms "corner" and "three-surface corner" may be interchangeably used herein without departing from a broader scope of the present disclosure and may refer to a location where at least three surfaces intersect. For example, three-surface corners can be formed at a location where two wall surfaces and a floor surface intersect; or the location where two wall surfaces and a ceiling surface intersect. Each surface of the three intersecting surfaces may be a two-dimensional surface. Said two-dimensional surface can optionally be planar or substantially planar. The three surfaces can optionally be mutually orthogonal. However, in some examples, each surface need not intersect the other two surface at a right angle.

The terms "two-surface corner" and "cove joint" may be interchangeably used herein without departing from a broader scope of the present disclosure and may refer to a location where two surfaces intersect. For example, a two-surface corner can be formed at a location where a wall and floor intersect (wall-floor joint), or where a wall and ceiling intersect (wall-ceiling joint), etc. Each surface of the two intersecting surfaces may be a two-dimensional surface that is planar or substantially planar. The two surfaces can optionally be at right angle to each other. However, in some examples, the surfaces need not intersect at a right angle.

The terms "flashing," "flash coving," "self-cove," and "self-coving" may be interchangeably used herein without departing from a broader scope of the present disclosure and may refer to an extension of the decorative article from a first surface to a portion of a second surface that is at an angle (e.g., substantially perpendicular) to and shares a common edge with the first surface. For example, the first surface may be a floor and the second surface may be a wall. In said example, the flashing may be an extension of the decorative article from the floor up a portion of the wall to form a wall base. In another example, the first surface may be a wall and the second surface may be either a floor or ceiling. In yet another example, the first surface may be a ceiling and the second surface may be a wall. In said example, the flashing may be an extension of the decorative article (that may cover the ceiling) down a portion of the wall. The decorative article may only extend over a portion of the second surface while it may cover all the first surface. In some examples, the flash coving or self-coving may be about 4 inches to 12 inches. However, in other examples, the flash coving or self-coving may be lesser than 4 inches or greater than 12 inches. In some aspects, the terms "flashing," "flash coving," "self-cove," and "self-coving" may refer to the portion of the decorative article that extends past the cove (curved radius portion) and onto the wall. That is, "flashing" or "flash coving" may be the extension of the decorative article from the first surface to the second surface minus the cove (curved cove radius) portion.

The term "decorative article" as used herein refers to an article that has use/utility features in addition to the aesthetic aspect of the article. That is, even though the article is referred to as a "decorative article," it is understood that the features of the article are not limited to aesthetics alone but have numerous utility aspects as well. An example of the decorative article includes a polymer sheet flooring, e.g., a sheet vinyl flooring. The example decorative article, e.g., the sheet vinyl flooring, may be a flexible sheet product. Another example of the polymer sheet flooring may include extruded semi-rigid PVC sheet (e.g., Altro Whiterock™), PU sheet, premium resin tiles (e.g., premium resin tiles by VPI corporation), etc. Yet another example of the decorative article may include a flexible soft surface floor covering article such as a carpet, or a flexible hard surface floor covering article such as flexible LVT, flexible laminates, and the like. Another example of the decorative or custom decorative article may include linoleum sheet Said decorative articles may be used as a floor cover over a subfloor, and may be water-impervious or water-resistant, durable, adjustably resilient and insulating, easy to install, available with a variety of appearances, etc. In some examples, the decorative article may be a wall or ceiling surface coverings/paneling without departing from a broader scope of the present disclosure. In yet other examples, the decorative article may be a stair covering configured to cover the risers and/or treads of a stair.

It is noted that the term "decorative article" as referred to herein does not include materials that are pliable when deformed to have complex curved shapes of an installation area such that the materials fit the shapes in a way that the materials contact every where with or conforms/hugs to the surface of the complex shapes (like spandex material) on which it is installed, without gaps or wrinkles. The description of the decorative article in the above sentence of this paragraph is intended to exclude materials such as, but not limited to, materials that feel and behave like spandex, materials that have high conformity to complex curves (e.g., spandex), cloth or garments such as woven cloth, knitted cloth, etc., with inextensible or extendable threads from being considered as the decorative article/custom decorative article and is not intended to exclude materials such as polymer sheet product (e.g., sheet vinyl, linoleum, flexible LVT) and/or other decorative article materials described in prior paragraphs or the following paragraphs of the present disclosure from being used as the decorative article/custom decorative article.

The term "custom decorative article" as used herein may refer to a decorative article that has been customized to fit an installation area. For example, a custom decorative article may be cut out of a larger roll or sheet of decorative article (or from a larger sized decorative article like larger board or plank) such that the resulting custom decorative article has an edge that defines a custom pattern configured to fit an installation area, the custom pattern of the edge having been determined based on the installation area. In some examples, the custom decorative article may be a large roll or sheet of decorative article (or just a larger sized decorative article like larger board or plank) that has been marked with the custom pattern of the edge, the custom pattern configured to fit the installation area and determined based on the installation area. Said markings may be formed (perforations), printed, drawn, adhered, projected, etc., on a surface of the decorative article (or across more than one decorative article). The markings may be erasable, permanent, invisible (displayed via another device (e.g., AR (augmented reality), VR (virtual reality), or MR (mixed reality), or visible. The markings are intended to provide a guide for a user to cut out the custom decorative article from the one or more decorative articles by cutting along the custom pattern on-site. In some examples, the markings may be provided on a paper that may be overlaid on the decorative article.

Hereinafter, the term "decorative article" may be interchangeably referred to as "polymer sheet flooring" or "sheet vinyl" without departing from a broader scope of the present disclosure. However, it is noted that the decorative article is not limited to a polymer sheet flooring or sheet vinyl and can include other types of flooring as described above. Similarly, hereinafter, the term "custom decorative article" may be interchangeably referred to as a "custom polymer sheet flooring" or "custom sheet vinyl" without departing from a broader scope of the present disclosure. However, it is noted that the custom decorative article is not limited to a polymer sheet flooring or sheet vinyl and can include other types of flooring as described above (with respect to decorative article).

The custom decorative article may be a customized form of the decorative article, and as such may have the same layers and composition but may differ in the edge profile. As such, for the sake of brevity, the layers and composition of a decorative article are described below (e.g., in this and the next paragraphs). But one of skill in the art can understand and appreciate that the layers and compositions described below in association with the decorative article may be applicable or the same for a custom decorative article. The decorative article may have a body (also referred to as "core" or "substrate"). Further, the decorative article may comprise a décor layer. In some examples, the decorative article may comprise other layers without departing from the broader scope of the disclosure. For example, the decorative article may comprise a wear layer, a balancing layer, reinforcing layer, and/or other coatings. In one example, the image layer may be disposed over the body, the wear layer may be disposed over the image layer, and the balancing layer may be disposed below the body. Coatings may be applied above the wear layer and/or below the balancing layer or the body. In some examples, the reinforcing layer may be applied between the image layer and the body, or between the body and the balancing layer. In some examples, the decorative article may include acoustic layers added to dampen in-room reflected noise or room-to-room noise transmission.

In some examples, the body (e.g., core or substrate) may be a single layer body or a multi-layer body. The various layers of the decorative article or custom decorative article may be digitally printed. In some aspect, the decorative article or custom decorative article may be a homogenous sheet (e.g., a single body where a surface of the body provides the color or image with no additional layers). In other aspects, the decorative article or custom decorative article may be a heterogeneous sheet (e.g., having multiple layers (body, image layer, wear layer, etc.)). In some aspects, the decorative article or custom decorative article may be a resinous "premium resilient tile" or antistatic flooring. In some aspects, the body may comprise polymers and/or a filler. In some example, the polymer may be the predominant material in the composition compared to the filler (e.g., wt % of polymer >wt % of filler). In other examples, the filler may be the predominant material in the composition (e.g., wt % of filler >wt % of polymer). In one or more examples, the composition of the body may further comprise a plasticizer. The polymer may include PVC. In other aspects, the body and/or the whole decorative article may be PVC free. For example, the body and/or the different layers of the whole decorative article may comprise polyolefin such as polypropylene, polyethylene, polyethylene terephthalate (PET), etc. The body and/or the different other layers may polyurethane based. In some examples, polyolefin or polyurethane may be the majority component. In other words, the decorative article, custom decorative article, and layers thereof may be made from environmentally friendly, sustainable, and recyclable material. In some aspects, the body and/or the layers of the decorative article and custom decorative article may predominantly comprise rubber. That is, in said aspects, one or more layers of the decorative article and the custom decorative article including the body may be rubber-based material (e.g., acrylic rubber, Butadiene Rubber (BR), Butyl Rubber (IIR), Chlorosulfonated Polyethylene (CSM)/Hypalon, Ethylene Propylene Diene Monomer (EPDM), Fluoroelastomers (FKM)/Viton, Isoprene Rubber (IR), Nitrile Rubber (NBR), Perfluoroelastomer (FFKM), polychloroprene (CR)/Neoprene, Polysulfide Rubber (PSR), Silicone Rubber (SiR), Styrene Butadiene Rubber (SBR), etc.). The image layer may include UV curable inks, oil-based inks, water-based inks, or any other suitable inks. In some examples, the body and/or other layers of the decorative article and/or the custom decorative article may include conductive material or particles to provide an antistatic property. The addition of the conductive material or particles allow for transfer of charged electrons to pass from person/device through flooring to a conductive adhesive to a copper grounding strips.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

In various environments such as, for example, hospitals and surgical rooms and in assisted living and nursing homes, decorative articles are installed to extend across the floor to the walls and upwardly along a portion of the walls (e.g., 6 or 12 inches up the walls) so that spilled liquids remain contained for easy cleanup and do not leak into the walls or subfloor. In order to prevent leaking or seepage to subfloor, a portion of the decorative article that extends across the floor and a portion of the decorative article that extends upwardly along the portion of the wall are formed from a single, continuous surface. In order to cover a given area that is larger than the standard available sized of the decorative article, a plurality of decorative articles (e.g., 6-foot-wide sheets) can be coupled via seaming to form the single, continuous surface. In order to make a fluid seal at corners of the room (e.g., intersecting walls), precise cuts must be made along the edge of the decorative article to form portions of the edge that meet at the corner of the room. It typically takes a skilled artisan at least 15 minutes (often much longer) to make a single cut for a single corner of a room. Thus, a room with complex geometry can occupy a skilled artisan for an entire day or longer. Stencils are sometimes used, but such stencils are only suitable for corners with exact angles, such as 90-degree corners. If the angle of a corner is inconsistent with a cut for a corner having a particular angle (e.g., off by 0.5 degrees or more), the edges will not line up, resulting in misalignment, which can lead to a weak seal or provide a water-permeable gap. Existing constructions, and especially older constructions, can have imperfect tolerances or uneven walls that require custom cutting. Accordingly, a way to quickly and accurately provide decorative article to fit any given room, whether the room is a new construction or an existing construction, is desirable.

As another example, decorative articles can be used in other commercial and residential flooring as well, e.g., where custom decorative articles may be desirable. The commercial and residential flooring may also require the decorative article to extend up from the floor to a certain height along the walls. Cutting decorative articles to a custom area can be difficult, and, if inadvertently cut too short, an entire decorative article can be waste. Accordingly, it can be desirable to provide a custom-cut decorative article for a particular area with minimal waste and minimal install time. However, there is currently no sufficient way to acquire and communicate accurate room dimensions for custom cutting to a manufacturer or supplier.

As used herein, when "a processor" or "at least one processor" are disclosed as performing certain steps or actions, it should be understood that such disclosure is intended to include aspects in which a single processor performs said steps or actions in any logical order, aspects in which a plurality of processors apply parallel processing to perform said steps or actions, or portions thereof, and aspects in which a plurality of processors sequentially perform said steps or actions, or portions thereof.

Disclosed herein, with reference to FIGS. 1-4, is a system 10 for providing a decorative article that is customized (also referred to herein as 'custom decorative article') for a particular space (e.g., a room).

The system 10 can comprise a measuring device 20 that is configured to obtain geometry of a room or to obtain coordinates of points of the room that can then be used to create the geometry of the room. In some aspects, the measuring device 20 can be a multi-axes scanner. For example, the measuring device 20 can be a laser scanner that rotates about a first axis and a second axis to obtain the geometry or acquire points of a room in polar, cylindrical, spherical, Cartesian, or any other appropriate coordinates. Such scanners may be commercially available from, for example, FARO TECHNOLOGIES of Lake Mary, FL; LEICA GEOSYSTEMS of St. Gallen, Switzerland; and/or Hott Scan of Cologne, Germany. Accordingly, in some examples, the measuring device 20 can be fully automated or semi-automated. In another example, the measuring device 20 can be manually operated. For example, the measuring device 20 can be embodied as further disclosed herein with reference to FIGS. 15-17. The manually operated measuring device 20 can be manipulated by a user for pointing the measuring device 20 at different corners or features of a room.

Figure 2:
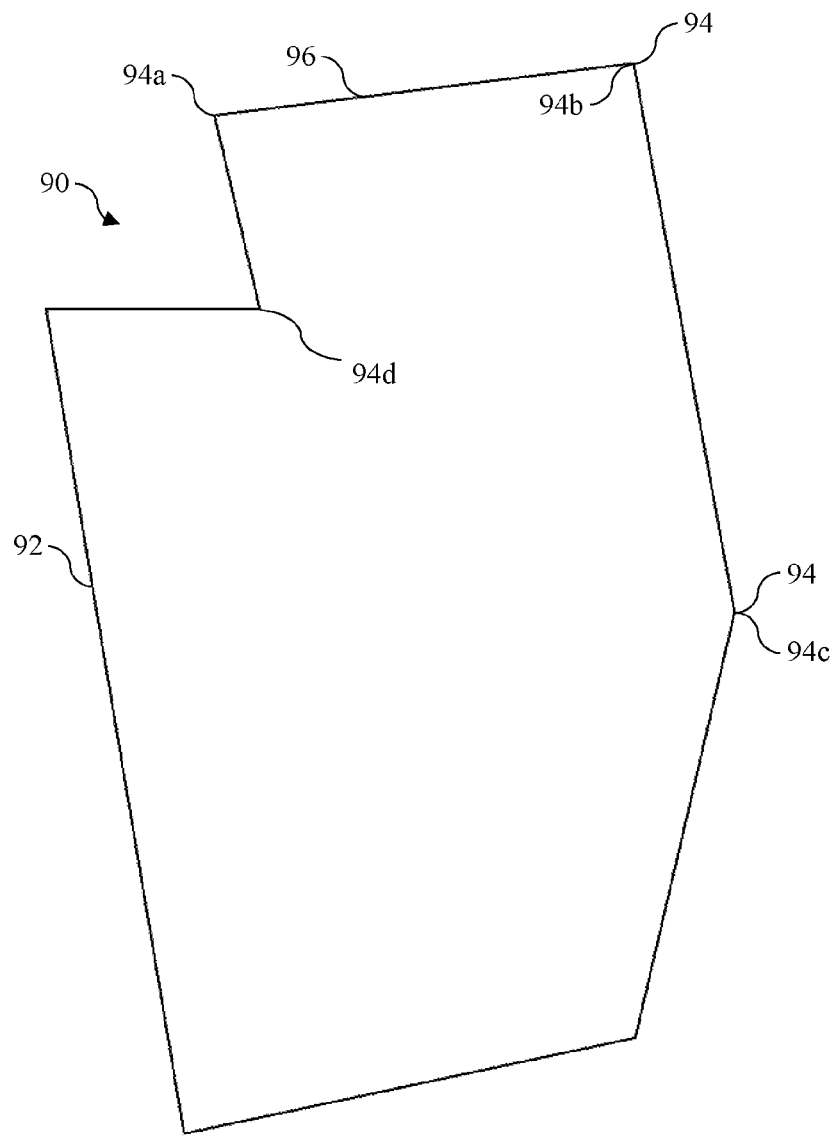
FIG. 2 shows an exemplary profile of an installation area to receive a custom cut decorative article, in accordance with example embodiments of the present disclosure.

Geometry of a room can be provided to an edge profile generation device 1001 that can be a computing device, such as, for example, an edge profile determining server. For example, in some aspects, the measuring device 20 can provide the geometry of the room to the edge profile determining device 1001 either in near real-time or at a later time. In some aspects, the measuring device 20 may be a component of a portable computing device such as a smart phone. In said aspects, a user can use the measuring device 20 on the portable computing device to obtain the geometry of the room and transmit it to the edge profile generation device 1001. In some aspects, a client instance of the edge profile generation device 1001 may be implemented on a computing device (e.g., portable computing device) accessible to the user, and said computing device may include the measurement device 20. Alternatively, the measurement device 20 may be removably coupled to the computing device. In some examples, the measuring device 20 can scan the room to generate a line scan of the geometry of the room as shown in FIG. 2. Alternatively, in some examples, the measuring device 20 can be used to obtain coordinates of one or more points in the room (e.g., corners (two-surface or three-surface)) which can then be used to generate a geometry of the room (shown in FIG. 24). In some aspects, the client instance of the edge profile generation device 1001 may be configured to generate the room geometry from the coordinates of the points. In other aspects, the client instance of the edge profile generation device 1001 may be configured to transmit the coordinates of the points in the room to the edge profile determining device which in turn generates the room geometry from the received coordinates.

Figure 24:
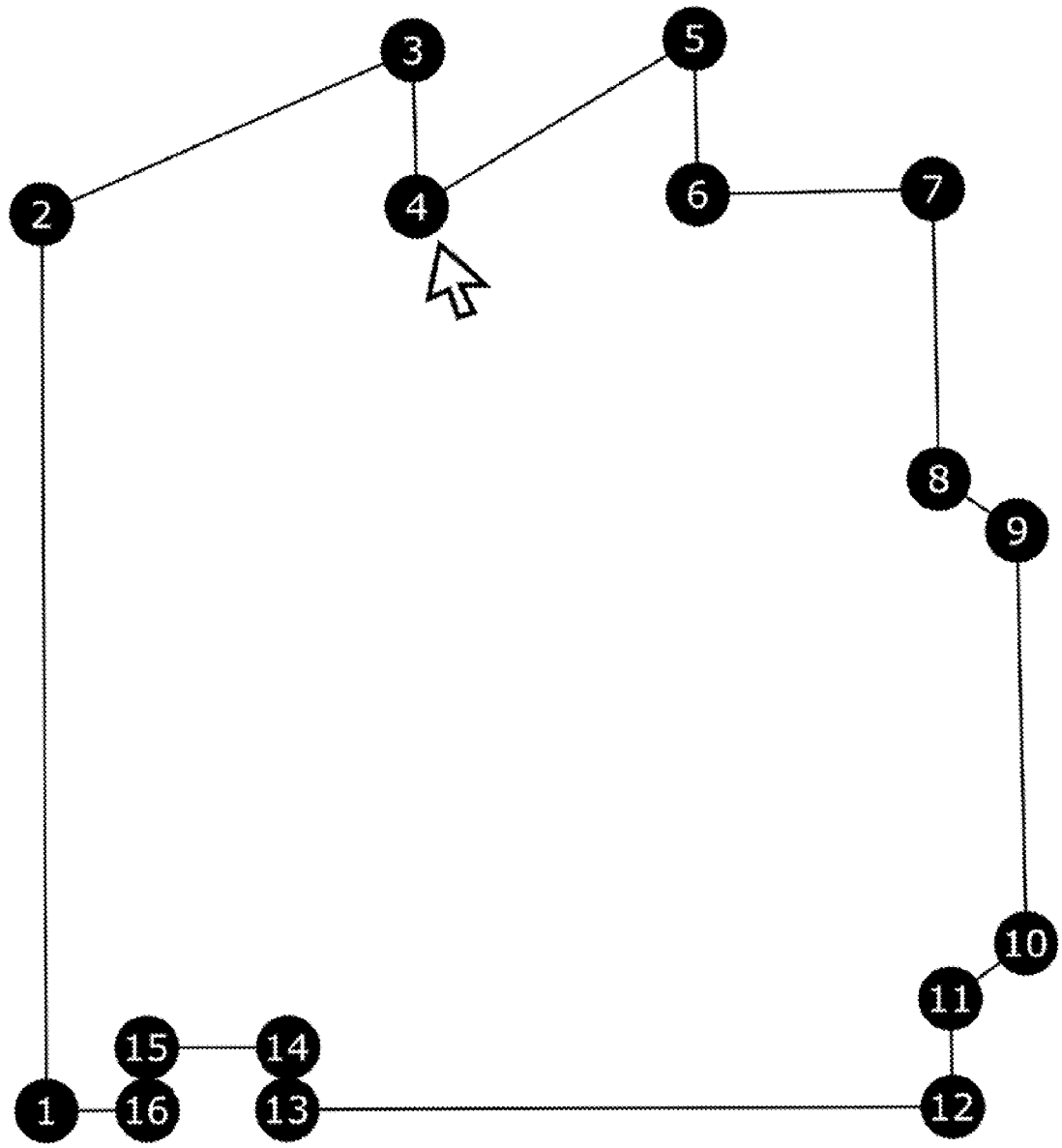
FIG. 24 shows a portion of an output on an exemplary display in communication with the exemplary edge profile determining device, showing an initial arrangement of corners of a room, in accordance with example embodiments of the present disclosure.

As illustrated in FIG. 24, some coordinates may be measured or recorded out of order. So, the geometry generated from said coordinates measured out of order may not match the actual geometry of the room. Therefore, the geometry generated from the measured coordinates may be sent to and/or displayed by the client instance. The presented/displayed geometry may be an interactive geometry. That is, a user can interact with the geometry via a user interface of the computing device (having the client instance and on which the geometry is displayed) to rearrange the coordinates that are out of order. Responsively, either the client instance or the edge profile determining device can recreate the corrected geometry based on the rearranged coordinates, where the corrected geometry may substantially match the actual geometry of the room measured using the measuring device 20. The rearrangement of the coordinates and recreation of the geometry can continue till the generated geometry substantially matches the geometry of the measured room.

In some aspects, the measuring device can obtain a point cloud, a floor plan, or a plurality of coordinates corresponding to points (e.g., corners) of a room. In aspects where coordinates of points within the room are measured, the measuring device 20 (or user handling the measuring device 20) may be configured to obtain coordinates of the two-surface corners (e.g., where two adjacent walls or intersect or where a wall intersects with the floor) or three-surface corners (e.g., where two adjacent walls and the floor intersect) of the room. In some aspects where the geometry of the room is measured, the measuring device 20 may be configured to scan the walls of a room to obtain a line scan of the room as shown in FIG. 2.

In some aspects, a user may already have the geometry of a room and may upload said geometry to the edge profile determining device (either directly or via client instance). In some aspects (e.g., where the surfaces of a room are not linear or surfaces do not intersect at a right angle), in order to inhibit inaccurate capture of floor geometry of an exemplary room having uneven corners in which the walls do not intersect at a perfectly vertical line, the edge profile determining device 1001 (or the client instance thereof or the measuring device 20) can be configured to capture the geometry of the room via the measuring device (or obtained otherwise) and then determine corners (two or three-surface corners) of the room based on the geometry that is captured by the measuring device 20 (or obtained otherwise). For example, the two-surface (wall-wall corner) or three-surface corners of the room can be identified at or about where two adjacent lines of the geometry intersect, where said intersections may correspond to where two walls intersect and/or three-surface or where the two walls intersect the floor.

Some or all of the geometry of the room can define an installation area 90 having a perimeter 92. In some aspects, the installation area 90 can correspond to an area upon which the custom decorative article is to be installed. In some examples, the installation area 90 as described herein may only include the floor, while in other examples, the installation area may include the floor and/or at least a portion of the walls that are adjacent to and share common edges with the floor. Alternatively, the installation area can include only a ceiling or a ceiling and at least a portion of the walls that are adjacent to and share common edges with the ceiling. In another example, the installation area can include only a wall or a wall and at least a portion of the ceiling or floor that are adjacent to and share common edges with the wall. In some examples, the installation area can include one or more other appropriate surfaces like a stair tread, riser, countertop (e.g., kitchen island), furniture surfaces, individual floor planks, etc. In some aspects, the installation area 90 can have a linear geometric shape. In other aspects, the installation area 90 can have a substantially curvilinear geometric shape or other geometric shaped without departing from a broader scope of the present disclosure.

In aspects where the installation area 90 includes only the floor, the custom decorative article can, when installed, extend across the floor area and not extend to the wall. In aspects where the installation area includes both the floor and a portion of the wall, the custom decorative article can extend across the floor area and further extend over at least a portion of the walls (e.g., includes cove that provides a smooth, gentle, and curved transition from floor to the wall without any creasing, and/or flashing which extends to a certain height on the wall past the cove (end of curve)). The perimeter 92 can have a plurality of corners 94 (e.g., two-surface corners or three-surface corners) and sides 96 that extend between sequential corners. In exemplary aspects, the sides 96 can all be linear. In other aspects, one or more of the sides 96 can be non-linear (e.g., curved).

In some aspects, additionally or optionally the measurement device 20 may be configured to determine, identify, and trace/plot various features in the installation area as well. Further, the edge profile determining device 1001 may be configured to accommodate, consider, and/or account for such features when determining the edge profile of the custom decorative article. Examples of such features can include, but are not limited to, drains, ducts, pillars, pipes, cabinets, electrical sockets, etc.

In some aspects, the measuring device 20 (e.g., a scanner) can return coordinates of corners of the room. The edge profile determining device 1001 (e.g., computing device or edge profile determining server) can receive said coordinates as input and use said coordinates to determine the geometry of the room, which may correspond to the perimeter 92 of the installation area 90. In other aspects, the edge profile determining device 1001 can receive the geometry or line scan of the room, which can be particularly beneficial for walls that are not linear. It is contemplated that receiving coordinates of the room can be advantageous over receiving a line scan of the walls (e.g., measuring coordinates takes a shorter time). The edge profile determining device 1001 (or a client instance thereof) can display the generated geometry of the room or installation area 90 (with the coordinates) and further provide ability to edit, such as remove coordinates (if accidently one spot was scanned twice or device did not scan a corner), rearrange the coordinates (if any coordinates were scanned out of order), etc.

The edge profile determining device 1001 can be configured to receive, among other inputs, the room geometry, corner coordinates, at least the cove radius, and wall flashing height as input (one or more of them inputted by user or as determined using tools and received from the tools (computer to computer communication)) that can then be used to calculate and determine the edge profile of the custom decorative article. In some examples, the input can also include the number of segments into which the user wants the custom decorative article to be cut, and whether the custom decorative article is to be segmented horizontally (along the short side of the product) or vertically (along the long side of the product) or at some other angle. In some other examples, the edge profile determining device 1001 can be configured to provide suggestions for segmenting the custom decorative article instead of or in addition to receiving it as a user input. In some aspects, the input received by the edge profile determining device 1001 can further include ambient environment conditions of the installation site such as, but not limited to, temperature, humidity, etc. In some examples, the ambient environment conditions may be used to cut the decorative article under the same ambient environment conditions as the installation's site to ensure no shrinkage or expansion of the decorative article at the installation site (which could affect the fitting of the custom decorative article at the installation site). Alternatively, in some examples, the decorative article may also be cut with a scaled pattern (or mark outline of the scaled pattern on the decorative article) that correlates with a temperature correction factor, e.g., cut bigger or smaller to alleviate acclamation fitment of the decorative article at the installation site. That is, in said examples, when determining the edge profile of the custom decorative article, the edge profile determining device may be configured to use the ambient environment conditions at the installation site to account for any dimensional changes of the decorative article at the installation site.

In some aspects, the edge profile determining device 1001 may be configured to store data representative of the installation area 90, the perimeter thereof 92, and the edge profile 100 of the custom decorative article 101 generated for the specific installation area 90 in a data repository associated with the edge profile determining device 1001. Alternatively, said data may be transmitted to a data repository (e.g., database) for storage. Said data may be stored for later access, for example, in case a room associated with the installation area 90 needs to be turned over with new decorative articles. In said example, the measurements need not be taken again, and the edge profile need not be generated once again. Instead, relevant data stored in the data repository may be used to create the custom decorative article as and when needed.

Figure 3:
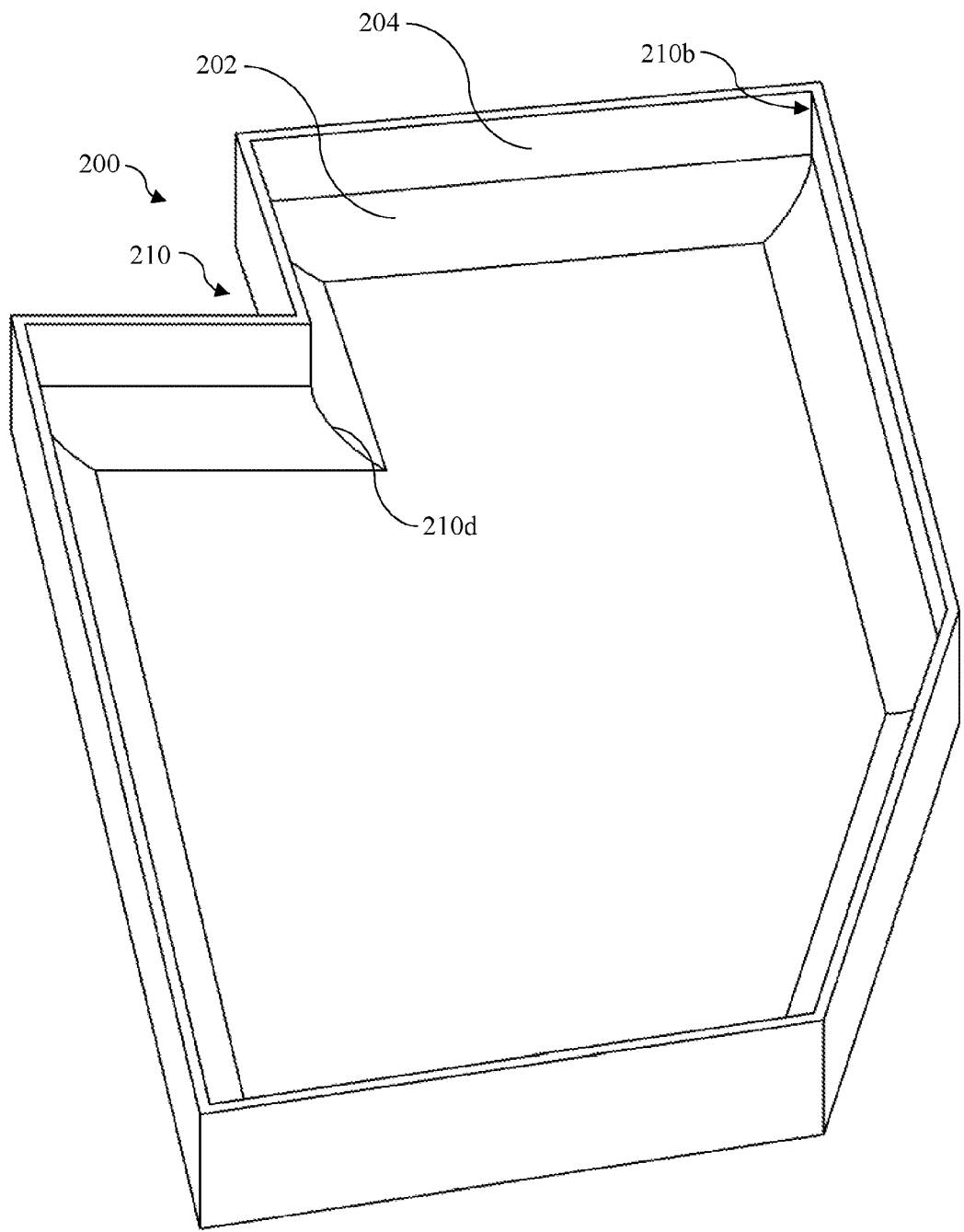
FIG. 3 shows an exemplary formed custom decorative article that is custom-designed for the exemplary profile of the installation area of FIG. 2, in accordance with example embodiments of the present disclosure.
Figure 4:
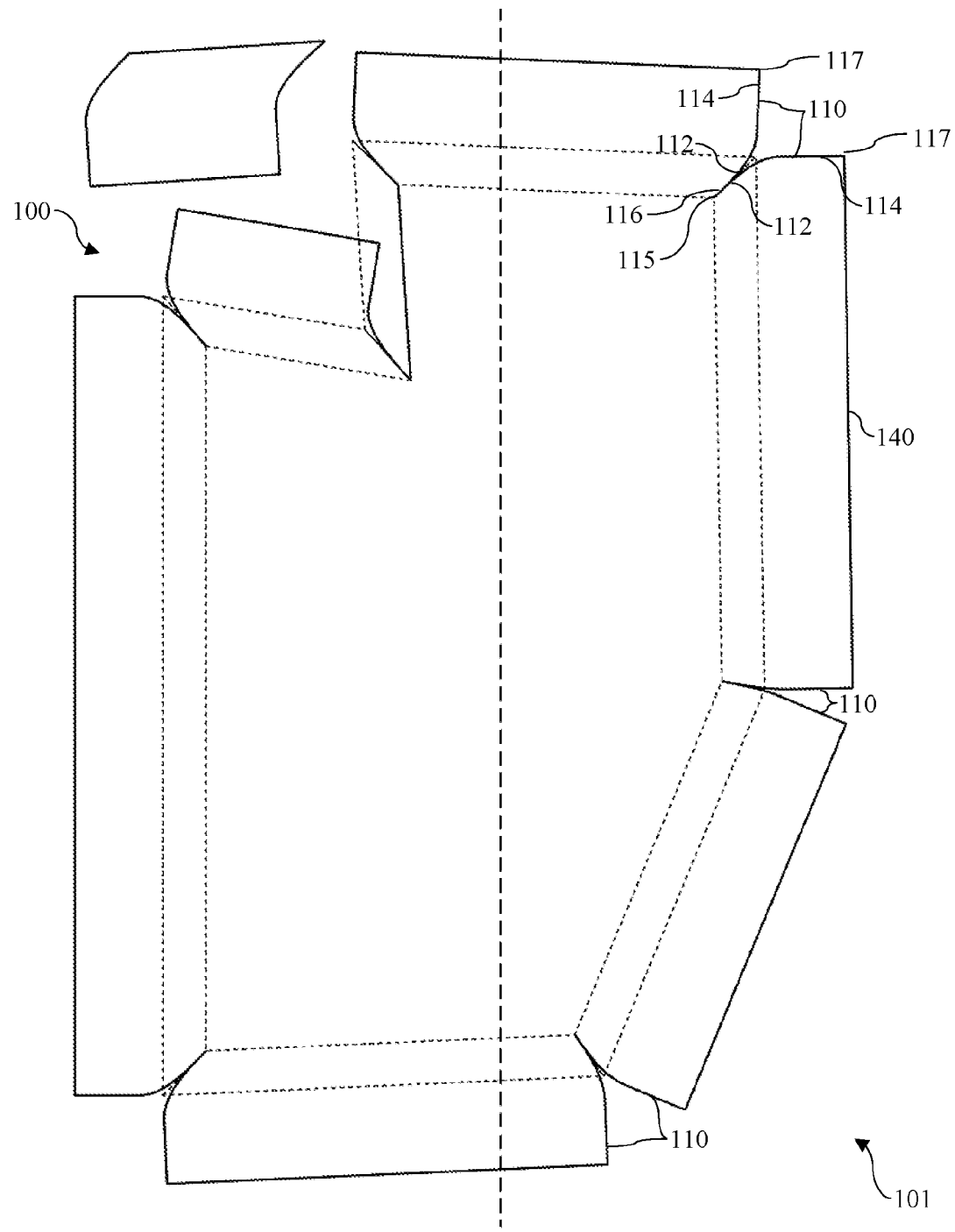
FIG. 4 shows an exemplary edge profile of the custom cut decorative article overlaying the exemplary profile of the installation area for which it is to be used, in accordance with example embodiments of the present disclosure.

Hereinafter the term "decorative article" may be interchangeably referred to as "polymer sheet flooring" or "polymer sheet product" without departing from a broader scope of the present disclosure. As described above, while decorative article is referred to as polymer sheet flooring or polymer sheet product, it is noted that polymer sheet flooring/product (or sheet vinyl flooring/product) is a non-limiting example of a decorative article and the decorative article is not limited to a polymer sheet flooring/product. A custom polymer sheet product 101 can be determined from the perimeter 92 of the installation area 90. In exemplary aspects, as further described herein, an edge profile determining device 1001 can perform the steps of the method for determining an edge profile 100 of a custom polymer sheet product 101 (shown in FIG. 4) to be installed in an installation area 90 within the room. In an installed position (when installed in the installation area 90), the custom polymer sheet product 101 (shown in FIG. 4) may be referred to as a formed custom polymer sheet product 200 (shown in FIG. 3). It is noted that the shape of the formed custom polymer sheet product 200 shown in FIG. 3 is specific to the pattern of the edge profile 100 of the custom polymer sheet product 101 shown in FIG. 4, which in turn is customized based on the installation area 90. That is, if the installation area (e.g., shape thereof) changes, the edge profile (e.g., pattern thereof) changes which in turn would change the shape of the formed custom polymer sheet product 200. In other words, the formed custom polymer sheet product 200 is a non-limiting example that is specific to the installation area 90. It is noted that when installed in the installation area 90 within the room, the custom polymer sheet product 101 with the edge profile 100 that is shown in FIG. 4 can take the shape shown in in FIG. 3.

Figure 12:
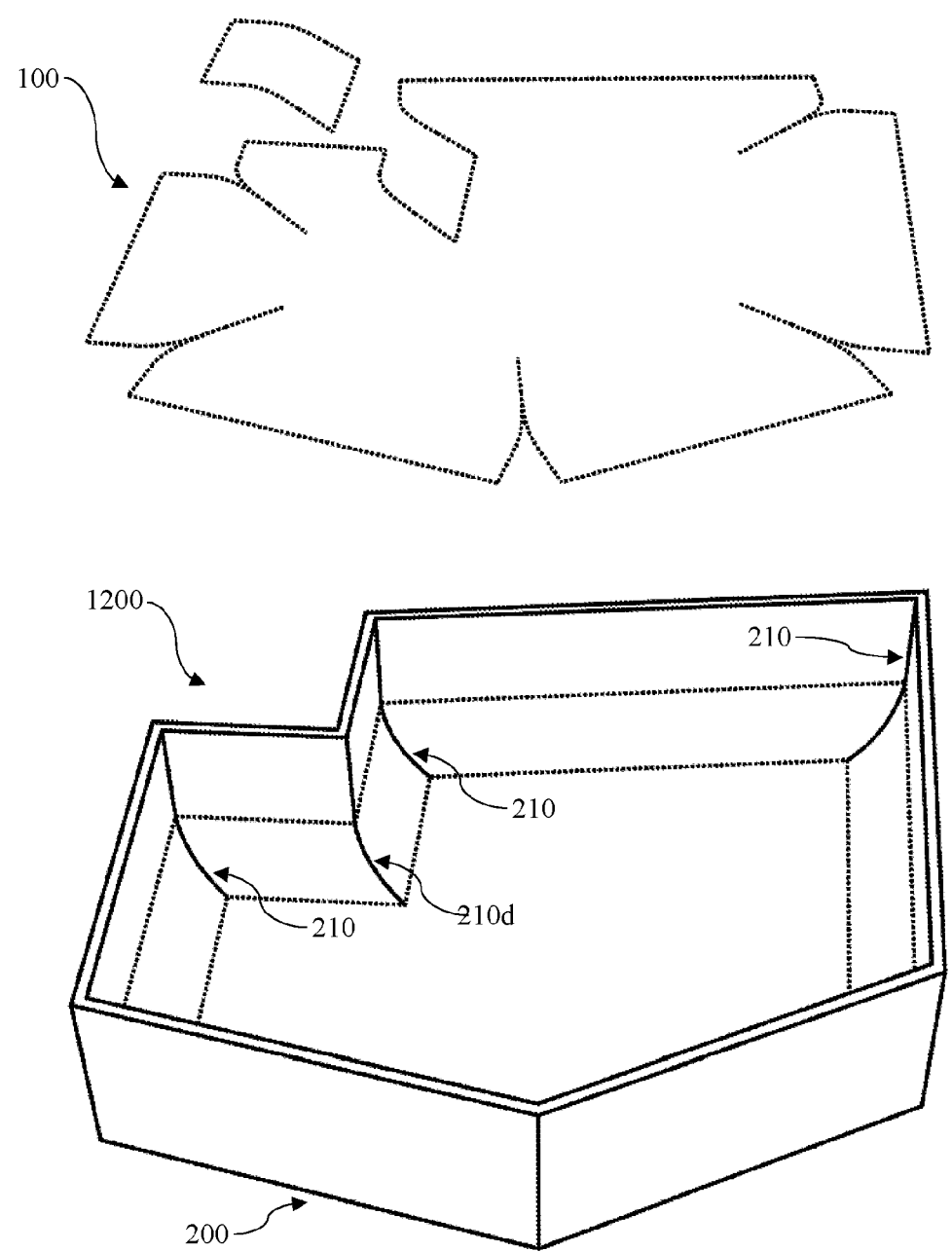
FIG. 12 shows an exemplary custom decorative article and a corresponding formed custom decorative article made from said edge profile of the custom decorative article, in accordance with example embodiments of the present disclosure.

A portion of the edge profile 100 corresponding to the corners (i.e., opposed portions 110) may be joined together (e.g., adhered, welded, etc.) to form the corners 210 of the formed custom polymer sheet product 200. Further, as illustrated in FIG. 3, the formed custom polymer sheet product 200 may include a lower curved portion 202 (e.g., optionally, a radius and referred to as a cove) that extends about the perimeter of the room (from the floor to the wall) and a generally flat portion 204 (also referred to as a flashing) that extends up the wall from the lower curved portion 202. In some examples, the generally flat portion 204 (or flashing) may be optional. While FIGS. 3 and 12 illustrate the formed custom polymer sheet product 200 with the generally flat portion 204 (or flashing) having a uniform height along the perimeter, in some examples, the height of the generally flat portion 204, i.e., flashing, may vary along the perimeter, for example, to accommodate for electrical outlets, pipes, ducts, etc.

Figure 10:
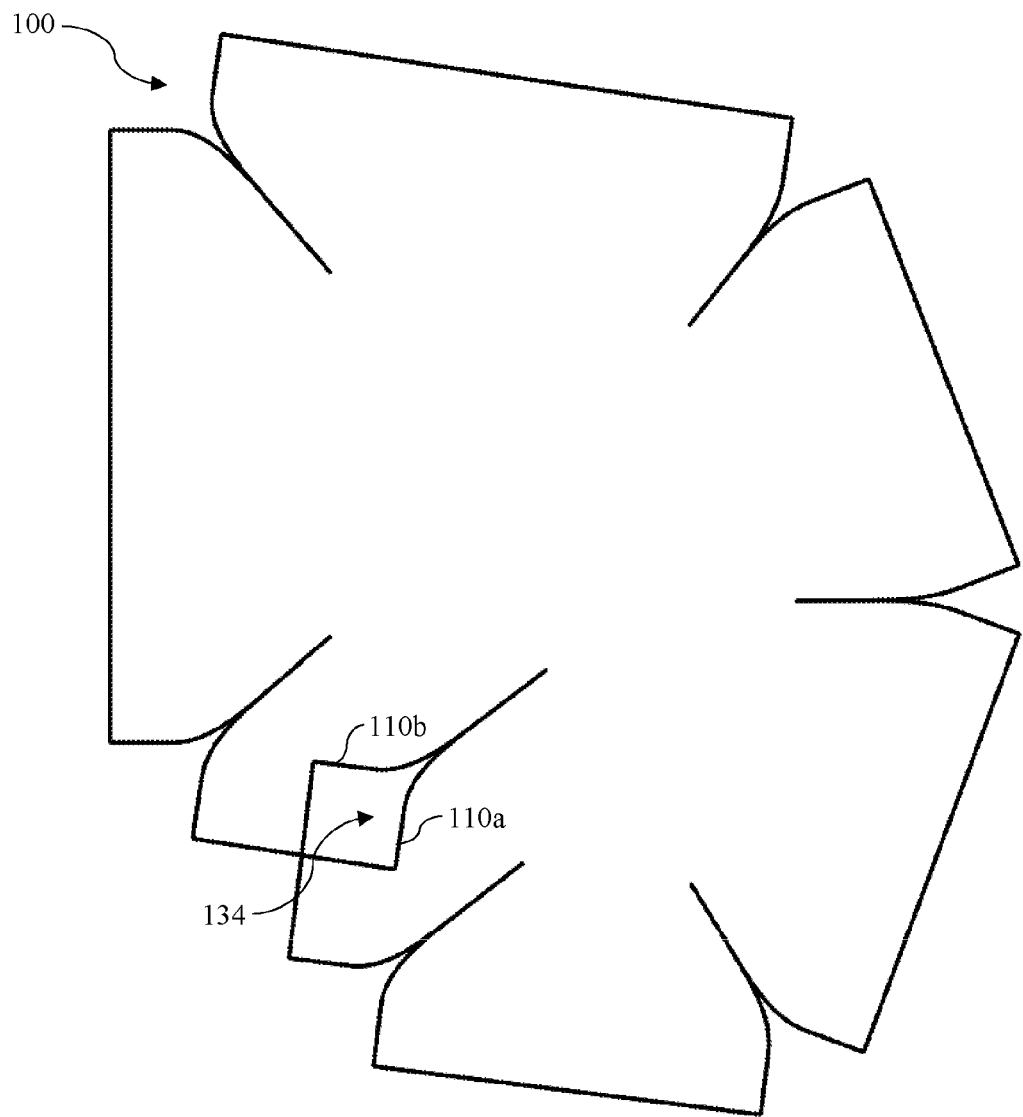
FIG. 10 shows an initial edge profile having overlapping portions, in accordance with example embodiments of the present disclosure.
Figure 11:
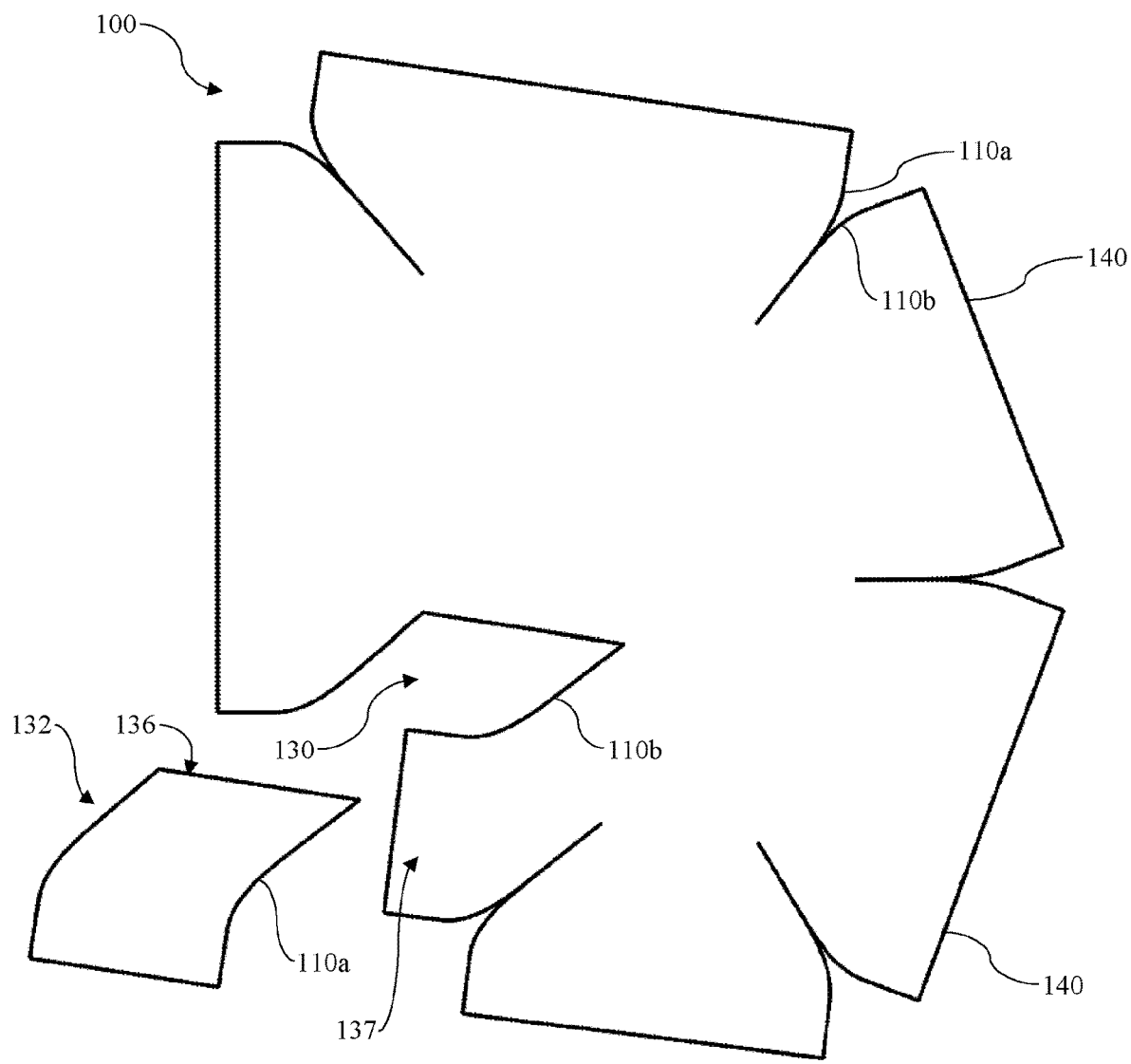
FIG. 11 shows an edge profile comprising a first opposed portion and a second opposed portion that are respectively provided on a first segment and a boot segment that cooperate to form a corner to address the overlapping portions shown in FIG. 10, in accordance with example embodiments of the present disclosure.

It is noted that the edge profile determining device 1001 is configured to account for or include the lower curved portion 202 and/or the generally flat portion 204 when determining the edge profile 100 of the custom polymer sheet product 101. In one or more aspects, the polymer sheet product 101 may be semi-rigid or flexible such that prior to welding the opposed portions 110 to form the corners 210 of the formed custom polymer sheet product 200 (or prior to installation), the custom polymer sheet product 101 may lay flat as shown in FIGS. 4, 10, and 11.

The edge profile 100 can correspond to the perimeter of the custom polymer sheet product 101. In some aspects, the edge profile 100 can correspond to the installation area 90 and may or may not extend up and along portions of the wall.

In some aspects, as illustrated in FIG. 4, the edge profile 100 can include linear segments 140 that extend along the walls and between corners of a room when installed in the room (also interchangeably referred to as linear segments 140) as well as pairs of opposed portions 110 that meet at corners of the room. As such, the edge profile 100 of the custom polymer sheet product 101 can define a total coverage area 1200 (FIG. 12) that, when installed, covers the installation area 90 and portions of the walls about the perimeter 92 of the installation area. It is noted that in the specific example illustrated in FIG. 12, the custom polymer sheet product 101 further includes a boot segment 132 (shown in FIG. 11) that is also included in defining the total coverage area 1200. However, one of skill in the art can understand that not all custom polymer sheet product embodiments will include a boot segment 132. The boot segment 132 will be described below in greater detail.

Figure 5:
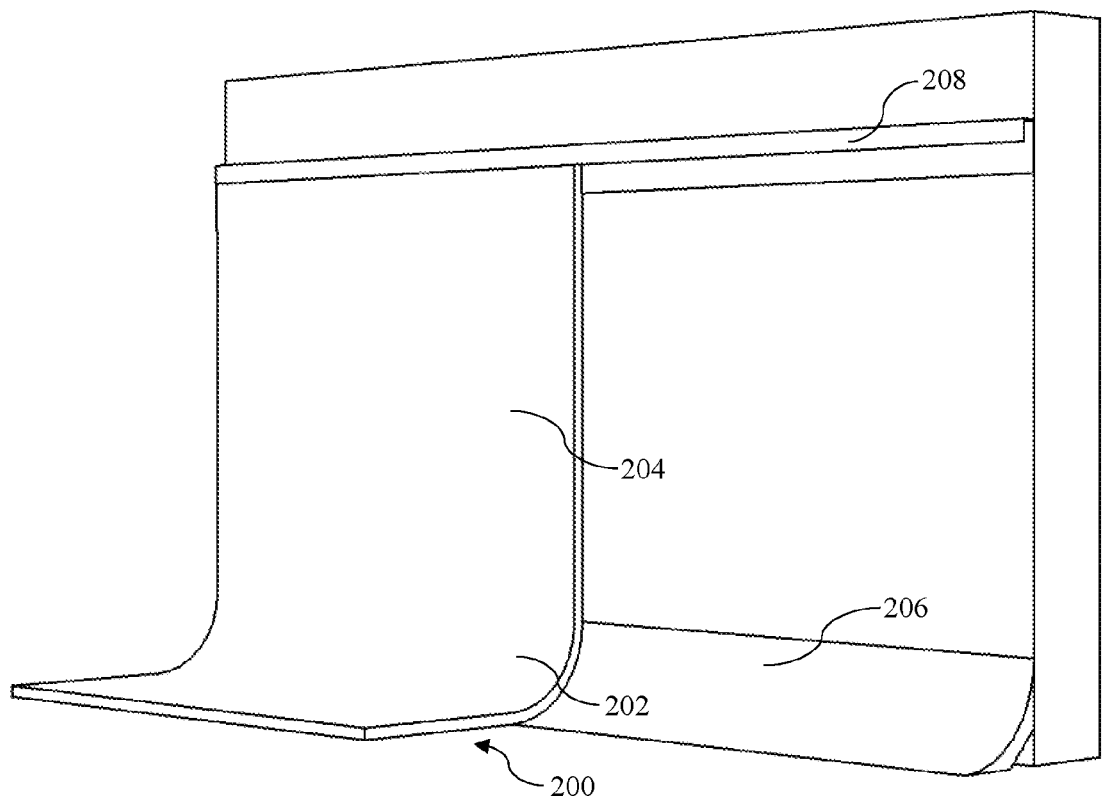
FIG. 5 shows an exemplary installation of a portion of an exemplary custom cut decorative article, in accordance with example embodiments of the present disclosure.

FIG. 5 illustrates a portion of a formed a custom polymer sheet product 200 installed in an example room. As described above in association with FIG. 3, the formed custom polymer sheet product 200 (e.g., the custom polymer sheet product 101 that has been installed) can have a lower curved portion 202 (e.g., optionally, a radius) that extends about the perimeter of the room and a generally flat portion 204 (also referred to as a flashing) that extends up the wall from the lower curved portion 202. The lower curved portion 202 (also referred to as a cove) can have a radius of at least an inch to inhibit excessive bending that can weaken or show creasing in the polymer sheet product. A support fillet 206 (or cove former) can be positioned under the lower curved portion 202 for support. A cove cap 208 can optionally be attached to the wall and can cover an edge (e.g., upper edge or perimeter) of the formed custom polymer sheet product 200. In further aspects, the cove cap 208 can be omitted because the present system can provide custom polymer sheet product having precise and clean-cut edges (no factory edges as will be described in greater detail below in association with FIG. 14) which may eliminate the need for the cove cap 208.

For an exemplary room having the geometry as illustrated in FIGS. 2 and 4 (in FIG. 4 shown as dotted lines), an edge profile determining device 1001 can receive data indicative of a plurality of coordinates corresponding to the plurality of corners of the perimeter 92 of the installation area 90. While the geometry shown in FIG. 2 can include a plurality of coordinates, only three coordinates corresponding to three adjacent corners are discussed herein for the sake of brevity. However, it is noted that the system 10 can process fewer or more coordinates and corners; and determine pairs of opposed portions 110 of the edge profile 100 for any number of corners or sides without departing from a broader scope of the present disclosure. The plurality of coordinates can comprise at least first, second, and third coordinates respectively corresponding to first, second, and third corners 94 $a,b,c$ of the plurality of corners of the perimeter of the installation area 90. The second corner 94$b$ can be positioned between the first and third corners 94$a,c$ along the perimeter of the installation area 90. In some examples, the coordinates may correspond to other points along the perimeter 92 of the installation area 90 (or in the room, esp. along the walls) and not necessarily the corners. In some aspects, the edge profile determining device 1001 may need coordinates of at least three points (including one corner) or coordinates of at least three corners to generate the edge profile 100 of the custom polymer sheet product 101 for an installation area 90.

Responsive to receiving the data indicative of the plurality of coordinates, the edge profile determining device 1001 can use the received coordinates to determine dimensional and/or geometric characteristics of a pair of opposed portions 110 of the edge profile 100 of the custom polymer sheet product 101. In an installed position within the installation area 90, the pair of opposed portions 110 generated based on the received coordinates (of corners 94 $a,b,c$) are configured to meet to form a corner 210$b$ of the formed custom polymer sheet product 200 when installed at the second corner 94$b$ of the perimeter 92 of the installation area 90. Said corner 210$b$ of the formed custom polymer sheet product 200 can cover a portion of the floor space of the installation area 90 and extend upwardly along portions of the two walls against which the (three-surface) corner 210b of the formed custom polymer sheet product 200 is installed. Accordingly, a corner 210 of the formed custom polymer sheet product 200 can be positioned within a three-surface corner of a room in which it is installed. In exemplary aspects, the edge profile 100 can be provided in scalable vector graphic format. Scalable vector graphic format can be beneficial in order to be useable in various computer aided design (CAD) applications. That is, scalable vector formats can be used with common CAD applications and web browsers. Other suitable formats can include XSL-FO formatting and scalable vector graphic (SVG) format.

Figure 9:
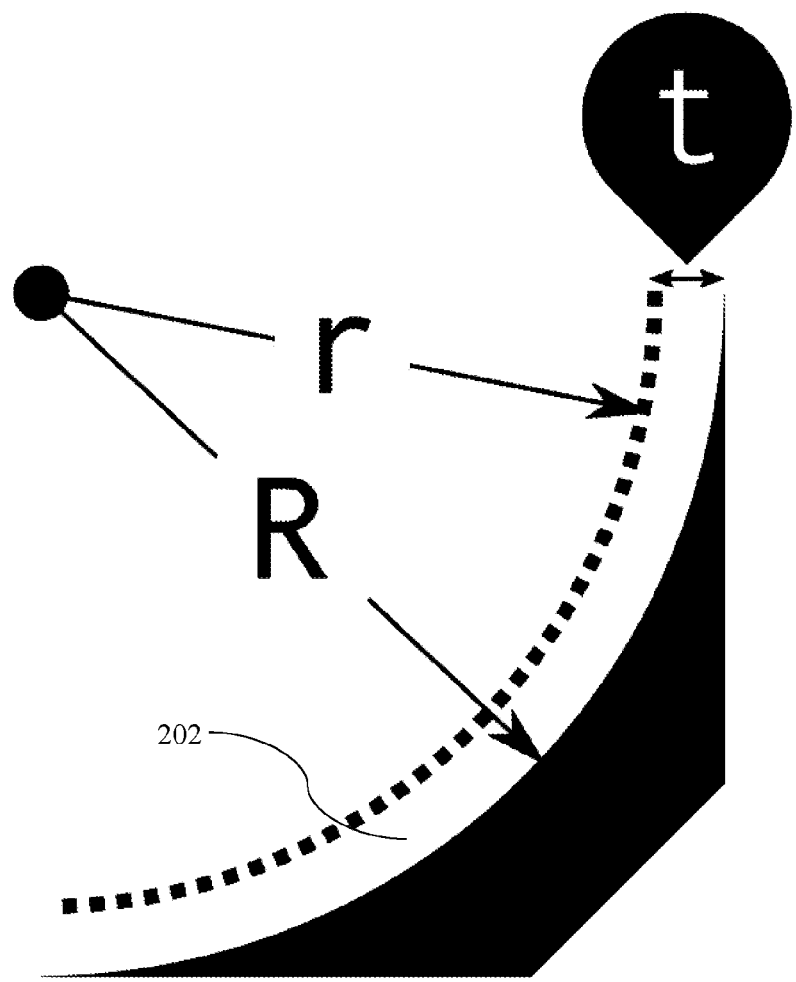
FIG. 9 shows a desired radius and a compensated radius based on a material thickness, in accordance with example embodiments of the present disclosure.

Each opposed portion (110a,b) (shown in FIG. 11) of the pair of opposed portions 110 of the edge profile 100 comprise an arcuate sub-portion 112 and a straight sub-portion 114 (shown in FIG. 4). For example, in some aspects, the arcuate sub-portion 112 can corresponds to a trace of a portion of a sine curve (e.g., from 0 to Pi/2). The arcuate sub-portion can optionally correspond to a trace of a Bezier curve (e.g., a cubic Bezier curve) that approximates a sine curve. In other aspects, the arcuate sub-portion 112 can correspond to a desired appropriate curve that can allow opposed portions 110 to be joined together (e.g., welded) without forming overlaps or gaps, wrinkles, protrusions of excess material, etc. In some aspects, the arcuate sub-portion 112 can correspond to a desired radius of the lower curved portion 202 of the formed custom polymer sheet product 200. In some aspects, the material thickness can be accounted for in determining the profile of the arcuate sub-portion 112 of the pair of opposed portions 110. For example, as shown in FIG. 9, the desired radius (R) of the lower curved portion 202 can be an input value into the edge profile determining device 1001, and the thickness, t, of the material can be subtracted from said input value to define a radius (r) that the arcuate sub-portions forms when they meet (or are joined) to define the corner 210 in the formed custom polymer sheet product 200 when installed. The straight sub-portion 114 can correspond to a length that the formed custom polymer sheet product 200 is to extend up the wall less the (or minus the) radius of the lower curved portion 202 (or height of the lower curved portion 202). That is, the straight sub-portion 114 can correspond to generally flat portion 204 of the formed custom polymer sheet product 200. The desired length that the formed custom polymer sheet product 200 is to extend up the wall can be an input value (e.g., wall flashing height) provided to the edge profile determining device 1001.

Referring to FIGS. 1-4, in some aspects, to permit bending of the polymer sheet product at the corner, the pair of opposed portions 110 of the edge profile 100 cooperate to define a relief cut 116 that extends from the arcuate sub-portions 112 of the pair of opposed portions 110 of the edge profile 100 opposite the straight sub-portions 114. That is, the relief cut 116 can extend inwardly into the area defined within (or bound by) the edge profile 100. The relief cuts 116 can prevent tearing when installers are handling and positioning the polymer sheet during installation.

Figure 7:
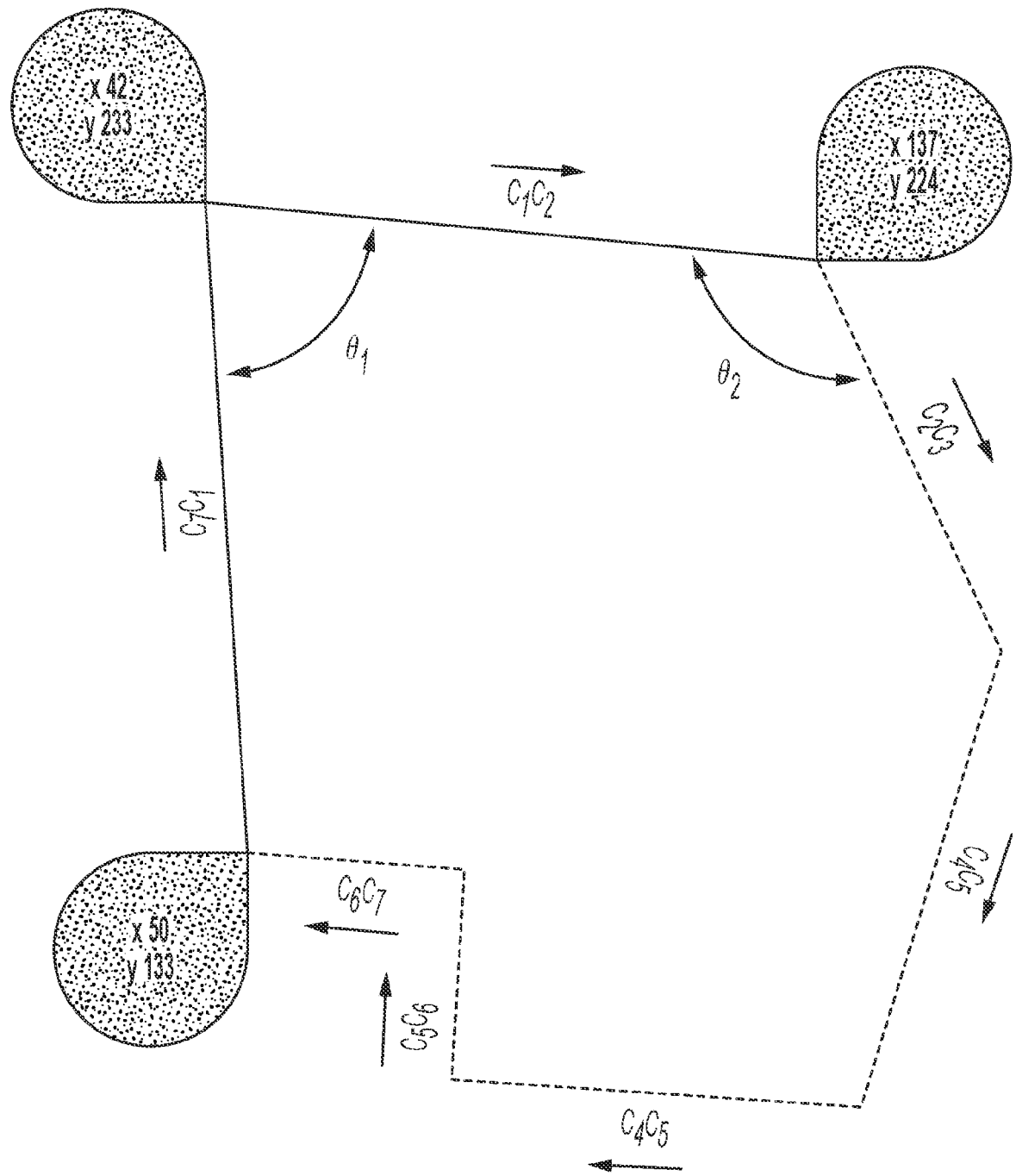
FIG. 7 shows vectors between the corners of the room, in accordance with example embodiments of the present disclosure.

Referring to FIG. 7, in some aspects, a first vector $C_1C_2$ parallel to a line between the first and second coordinates can be determined. A second vector $C_2C_3$ parallel to a line between the second and third coordinates can be determined. An angle $\theta_2$ can be determined between the first and second vectors. Said angle $\theta_2$ can correspond to the angle of the corner that the walls meet where at least a portion of the custom polymer sheet product 101 with the determined edge profile 100 is to be installed. The angle $\theta_2$ can be determined using linear algebra and trigonometry as a function of the first, second, and third coordinates. The dimensional and/or geometric characteristics of opposed portions 110 of the edge profile 100 corresponding to the corner indicated by coordinate $C_2$ can be determined based on the angle between the first and second vectors.

In various aspects, the angle $\theta_2$ between the first and second vectors can be acute, obtuse, or a 90 degree angle. In aspects in which the angle $\theta_2$ is a 90 degree angle, the trace of the Bezier curve can approximate a portion of a unit sine curve. In aspects in which the angle $\theta_2$ is an acute angle or an obtuse angle, the trace of the Bezier curve that approximates a portion of a sine curve can be scaled (e.g., stretched or compressed) from a unit sine curve to define the arcuate sub-portions 112 of the pair of opposed portions 110 of the edge profile 100.

Referring to FIGS. 2, 4, 6, 7, 10, and 11, in aspects in which the angle (between the first and second vectors, e.g., if the vectors define a corner angle at corner 94d) is greater than 180 degrees, it can be understood that a single sheet of material cannot be cut to form the corner 210 (e.g., 210d) of the formed custom polymer sheet product 200, as portions of the edge profile 100 projected onto a single sheet form an overlap 134. Accordingly, aspects in which the angle (between the first and second vectors or any two adjacent and intersecting vectors of the installation area 90) is greater than 180 degrees, the pair of opposed portions 110 of the edge profile 100 that are configured to meet to form a corner 210 (e.g., 210d) of the formed custom polymer sheet product 200 can comprise a first opposed portion 110a and a second opposed portion 110b that are respectively provided on a first segment 130 and a boot segment 132 that cooperate to form the corner 210d. In one aspect, the edge profile determining device 1001 (e.g., edge profile determining server) may be configured to automatically determine and/or separate the boot segment 132 (or 137) for the user. In another aspect, determination and/or separation of the boot segment 132 can be performed by an operator. For example, the operator can identify the overlap 134 and can select the geometry of the boot segment 132. For example, the boot segment 132 can have an edge 136 that forms a seam with the first segment 130. Alternatively, in some aspects, portion 137 can be used at the boot segment instead of the boot segment 132 along the edge 136. It is contemplated that if portion 137 is used as the boot segment, then the position of the first segment 130 can change accordingly to correspond to portion 137 used as boot segment. In some aspects, it can be desirable to form a seam at a particular angle (e.g., parallel or perpendicular to the direction of elongation of a material roll) in order to omit unappealing visual features of an oblique seam.

In some aspects, the edge profile determining device 1001 may be configured to allow for the boot segment 132 (or 137) to be flashed to a lower height imposed by millwork or cabinetry as compared to the flashing up a wall. For example, a 6" flash up the wall, but a 4" flash up cabinet toe kicks.

The method for determining pairs of opposed portions 110 of the edge profile 100 can be repeated for each corner 94 of the perimeter 92 of the installation area 90. That is, the edge profile determining device 1001 can determine, based on at least the plurality of coordinates corresponding to the plurality of corners of the perimeter of the installation area, dimensional and/or geometric characteristics of respective pairs of opposed portions 110 of the edge profile 100 that, in an installed position in the room, are configured to meet to form respective corners 210 of the formed custom polymer sheet product 200 installed at each respective corner 94 of the perimeter 92 of the installation area 90.

The edge profile 100 can further comprise linear segments 140 that connect sequential pairs of opposed portions 110 of the edge profile 100 to define an entirety of the edge profile 100. The edge profile determining device 1001 (e.g., edge profile determining server) can determine the linear segments 140 that extend between ends of the pairs of opposed portions 110 of the edge profile 100 of sequential corners of the custom polymer sheet product 101. In some aspects, the pair of opposed portions 110 of the edge profile 100 and the linear segments 140 can cooperate to define an entirety of the edge profile 100 of the custom polymer sheet product 101. In some aspects, the entirety of the edge profile 100 of the custom polymer sheet product 101 may be defined by the opposed portions 110, the linear segments 140, and the boot segments 132.

Referring to FIG. 4, each opposed portion (110a,b) of a pair of opposed portions 110 of the edge profile 100 can have a first end 115 at which the opposed portions (110 a,b) meet and an opposed second end 117. The opposed second ends 117 of the opposed portions (110a,b) of said pair of opposed portions 110 of the edge profile 100 can be connected by other portions of the edge profile (other than opposed portions (110a,b) of said pair of opposed portions 110), the other portions of the edge profile can comprise at least one linear segment 140 and/or other opposed portions 110. For example, the opposed second ends 117 of the opposed portions (110a,b) of said pair of opposed portions 110 of the edge profile 100 can be connected by a remainder of the edge profile (other than opposed portions (110a,b) of said pair of opposed portions 110). As shown in FIG. 4, said description differs when a boot segment is considered. When the custom decorative article includes a boot segment 132, one edge of the boot segment 132 defines one opposed portion of a pair of opposed portions 110 and a corresponding edge of the main segment defined the other opposed portion of the pair of opposed portions 110. The ends of said opposed portions of the boot segment and main segment may meet at the first ends 115 thereof when the boot segment is attached to the main segment during installation.

Figure 13:
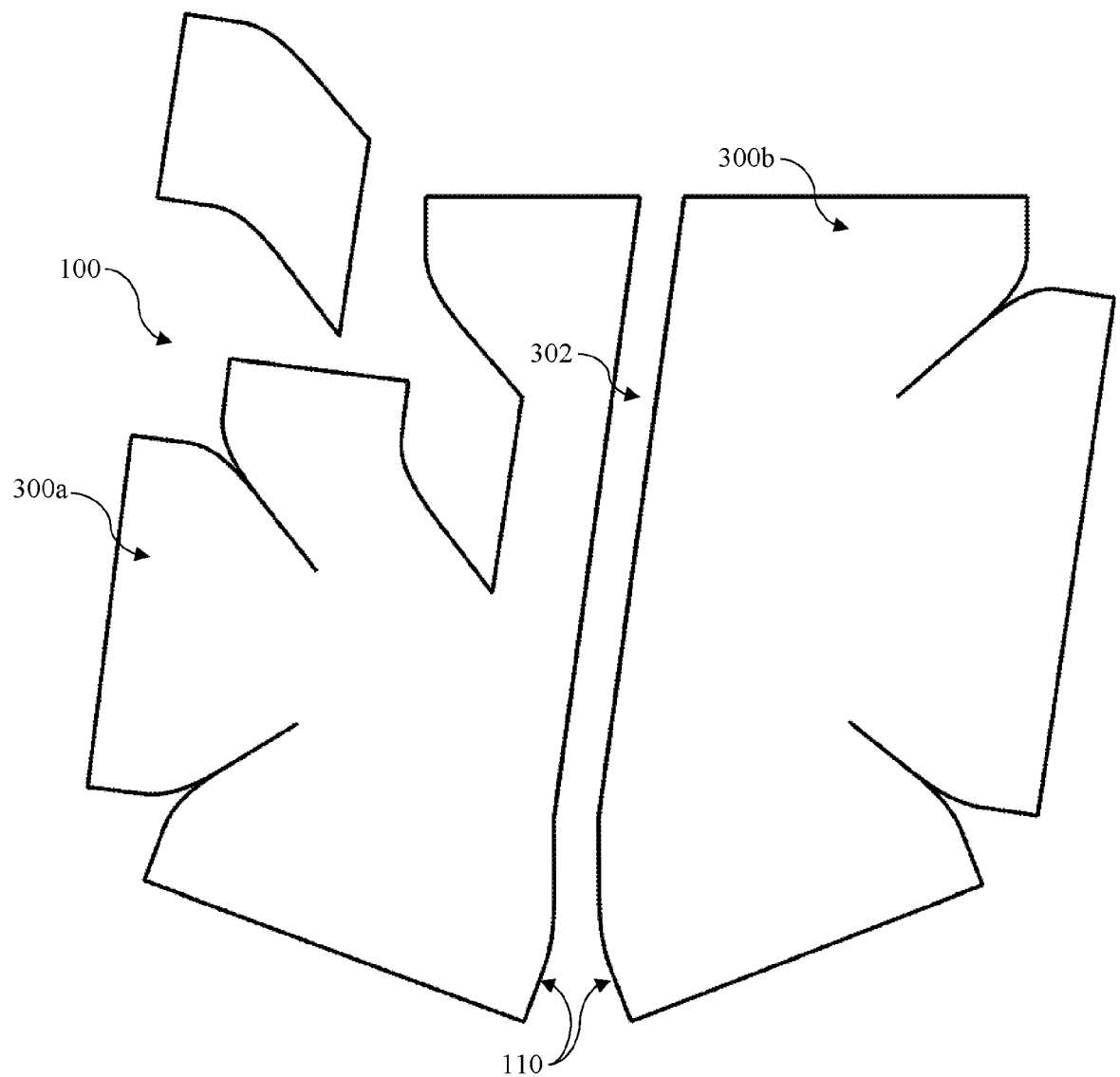
FIG. 13 shows an exemplary edge profile of a segmented custom decorative article comprising a first decorative article segment and a second decorative article segment, in accordance with example embodiments of the present disclosure.
Figure 14:
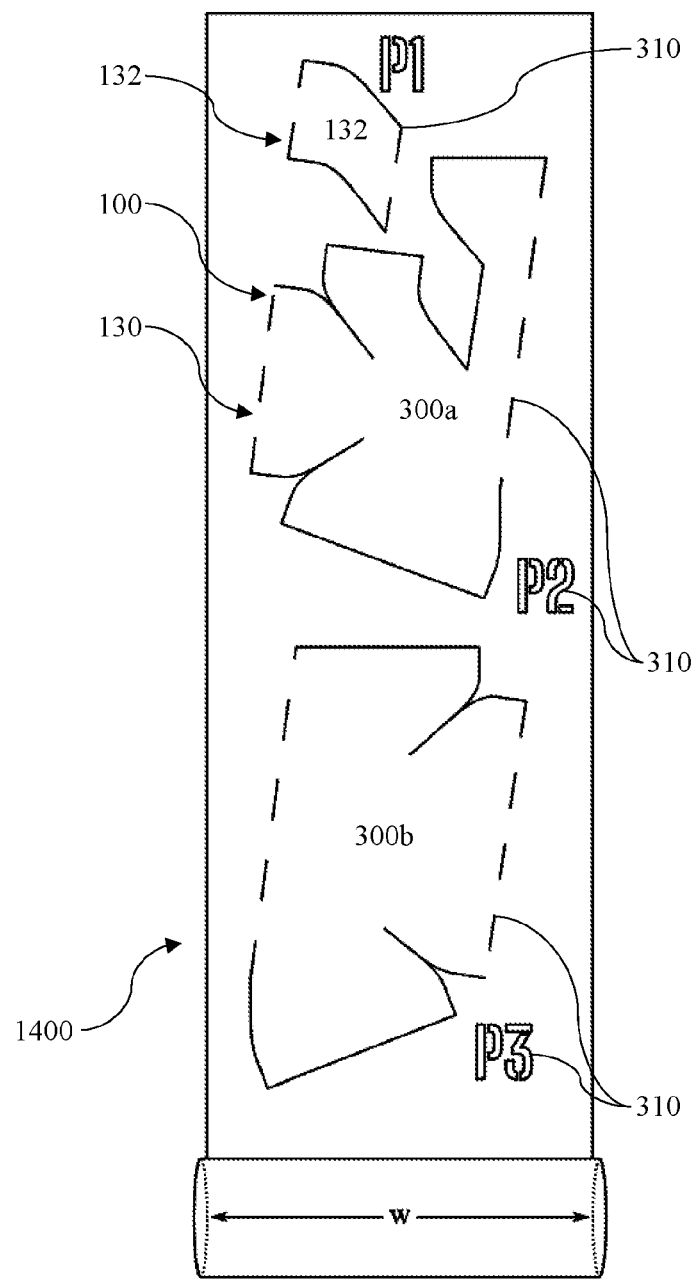
FIG. 14 illustrates the exemplary edge profile of FIG. 13 provided on a roll of a decorative article, in accordance with example embodiments of the present disclosure.
Figure 28:
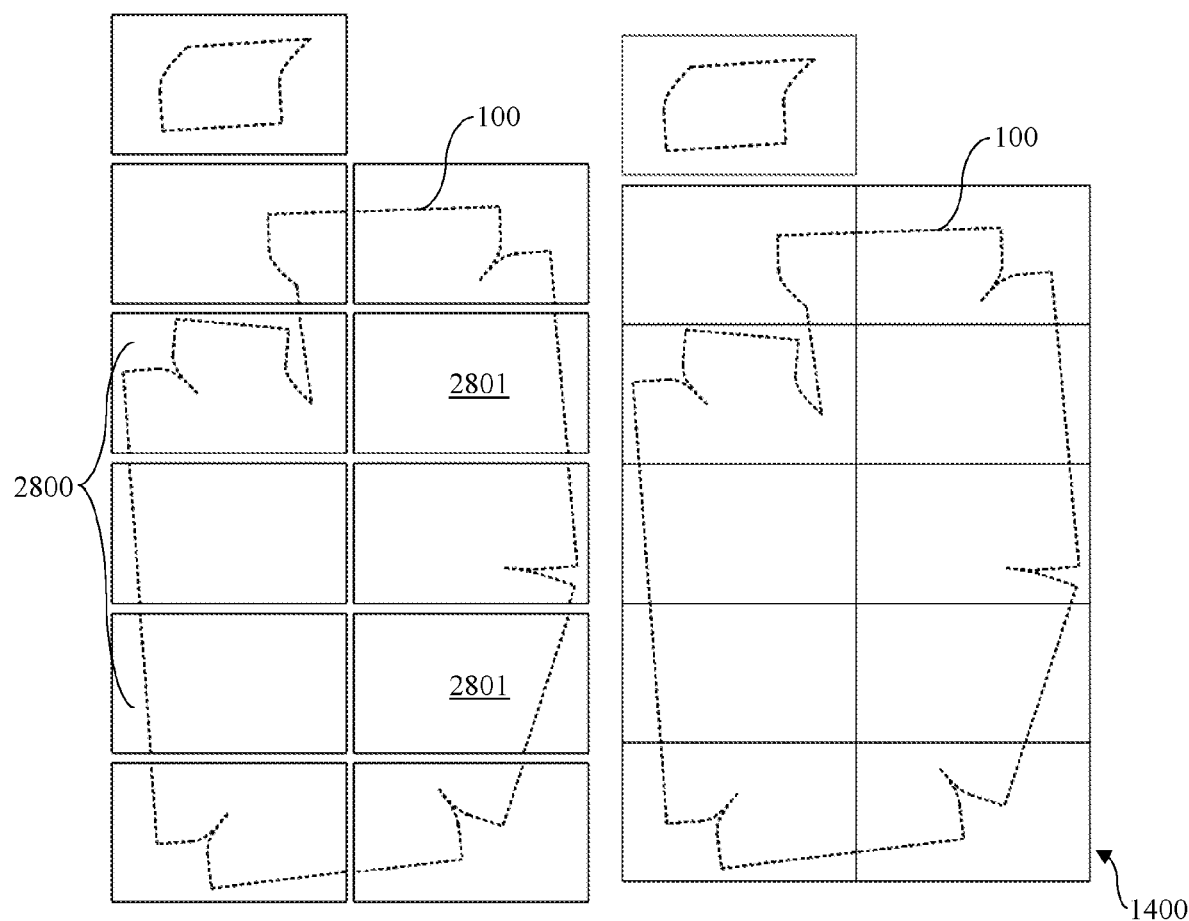
FIG. 28 shows an exemplary output of the edge profile determining device showing an edge profile along with seam lines for a decorative article having a tile pattern, in accordance with example embodiments of the present disclosure.

In some aspects, polymer sheet product (e.g., source polymer sheet product 1400 as shown in FIG. 14) may be readily available (in the market) in the form of rolls having a standard dimension, for example, a stock roll width, w. Hereinafter the source polymer sheet product 1400 may be interchangeably referred to as a source polymer sheet product 1400. In some other aspects, the source polymer sheet product 1400 may be available in the form of smaller tiles 2800 (shown in FIG. 28). Said source polymer sheet product 1400 having the stock roll width, w, may not provide sufficient material to form the entirety of the edge profile 100 of the custom polymer sheet product 101. For example, a stock roll can have a width about two meters. Thus, for a room having greater dimensions, the edge profile 100 may have to be divided into multiple polymer sheet product segments and/or said segments may or may not have to be spread between multiple source polymer sheet products 1400 (or 2800). The edge profile determining device 1001 can determine, based on the plurality of coordinates corresponding to corners 94 of the perimeter 92 of the installation area 90, whether a single source polymer sheet product 1400 having a given stock roll width can provide sufficient material to form/generate the entirety of the edge profile 100 of the custom polymer sheet product 101. If the custom polymer sheet product 101 and/or the segments (300a,b) thereof cannot be formed from the single source polymer sheet product 1400, the edge profile determining device 1001 can distribute the edge profile 100 of the custom polymer sheet product 100 and/or the segments thereof across multiple source polymer sheet products 1400. In some examples, as illustrated in FIGS. 13 and 28, the edge profile 100 may be divided into multiple segments such as at least a first polymer sheet product segment 300a and a second polymer sheet product segment 300b. The different segments into which the edge profile 100 is distributed (e.g., the first and second polymer sheet product segments 300a,b or the polymer sheet tile product segments 2801) can meet at a linear intersection 302 and define respective portions of the edge profile 100 of the custom polymer sheet product 101. By segmenting the edge profile 100, the custom polymer sheet product 101 may be cut out from a single source polymer sheet product 1400 as shown in FIG. 14. In some aspects, three or more polymer sheet product segments can be determined and can be arranged to define the custom polymer sheet product 101. In one or more aspects, the segments (300a,b) or any segment that is not a boot segment 132 may be referred to as a main segment of the custom polymer sheet product 101 without departing from a broader scope of the present disclosure. In one or more aspects, the segments 300a and 300b of the main segment may be referred to as sub-segments of the main segment without departing from a broader scope of the present disclosure. In some aspects that include boot segments 132, the main segment (including sub-segments (300a,b)) and the boot segments 132 may together define the custom polymer sheet product 101.

Figure 29:
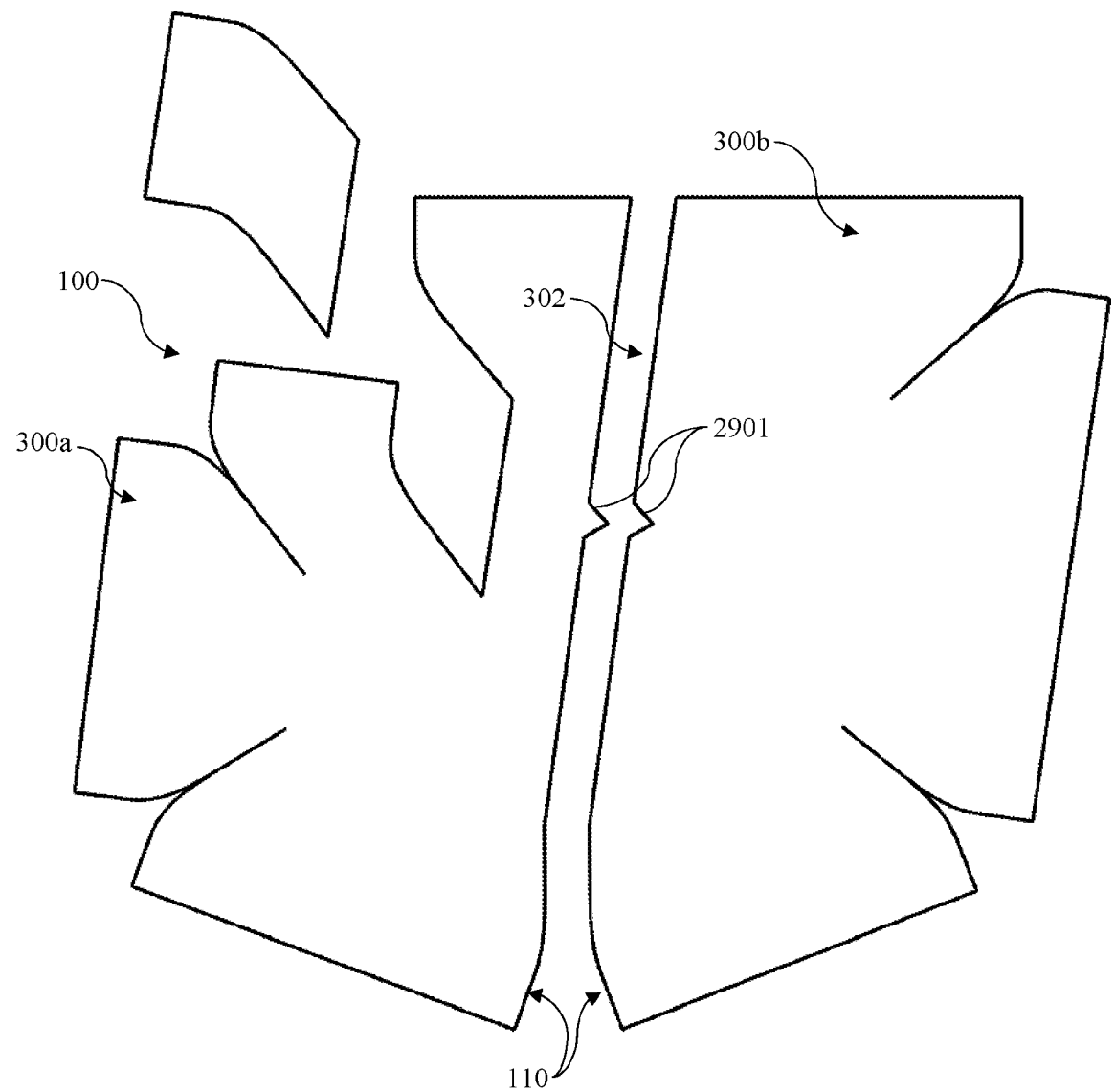
FIG. 29 shows an exemplary edge profile of a segmented custom decorative article comprising a first decorative article segment and a second decorative article segment with reference features, in accordance with example embodiments of the present disclosure.

In some aspects, the custom polymer sheet product 101 or in the edge profile 100 thereof may include one or more reference features 2901. In one example, the reference feature may be formed at a portion of the edge profile 100 corresponding to the linear intersections 302. The reference features 2901 may be configured to visually guide a user (e.g., installer) how to align the different segments of the custom polymer sheet product across which the edge profile 100 may be distributed and/or how to align the custom polymer sheet product (or segments thereof) with respect to the installation area (or features thereof such as the walls, corners, wall-floor joints, etc.) for ease of installation and/or minimizing installation time. In some examples, for quick alignment between different segments of the custom polymer sheet product (e.g., 300a,b), complementary reference tabs may be provided. For example, as illustrated in FIG. 29, a triangular reference tab may be formed one an edge of the segment 300a corresponding to the linear intersection 302 and a complementary triangular recess may be formed on an edge of the segment 300b corresponding to the linear intersection 302. The triangular tab (projection) of segment 300a may be configured to fit or couple with the triangular recess of segment 300b. During installation, an installer may quickly align the segments (300a, b) by aligning the triangular tab of 300a with the triangular recess of segment 300b. It is noted that triangular tabs and recesses are only one example of the reference features 2901 and are non-limiting. In other words, any other appropriate reference features may be used without departing from a broader scope of the present disclosure. In some examples, the edge profile determining engine/device 1001 or the client instance thereof may allow a user to select corners where they will snap or have already snapped a pair of chalk lines. These chalk lines intersect to form a cross hair. This same cross hair is also digitally represented in a display of the edge profile 100 (or custom decorative article 101) the edge profile determining engine 1001 or client instance thereof. The edge profile determining engine 1001 or client instance thereof then determines where each seam lays within the installation area with respect to the chalk line cross hair. The edge profile determining engine 1001 or client instance thereof will then relay information and measurements to the user where to snap chalk lines that will represent where each seam would lay in the installation area Optionally, the linear intersection 302 where the segments of the custom polymer sheet product 101 (e.g., first and second polymer sheet products 300*a, b* or polymer sheet tile products 2801) meet can terminate at an adjoining end of opposed portions 110 of the edge profile 100 that are configured to meet to form a corner 210 of the formed custom polymer sheet product 200. In some aspects, the linear intersection 302 can extend in any direction relative to the installation area 90 (e.g., longitudinally, transversely, or oblique to at least one wall of the room).

In some aspects, the edge profile determining device 1001 (e.g., edge profile determining server) can provide a user interface that displays a graphical representation of the installation area 90. Further, the edge profile determining device 1001 can overlay a graphical representation of one or more seam lines 160 (e.g., a single line, as in FIG. 4 or parallel lines, as in FIG. 25 or horizontal and vertical lines, as in FIG. 28) corresponding to linear intersections 302. The seam lines 160 can be spaced by or arranged based on the dimension of the source polymer sheet product 1400 (e.g., rolls with width or tiles with width and lengths, such as sheet width (e.g., six feet)). The user interface can further enable an operator to adjust the linear intersections 302. For example, the user interface can provide a button or other input device or method for rotating the parallel lines (e.g., 90 degrees). The user interface can further permit movement of the parallel lines. For example, the user interface can allow the user to shorten or lengthen (e.g., by clicking and dragging) spacing between adjacent parallel lines while not permitting spacing greater than the dimensions of the source polymer sheet product 1400 (roll, tiles, etc.). In this way, the user can move the linear intersection 302 to prevent the linear intersection from intersecting complex geometry such as a pair of opposed portions. In this way, the linear intersection 302, when installed, can extend between walls, rather than corners of the room.

In one example, the cuts of custom polymer sheet product 101 that define the edge profile 100, e.g., the pair of opposed portions 110 and/or the linear segments 140, boot segments 132, and the linear intersection(s) 302 between segments of the polymer sheet products 101, can be made using a router with a V-bit. In other words, all the cuts can be made, or instructions can be provided to a user to make the cuts, as bevel cuts (for example, at a 45-degree angle or any other appropriate angle). Making the cuts as a bevel cut prevents a user from having to perform the typically performed additional steps of grooving the seams after the polymer sheet product segments has been installed for creating a groove to melt the weld rod into the grooves to secure the seam edges. The bevel cut will automatically provide the groove at the seams, thereby being able to avoid the step of grooving. Bevel cuts may have additional advantages such as assisting with joining the opposed portions 110 to form the corner 210.

In some aspects, to determine the outline of the pair of opposed portions 110 of the edge profile 100 (e.g., at corner identified by coordinates C1), the edge profile determining device 1001 can determine a plurality of miter vectors (e.g., $M_1$, shown in FIG. 8) corresponding to respective corner 94 (e.g., three-surface corners) of the perimeter 92 of the installation area 90. Each miter vector of the plurality of miter vectors can have an angle that bisects the pair of opposed portions 110 of the edge profile 100 and, thus, bisects the angle of the corner 94 of the installation area 90 at which the corner 210 formed by the opposed portions 110 is to be installed. The angle of each miter vector can be determined using trigonometry and linear algebra based on the coordinates of the corner 94 (identified by coordinate C1) for which the miter vector is being determined and two adjacent corners ((C7, C2) or two adjacent points on either side of the corner identified by C1). The magnitude of the miter vectors can be a function of the angle of the corner of the installation area 90 at which the respective pair of opposed portions 110 are to be installed and the desired radius of the lower curved portion 202 of the formed custom polymer sheet product 200. The magnitude of the miter vectors can determine the scaling of the curve necessary for the arcuate sub-portions 112 (FIG. 4).

The dimensional and/or geometric characteristics of opposed portions 110 of the edge profile 100 can comprise mirroring respective traces across a respective miter vector of the plurality of miter vectors to define the pair of opposed portions 110 of the edge profile 100. For example, a first opposed portion 110*a* of the edge profile 100 can be determined as described herein, and the second opposed portion 110*b* of the edge profile 100 can then be determined by mirroring the first opposed portion 110*a* over the miter vector.

Figure 6:
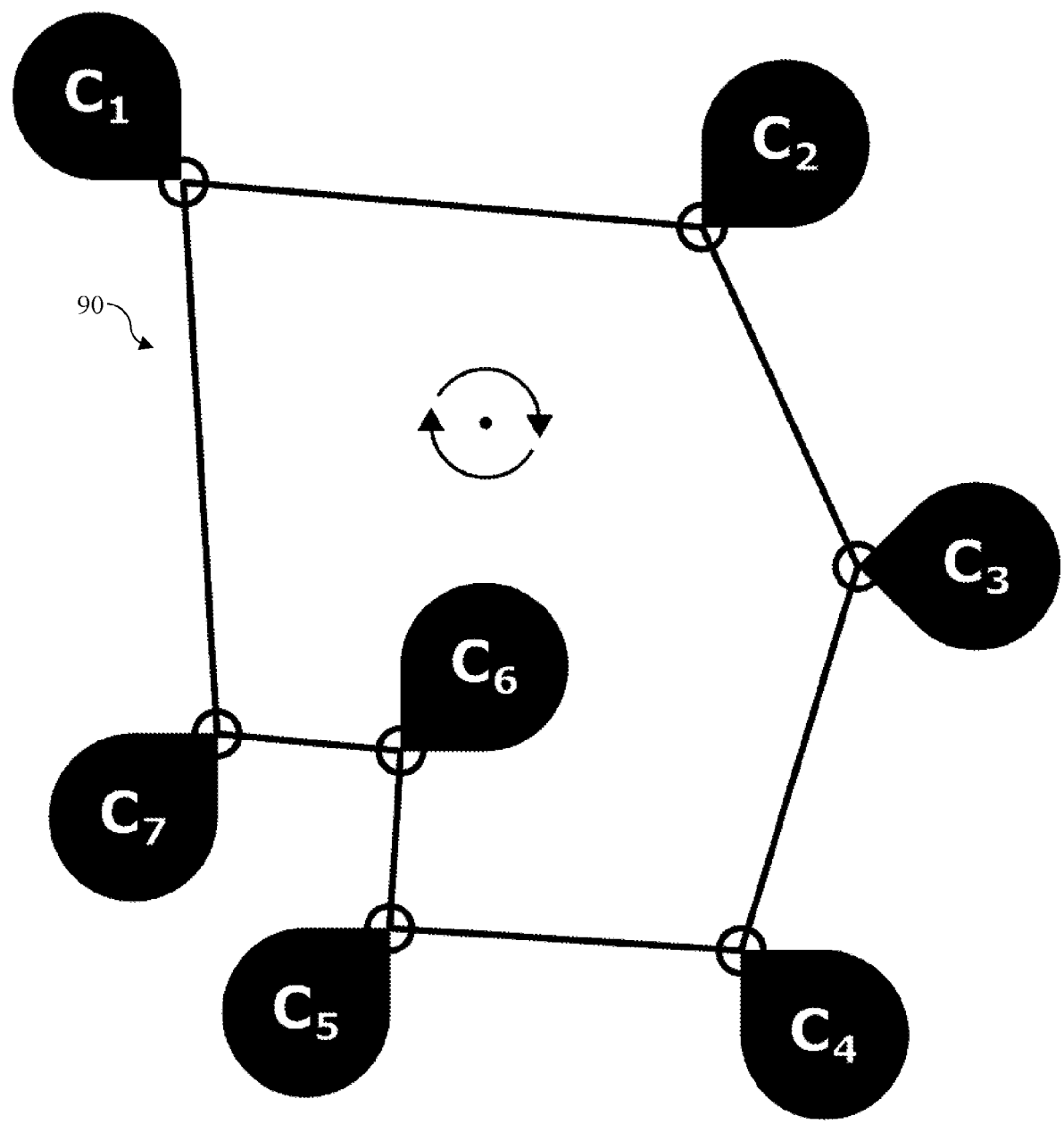
FIG. 6 shows an exemplary profile of an installation area of a room to receive an exemplary custom cut decorative article, showing identified corners of the room, in accordance with example embodiments of the present disclosure.
Figure 8:
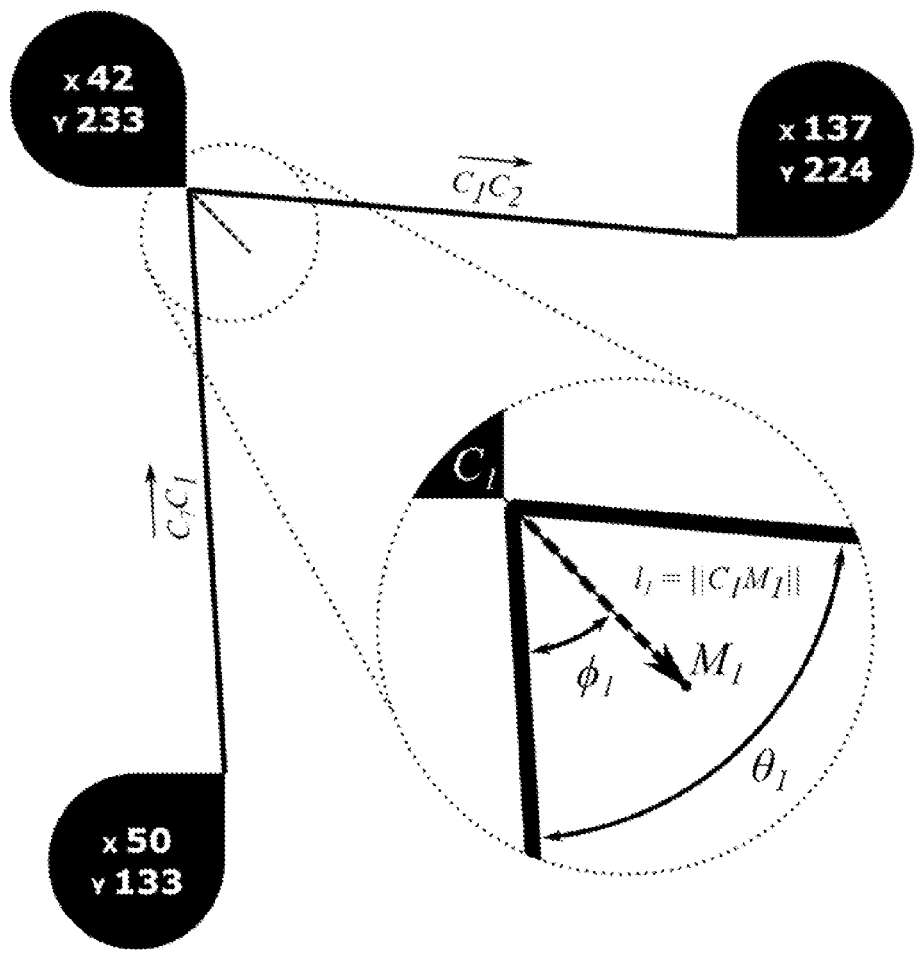
FIG. 8 shows a miter vector for one corner of the room, in accordance with example embodiments of the present disclosure.

FIGS. 6-12 illustrate an example method for determining the edge profile 100 of an example room having the geometry shown in FIG. 6. Referring to FIG. 6, based on a room scan, a plurality of corners can be identified. The corners can be arranged in sequence (e.g., moving clockwise around the room, following the wall, from corner to corner). Referring to FIG. 7, vectors between sequential corners can be determined. Referring to FIG. 8, a miter vector (e.g., $M_1$) can be determined for each corner. The miter vector can bisect the corner. Thus, the angle of the miter vector can be a function of the coordinates of the corner and two adjacent corners of the room into which the custom polymer sheet product 101 is to be installed. The miter vector can have a magnitude that is a function of the angle of the corner and the desired radius of the lower curved portion 202 (e.g., cove) of the custom polymer sheet product 200. Referring to FIG. 10, the pairs of opposed portions 110 of the edge profile 100 can be determined as a function of the angle and magnitude of the miter vector, and straight lines (linear segments 140) can extend between sequential pairs of opposed portions 110 to define the edge profile 100. Referring to FIGS. 10 and 11, areas of overlapping portions 134 of the edge profile 100 can be identified, and the edge profile 100 can be broken into a first segment 130 and a boot segment 132. FIG. 12 illustrates how the custom polymer sheet product 101 with the determined edge profile 100 can be made into a formed custom polymer sheet product 200.

In some aspects, the custom polymer sheet product 101 and segments thereof can be cut can be cut out from a source polymer sheet product 1400. For example, in some aspects, the edge profile 100 can be provided to a cutting facility or device (e.g., a facility with a computer numerical controlled (CNC) cutter) that can cut out the custom polymer sheet products 101 and/or segments thereof from the polymer sheet products 1400. In said aspects, the custom polymer sheet product 101 can be cut out from the source polymer sheet product 1400 at the factory and shipped to the customer.

In some aspects, and with reference to FIG. 14, the edge profile 100 that defines the custom polymer sheet product 101 may be marked on (using markings/indicia 310) or provided as perforated cuts in the source polymer sheet product 1400 so that the custom polymer sheet product 101 and/or segments thereof (300*a, b*) can be retained within the source polymer sheet product 1400 when shipped, and can be cut out on-site. Some of the markings/indicia 310 made on the source polymer sheet product 1400 (e.g., printed on a back of the sheets, provided as perforated cuts) may be to provide an installer with guidance on the different segments of the custom polymer sheet product 101, how the segments align with each other, how the segments align with and where the segments are to be placed in the installation area 90, etc., Also, an installer may use the markings/indicia 310 as a guide to make cuts, e.g., to cut out the custom polymer sheet product 101 and/or segments thereof on-site. In some examples, the markings/indicia 310 or cuts may be made using robots that can drive and cut or drive and mark using a gantry or drivetrain system-based platform. In some examples, the markings/indicia 310 may be digitally printed on the source polymer sheet product 1400 or using a pen on a gantry system. In some aspects, the markings/indicia 310 may be erasable or permanent, and/or visible or invisible. In some aspects, instead of making the markings/indicia 310 directly on the source polymer sheet product 1400, a paper template of the edge profile 100 that defines the custom polymer sheet product 101 may be provided along with the source polymer sheet product 1400. In said aspects, the paper template may be overlaid on the source polymer sheet product 1400 and used to cut out the custom polymer sheet product 101 and/or segments thereof from the source polymer sheet product 1400.

In some aspects, as described above, the edge profile 100 can be provided to a facility that prints the edge profile 100 on the source polymer sheet product 1400, and the custom polymer sheet product 101 can be cut on-site. In certain aspects, the edge profile can be provided to an on-site CNC router or to an augmented reality device for cutting out the custom polymer sheet product 101 at an installation site.

Accordingly, in various aspects, the edge profile determining device 1001 can output the edge profile 100 (that is, data representative of the edge profile 100) to a second computing device 30. In some optional aspects, the second computing device 30 can be associated with a printer that is configured to print the edge profile 100 of the custom polymer sheet product 101. In other optional aspects, the second computing device 30 can be associated with a cutting device. In one example, the cutting device may be a CNC cutting device. The CNC cutting device can be, for example, a laser cutter, an ultrasonic cutter, or a waterjet cutter. In some aspects, the CNC cutting device can be an on-site CNC router. One example of such a CNC cutting device is provided by SHAPER ORIGIN of San Francisco, CA. Optionally, the source polymer sheet product 1400 can comprise a visible pattern that can permit the on-site CNC router to spatially orient itself. The pattern can be, for example, a domino pattern that is available as open source and is used for orientation of portable CNC routers. In still further aspects, the second computing device 30 can be an augmented reality device (e.g., GOOGLE GLASS, augmented reality device (e.g., head mounted, wearable, etc.), etc.). For example, the augmented reality device or mixed reality device can display the edge profile 100 on the source polymer sheet product 1400 to assist an operator in cutting out the custom polymer sheet product 101 from the source polymer sheet product 1400. In particular, if the augmented or mixed reality device is a head mounted display system, the user can view the edge profile 100 on the source polymer sheet product 1400 as the user dons the head mounted display which in turn guides the user to make the cuts along the edge profile 100 on the source polymer sheet product 1400. The edge profile lines may not be actually present on the physical polymer sheet; rather, the outline of the edge profile 100 can be overlaid on the source polymer sheet product 1400 in the display or visual of the source polymer sheet product 1400 seen by the user donning the augmented or mixed reality device. In some examples, the custom polymer sheet product 101 and/or the segments thereof (e.g., 300*a,b*, 2800, and/or 132) may be printed/formed using a three-dimensional printer. In said examples, the custom polymer sheet product 101 will not have to be cut out of a source polymer sheet product 1400.

In another example, the second computing device 30 can be a device that can locate 3D objects and/or project laser images onto the object. In said example, the edge profile 100 may be provided to the device as CAD files (or similar files), and the device can locate the source polymer sheet product 1400 and/or project a laser image of the edge profile 100 onto the source polymer sheet product 1400, which then acts as a guide for the user to make cuts on the source polymer sheet product 1400 along the outline of the edge profile 100 that is laser projected onto the source polymer sheet product 1400. Such devices as mentioned in the example may include integrated vision system that can locate 3D objects and/or project laser images onto the object, or laser templating devices such as Virtek IRIS SPS, Virtek IRIS 3D, etc.

It is contemplated that the edge profile 100 can be cut into a source polymer sheet product 1400 (e.g., the custom polymer sheet product 101 can be cut out of a source polymer sheet product 1400) so that no factory edges are used. That is, the entire edge profile 100 can be cut into the source polymer sheet product 1400.

In some aspects, the opposed portions 110 of a custom polymer sheet product 101 may be welded on-site to make the corners 210 of the formed custom polymer sheet product 200. Accordingly, in some aspects, the polymer sheet products 1400 or custom polymer sheet products 101 can be delivered to an installation site in rolls for cutting out the custom polymer sheet products 101 and/or welding together the opposed portions 110 of the custom polymer sheet products 101 on-site.

In alternative aspects, the cuts (linear segments 140 and pairs of opposed portions 110) can be made at the factory and the pair of opposed portions 110 can be welded at the factory prior to delivery on-site. In this way, the formed custom polymer sheet product 200 can be dropped in place in the installation area (e.g., room). Said formed custom polymer sheet products 200 with pre-welded corners 210 can be delivered to an installation site in pods, in one example.

Figure 20:
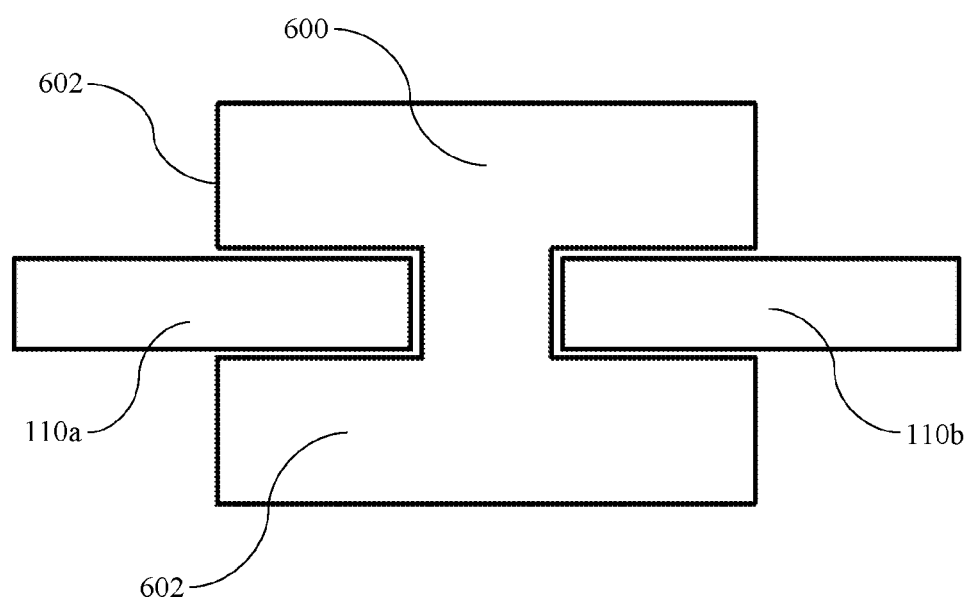
FIG. 20 shows a schematic diagram of an exemplary H-shaped support for adjoining portions of a decorative article at a corner, in accordance with example embodiments of the present disclosure.

Optionally, as illustrated in cross-section in FIG. 20, the opposed portions (110*a,b*) of the edge profile 100 of the custom polymer sheet product 101 can be received between legs 602 of an H-shaped support 600. The custom polymer sheet product 101 can further be welded or adhered to the H-shaped support 600. It is contemplated that the H-shaped support 602 can permit more rapid forming of corners 210 of the formed custom polymer sheet product 200. The H-shaped support can be elongate into and out of the page as shown in FIG. 20. It is noted that when the H-shaped support 600 is used, the edge profile (e.g., at least the pairs of opposed portions 110) may be adjusted or adapted to accommodate features of the H-shaped support 600 (e.g., thickness, shape, length, etc.).

Separate segments (e.g., 300a,b) of the custom polymer sheet product 101 can be welded at linear intersection 302 (seams) (shown in FIG. 13) to form a single continuous formed custom polymer sheet product 200 (e.g., flooring).

In some examples, the cut edges such as the opposed portions 110 of the edge profile 100 and the linear intersection 302 edges may be provided with polymer weld rods. That is, polymer weld rods may be applied onto said edges (opposed portions 110 and linear intersections 302) at the factory such that on-site, the end user or installer only has to hold the opposed portions 110 (or linear intersection edges of two segments of the custom polymer sheet product) together and apply heat to melt the polymer weld rod to form the welded corners (or linear intersection seams). In said example, the custom polymer sheet product 101 with pre-applied polymer weld rods at the opposed portions 110 (that form the corners) and/or the linear intersection edges 302 can be sent to the on-site location for the installer to then apply heat on-site to join said edges. In some examples, the polymer weld rod may include PCL (polycaprolactone).

Referring to FIGS. 3-4, the custom polymer sheet product 101 can optionally comprise sheet vinyl. The formed custom polymer sheet product 200 (i.e., the custom polymer sheet product 101 in its installed form) can have weldments at the corners 210 thereof (where the opposed portions 110 meet) and/or at the linear intersection seams 302 (e.g., between adjacent segments (300a,b) of the custom polymer sheet product 101). Accordingly, the formed custom polymer sheet product 200 (e.g., flooring) can prevent water or other fluids from passing through where the edges meet. The formed custom polymer sheet product 200 can thus inhibit fluid penetration.

Figure 30:
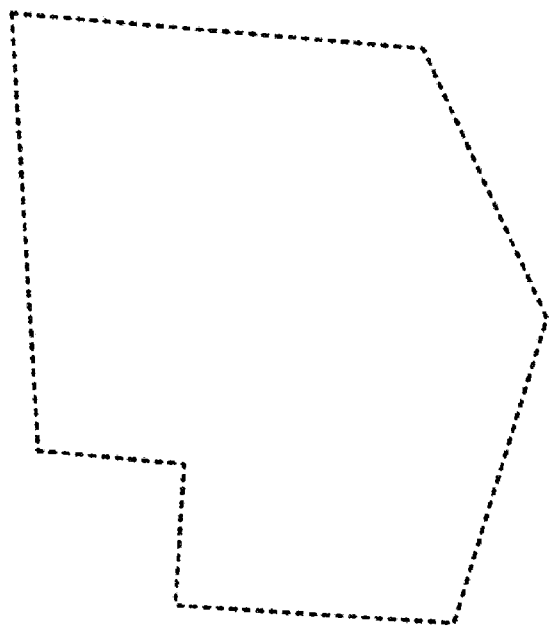
FIG. 30 shows a line scan of an installation area, in accordance with example embodiments of the present disclosure.
Figure 31:
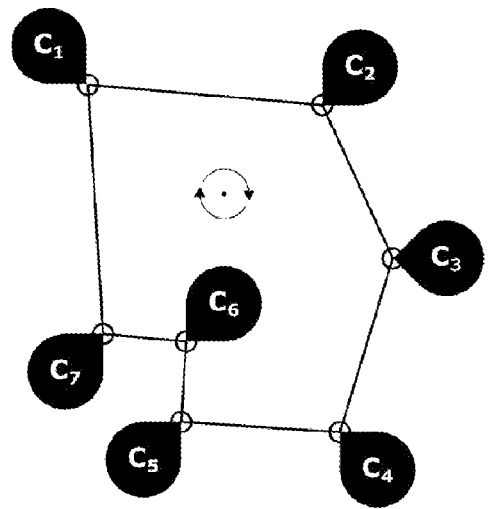
FIG. 31 shows all corners of the installation area of FIG. 30 indexed in the clockwise direction from a point within the room, in accordance with example embodiments of the present disclosure.
Figure 32:
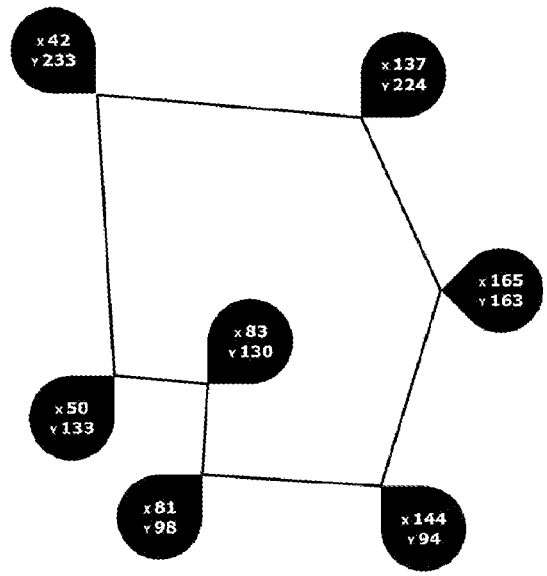
FIG. 32 shows 2D (x, y) coordinates assigned to each corner from a shared point of origin, in accordance with example embodiments of the present disclosure.
Figure 33:
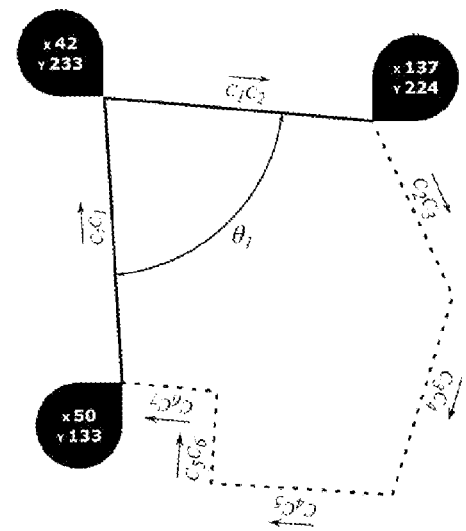
FIG. 33 illustrates the corner angle of Corner $C_1$ of FIG. 32 being calculated using the coordinates of $C_1$ and the neighboring coordinates of corners $C_7$ and $C_2$, in accordance with example embodiments of the present disclosure.
Figure 38:
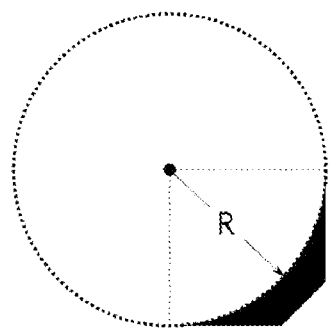
FIGS. 38-41 illustrate mathematical geometry used for obtaining curves of the edge profile (esp., opposed portions), in accordance with example embodiments of the present disclosure.

FIGS. 30-57 illustrate an example step-by-step process for providing an exemplary edge profile 100 and an exemplary custom polymer sheet product 101. Referring to FIG. 30, a line scan of the room can be performed. Referring to FIG. 31, all corners are indexed in the clockwise direction from a point within the room. Referring to FIG. 32, 2D (x, y) coordinates are assigned to each corner from a shared point of origin. Referring to FIG. 33, the corner angle of Corner $C_1$ can be calculated using the coordinates of $C_1$ and the neighboring coordinates of corners $C_7$ and $C_2$. Referring to FIGS. 34-36, a miter vector is generated for each corner. As illustrated in FIG. 35, r=R−t=radius at the surface of the sheet, accounting for thickness. As shown in FIGS. 34 and 37, the miter vectors generated at each corner result in an offset from each wall of length r. Referring to FIG. 38, the cove form is represented by one quarter of a circle cylinder.

Figure 39:
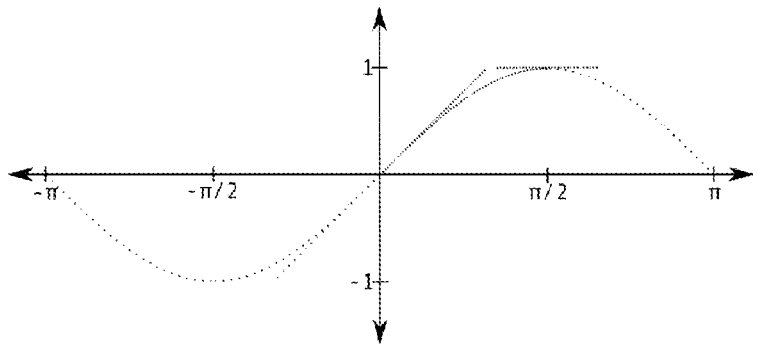
Figure 40:
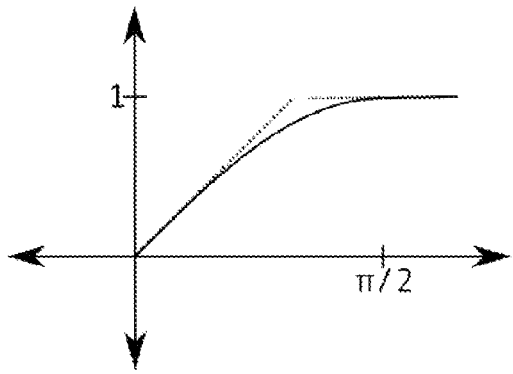
Figure 41:

Referring to FIG. 39, a Unit Sine Wave of period $2n$ holds geometric properties of a complete circle. A quarter of the Unit Sine wave from 0 to $\pi/2$ holds geometric properties of a quarter circle. Two tangent lines are also plotted with the equations y=x and y=1. Shown in FIG. 40, the line y=x is plotted from y=0 to y=1. The second line, y=1, is plotted from x=$\pi/2$ to an arbitrary length. Referring to FIG. 41, the quarter Unit Sine Wave and the line, y=1 of arbitrary length, are mirrored about the tangent line y=x. Such curves can meet to produce a 3D miter of radius 1 unit.

Figure 42:
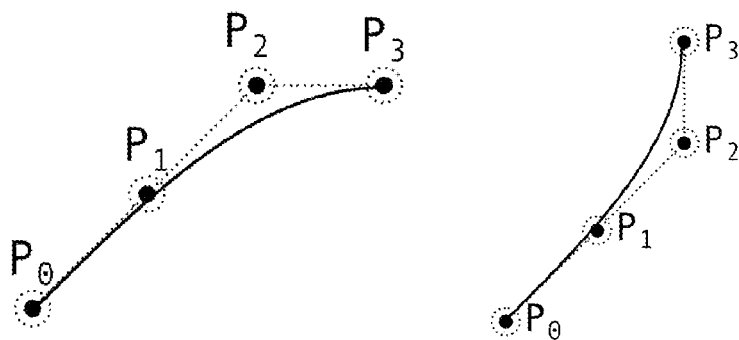
FIG. 42 shows a miter curve of four exemplary points, provided as a Bezier curve, in accordance with example embodiments of the present disclosure.
Figure 43:
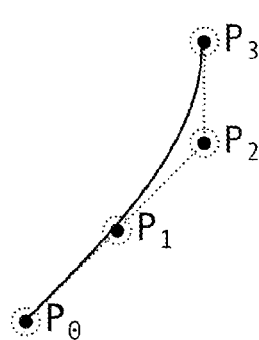
FIG. 43 shows the exemplary points of the Bezier curve mirrored over the line y=x, in accordance with example embodiments of the present disclosure.

As shown in FIG. 42, providing an example in which $P_9$=(0, 0), $P_1$=(0.51229947, 0.51229997), $P_2$=(1.0022983, 1), and $P_3$=(1.5707964, 1), a series of vector lines and curves cannot plot an exact Sine wave, but a cubic Bezier curve can produce a close approximation. The cubic Bezier curve illustrated above has four anchor points: $P_0$, $P_1$, $P_2$, $P_3$ These coordinates produce an approximation of a quarter Unit Sine Wave. As illustrated in FIG. 43, the quarter Unit Sine Wave can be mirrored about the tangent line, y=x. A cubic Bezier curve can be employed once again to produce a close approximation. The four anchor points ($P_0$=(0, 0), P=(0.51229997, 0.51229947). $P_2$=(1, 1.0022983), $P_3$=(1, 1.5707964)) produce an approximation of a quarter Unit Sine wave mirrored about the line y=x.

Figure 44:
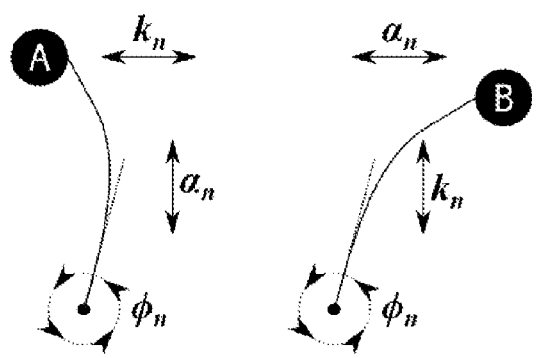
FIG. 44 shows the tangent line of the Bezier curves of FIGS. 42-43 being transformed (scaled and rotated) to match the magnitude and direction of $C_n$'s miter vector $\overrightarrow{C_n M_n}$, in accordance with example embodiments of the present disclosure.
Figure 45:
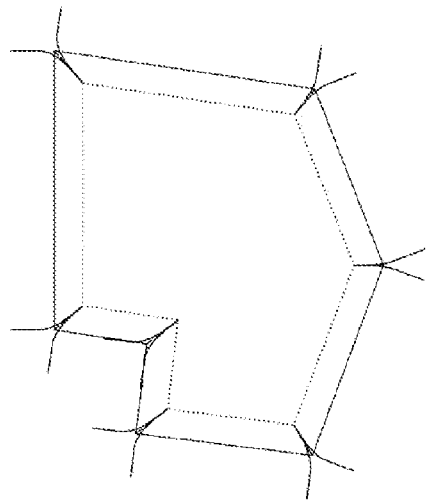
FIG. 45 shows the Beizer curves at each corner, having been transformed as necessary, in accordance with example embodiments of the present disclosure.

As shown in FIG. 44, the tangent line y=x from y=0 to y=1 can be transformed (scaled and rotated) to match the magnitude and direction of $C_n$'s miter vector $\overrightarrow{C_nM_n}$. That very transformation can then be applied to all the anchor points of each Bezier curve. Now the line y=1, of arbitrary length, can be scaled to have its magnitude equal h (wall cove height). After those transformations are made, the resulting geometry can be translated to sit on the terminal point $M_n$ of $\overrightarrow{C_nM_n}$ Once this operation is performed for each corner, the geometry shown in FIG. 45 is generated.

Figure 46:
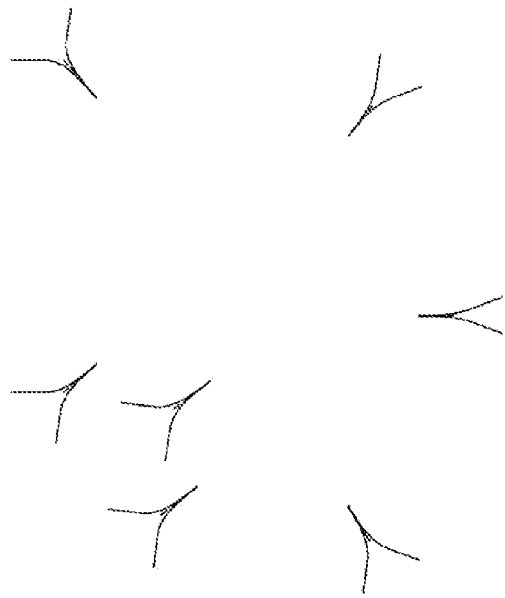
FIG. 46 shows the Bezier curves of FIG. 45, but with wall lines removed, in accordance with example embodiments of the present disclosure.
Figure 47:
FIG. 47 shows the miter curves being labeled A and B for each pair, in accordance with example embodiments of the present disclosure.
Figures 52, 53:
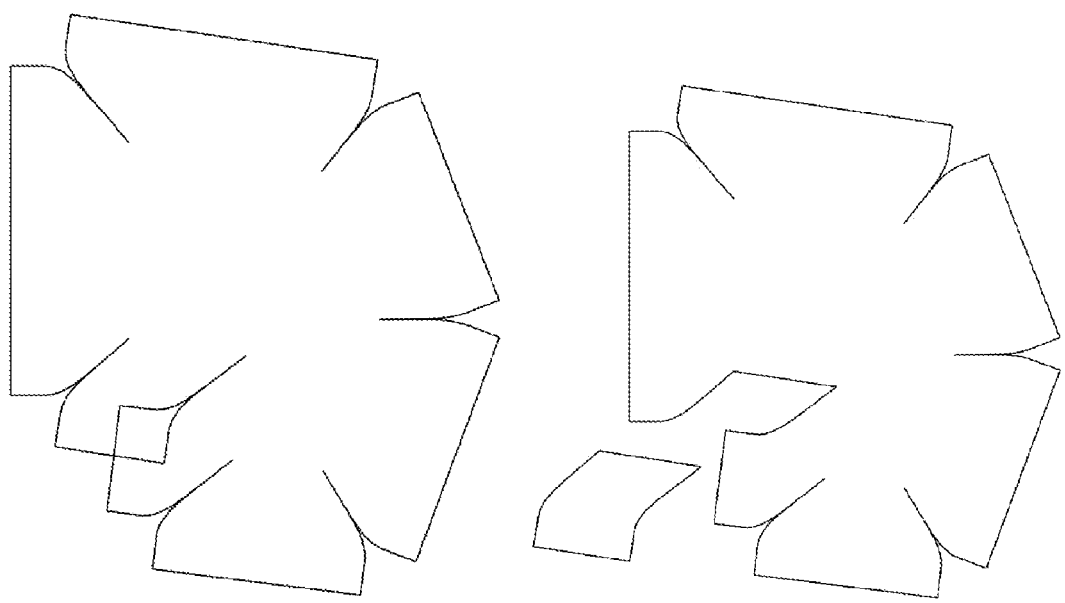
FIG. 52 shows the addition of relief cuts to the edge profile, in accordance with example embodiments of the present disclosure.
FIG. 53 shows extraction of a boot segment of the edge profile, in accordance with example embodiments of the present disclosure.
Figure 54:
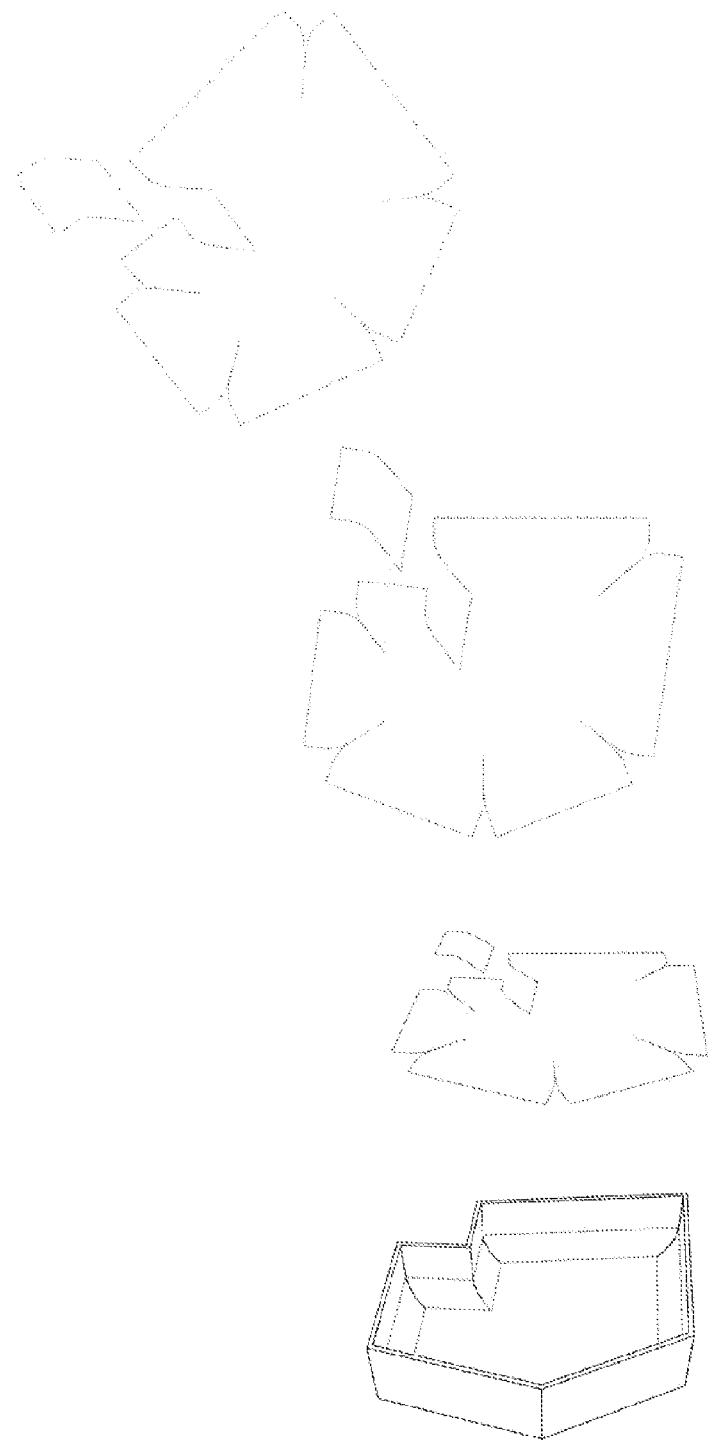
FIG. 54 shows a progression of the edge profile being cut to provide a custom decorative article, and the custom decorative article being formed into a formed custom decorative article, in accordance with example embodiments of the present disclosure.

The wall lines can then be removed, as shown in FIG. 46, and each set of miter curves are labeled A and B as illustrated in FIG. 47. Shown in FIGS. 48, and 49, the first curve labeled B is connected to the next neighboring corner's Curve A, in the clockwise direction. This is repeated at each corner, to provide the pattern shown in FIG. 50. Inside corners can produce erroneous geometry. This is fixed (e.g., manually, by a user selecting corners on a user interface, as described herein) by connecting curves labeled A to the neighboring corner's curve labeled A. This correction is illustrated in FIG. 51. To prevent tearing of the sheet during installation, relief cuts can be introduced into the geometry, shown in FIG. 52. Referring to FIG. 53, over lapping geometry can be corrected. For example, the computing device can permit, via the user interface, a user to click and drag a portion of the profile to pull out an overlapping section to form a boot segment. Referring to FIG. 54, the 2D geometry can be fitted into the room in which the initial line scan was performed.

Figures 55, 56, 57:
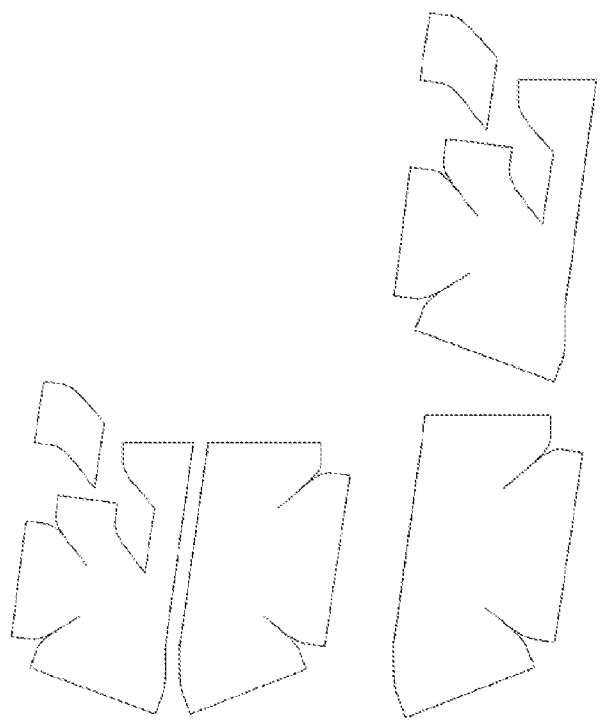
FIG. 55 illustrates an edge profile having two segments.
FIG. 56 illustrates the two segments of FIG. 56, rearranged for positioning on a roll.
FIG. 57 shows an edge profile provided as a perforated pattern on a roll of decorative article, in accordance with example embodiments of the present disclosure.

Referring to FIGS. 55-56, a seam may be required if the room's width is greater than the stock roll width of the sheet material. Referring to FIG. 57 in some aspects, the vinyl can be cut before arriving to the installation site. Optionally, perforated cuts can keep floor cuts attached to the greater roll for easier transport. Stencil lettering cuts can also be employed to ensure pieces are correctly identified for installation.

Decorative stair coverings can be different from floor covering panels used to cover floors. For example, stairs can require specialized pieces such as treads and risers that are pre-formed in the shape of a stair tread or riser to fit the respective stair tread or riser. Often, stair noses are sold separately from the stair tread, and the stair noses are specially manufactured with a pre-formed curved portion to fit over the curve of a stair nose. As such, a customer can order stair noses, risers, treads, etc., as separate stair finishing pieces in addition to the floor covering panels. Further, the different stair finishing pieces add to the SKUs and require additional storage space for the manufacturer. Since the pre-shaped stair finishing pieces (e.g., shaped as stair nose) are not flat, they consume space while shipping and may require special shipping. Also, specially manufactured stair finishing pieces can have higher cost associated therewith and may also require specialized labor for installation. Sometimes, stair finishing pieces that match the floor covering are not available. Inability to find stair finishing pieces that match the floor covering panels (e.g., color, style, etc.)

can prevent a cohesive layout through the house. For example, the customer may have to install carpet or stair finishing pieces that have a different look and feel from the floor covering.

In one example embodiment, the system 10 as described herein can be used to customize decorative articles such as floor covering panels 2101 (typically used as a decorative cover over floors 2100) for use as decorative stair coverings (e.g., to cover stairs: risers and treads including nose and edges). Said floor covering panels 2101 can include floor coverings that are flexible or pliable enough (upon application of a suitable force (human or mechanical)) to be rolled or bent for fitting around stair edges and/or a stair nose. Examples of such floor coverings that are flexible or pliable include, but are not limited to, soft surface floor coverings such as carpet; hard surface floor coverings such as flexible LVT, flexible laminates, and sheet vinyl, and the like.

Figure 21A:
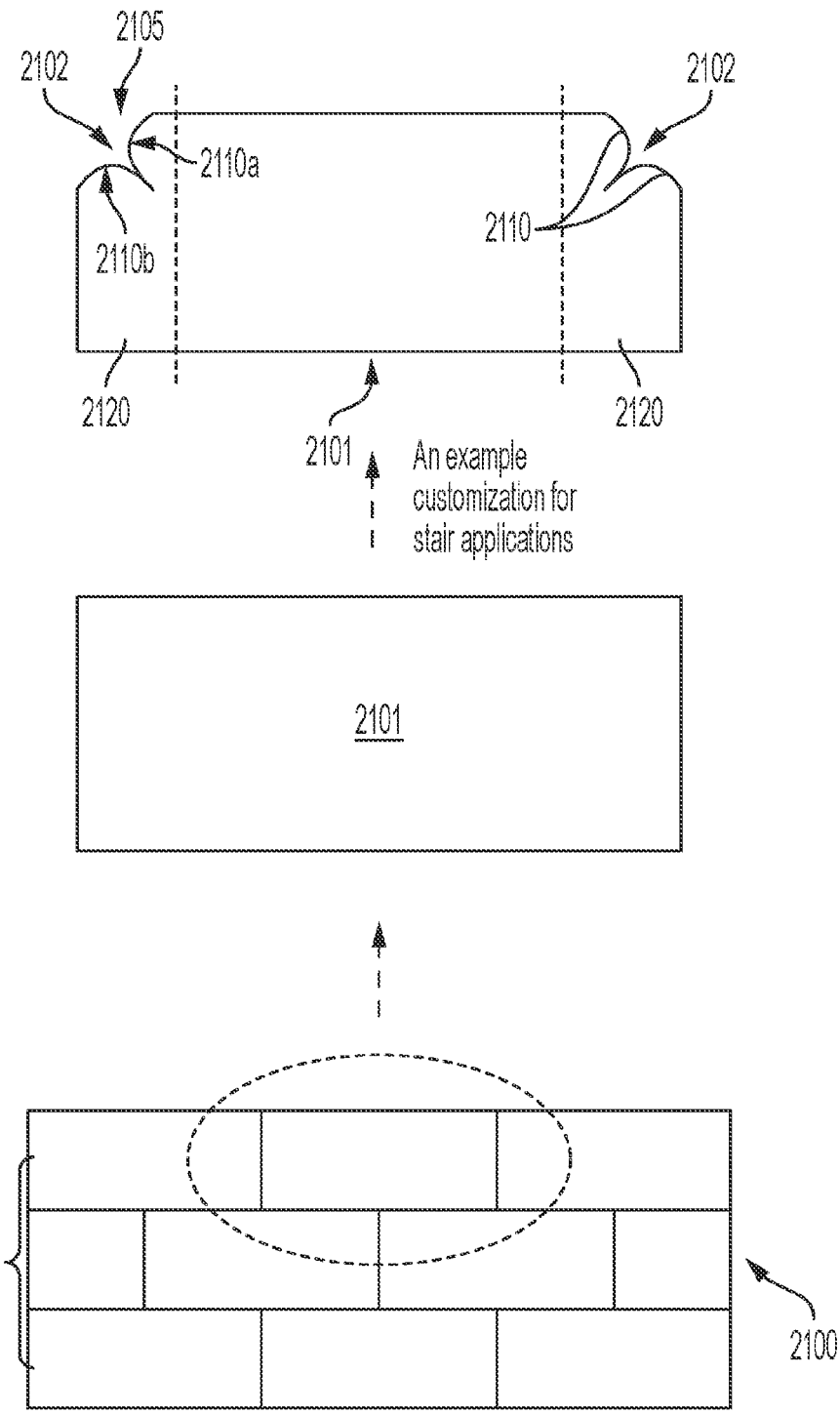
FIGS. 21A and 21B (collectively referred to as FIG. 21) show schematic diagrams of an exemplary customized decorative article that is customized for a stair application as disclosed herein.
Figure 21B:
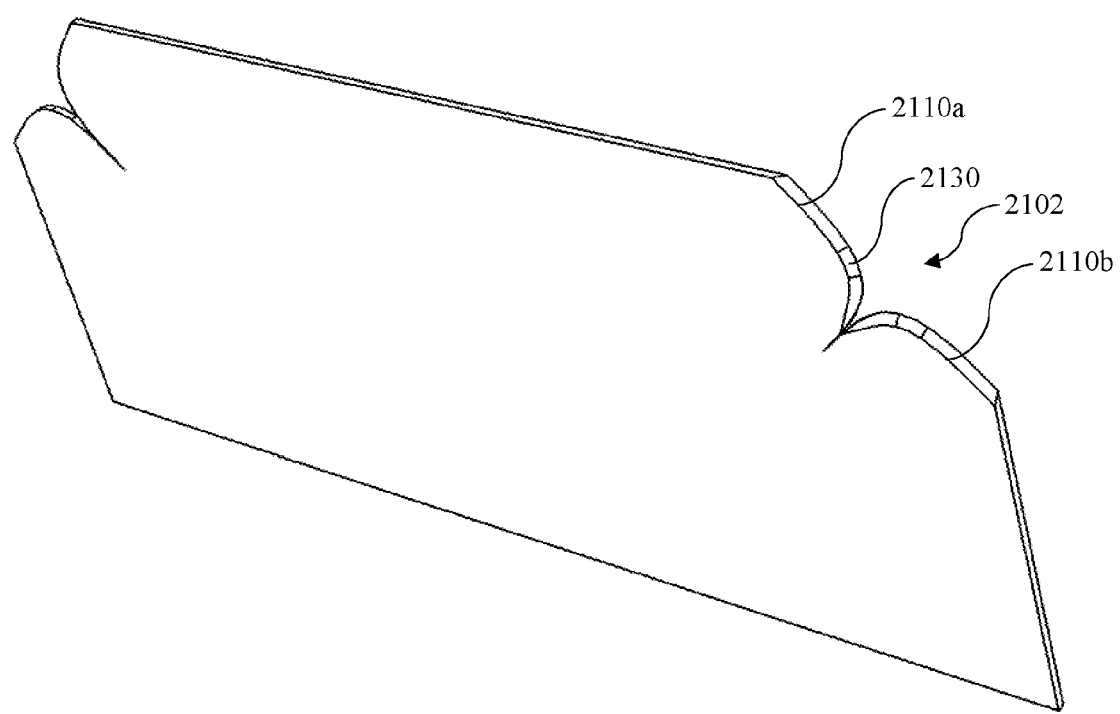

In said example embodiment, customizing the floor covering panels 2101 for use as decorative stair coverings can include providing cuts 2102 or providing traces (marking/indicia) for making the cuts 2102 in the floor covering panel 2101. The cuts 2102 may be formed adjacent one or more corners 2105 of the floor covering panel 2101, and the cuts 2102 can be defined by a pair of arcuate cut edges 2110. As shown in FIG. 21, the pair of arcuate cut edges 2110 can be opposing edges, and one arcuate cut edge 2110a of the pair of arcuate cut edges 2110 can be a mirror image of the other arcuate cut edge 2110b of the pair of arcuate cut edges 2110. The geometric and dimensional characteristics (e.g., angle and length) of the arcuate cut edges 2110 can be a function of the radius of stair nose, corners, and/or edges of the stair tread. In some examples, the system 10 and 500 can be configured to provide templates/pattern/traces of the pair of arcuate edges 2110 on the floor covering panel 2101 (e.g., at the bottom surface that faces the subfloor when installed or at the top surface) as a visual guide for a user to make the actual physical cuts on site.

In some examples, each arcuate cut edge (2110a,b) of the pair of arcuate cut edges 2110 can define a continuous arc or radius compared to the pair of opposed edges 110 (shown in FIG. 4) that have straight sub-portions 114. The continuous arc can be preferable for the decorative stair covering application and conducive to the shape of stairs (e.g., stair treads) because, unlike transitioning from floor to a flat wall, in a stair tread application, the floor covering panel 2101 can bend around the curve of the nose or edge of the stair tread and fold under (to the bottom surface) the stair tread. Having straight sub-portions 114 can result in an overlap when folded under to the bottom surface of the stair tread. In other examples, each arcuate cut edge (2110a,b) of the pair of arcuate edges 2110 can include a combination of arcuate sub-portions and straight (non-arcuate) sub-portions (not shown in drawings). In some other examples, each arcuate cut edge (2110a,b) of the pair of arcuate edges 2110 of the floor covering panel 2101 can be shaped (the curved/arcuate and/or straight sub-portions) based on the shape of the stair tread (flat portion, nose, edges, etc.) that is to be covered by the floor covering panel 2101 such that the floor covering panel 2101 covers the stair treads without overlap of one or more portions of the floor covering panel, wrinkles, gaping (gap at seams), etc. In some examples, the pair or arcuate cut edges 2110 can further include a relief cut 116 to permit bending at the corner as discussed above in association with FIGS. 1-4.

Figure 22:
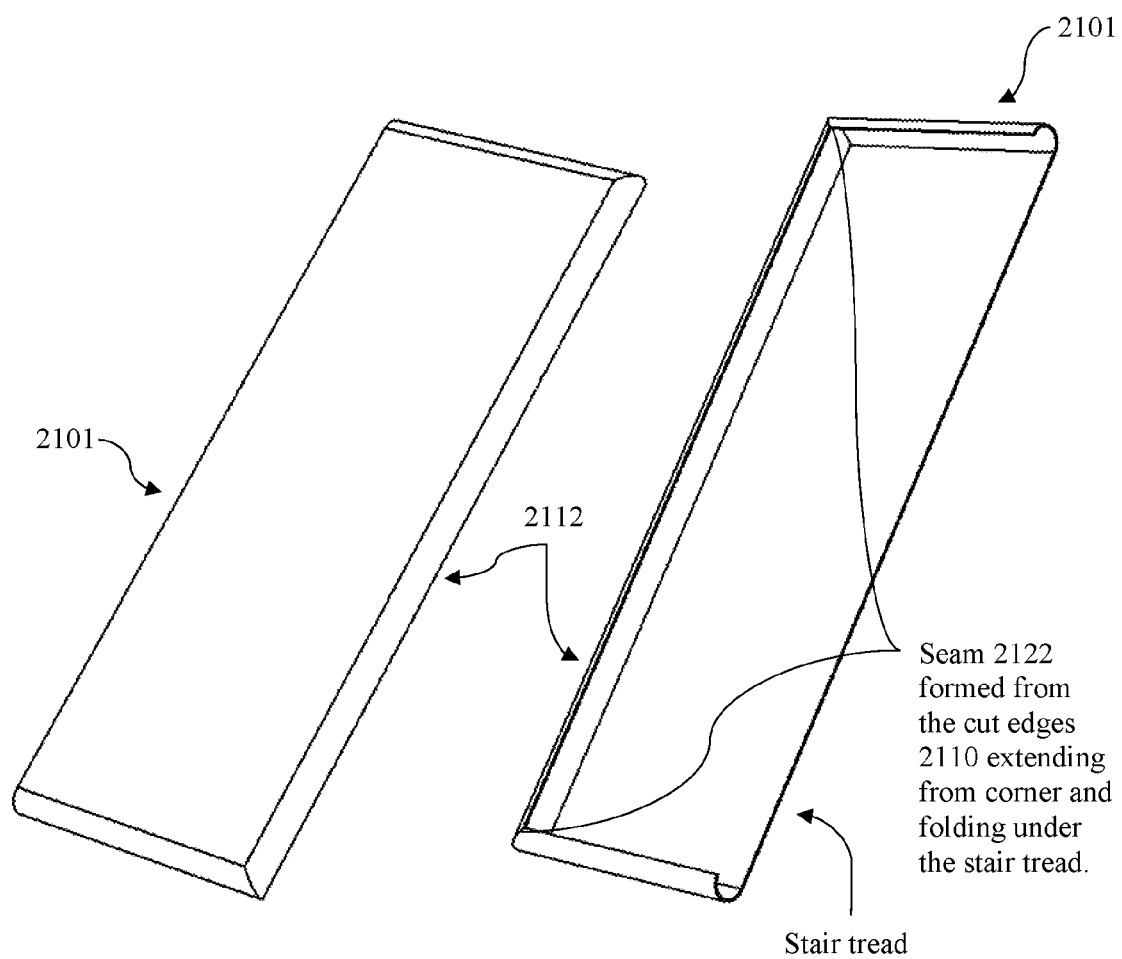
FIG. 22 illustrates the exemplary customized decorative panel of FIG. 21, with the customized decorative panel installed on a stair tread as disclosed herein, in accordance with example embodiments of the present disclosure.

The pair of arcuate cut edges 2110 can be shaped such that when the floor covering panels 2101 are installed on the stair treads, for example, the pair of arcuate cut edges 2110 at each corner 2105 of the floor covering panel 2101 meet together in a manner that the pair of arcuate cut edges 2110 abut each other without overlapping (or minimal overlap such as overlap of the exposed face 2130 of the cut edges) and (a) a portion thereof forms a seam 2122 covering the corner of the stair tread, and (b) another portions thereof folds under the stair tread. The seam 2122 can be formed along the corner of the stair tread and extend to the bottom of the stair tread as shown in FIG. 22. The portion of the floor covering panel 2101 that folds under the stair tread can be secured under the stair tread with adhesive, staples, the riser, or any other appropriate bonding or securing mechanism. Securing the floor covering panel 2101 under the stair tread can hold the seam edges and can secure the seam 2122 in place. In some examples, additionally, the seam 2122 can be covered by using chemical welding, markers, etc., for a more aesthetically pleasing look.

In particular, the floor covering panel 2101 can be customized such that it can be used with open staircases (also referred to as cut stringer staircases) and/or enclosed staircases (also referred to as closed stringer staircases). Depending on the use, the cuts 2102 in the floor covering panels 2101 may or may not be utilized. For example, for use with enclosed staircases, portions 2120 of the floor covering panel 2101 with the cuts 2102 may be removed (cut out). The portions 2120 that can be removed are shown using dotted lines in FIG. 21. In another example, for use with an open staircase, a portion may be removed depending on whether the staircase is fully open or enclosed on one side. If it is enclosed on one side, the portion 2120 of the floor covering panel 2101 that is to be installed adjacent to the enclosed side of the staircase can be removed while the other portion 2120 can be left intact (e.g., with the cuts 2102). If the staircase is fully open (not enclosed on both sides), the portions 2120 may not be removed. Removal of one or more of the portions 2120 of the floor covering panel 2101 as described above can be done in the field. Traces assisting with removal of such portions 2120 in the field may be provided on the floor covering panel 2101. Alternatively, if the stair characteristics (dimensions, style, plan, etc.) are known, the portions 2120 can be removed at factory before shipping to the customer.

In one example, the cuts 2102 can be made or instructions may be provided to make the cuts 2102 at an angle (e.g., 45, 60, or any other appropriate angle) (not shown in drawings). That is, the cuts 2102 can be made as bevel cuts at an angle that minimizes the exposure of the face 2130 of the cut edges 2110 (which can cause the seam to stand out and may not be appealing to the eye) when the pair of arcuate cut edges 2110 meet to form the seams at the corners of the stair tread. The face of the cut edges can expose the color of the material of the floor covering panel 2101. The color of the material of the floor covering panel 2101 can be different from the color and/or design of the surface of the floor covering panel 2101. As such, an exposure of the face of the floor covering panel 2101 can stand out to the eye and distract from a clean visual appearance at the corners of the stair treads. A bevel cut can minimize the exposure of the face of the cut edges 2110. The bevel can may be made from the bottom surface of the floor covering panel 2101 to the front surface or vice-versa based on which cut would minimize the exposure of the face of the cut edges 2110 at the seam formed therefrom when installed.

In some examples, the floor covering panels 2101 can be wider than typical floor covering panels 2101 based on the width of the stair tread that needs to be covered. In other examples, the floor covering panels 2101 can be used only to cover the stair nose, e.g., in enclosed stairway applications. That is, in said other examples, the stair tread can be covered using two floor covering panels 2101—one to cover the stair nose and the other to cover the rest of the stair tread. In yet other examples, the floor covering panels 2101 can be made wide such that a single floor covering panel 2101 can be used to cover both the stair tread and riser. In said example where the floor covering panel is customized to cover both the tread and the riser, the cuts 2102 may not be made adjacent the corner. Instead, the cuts 2102 can be made along the edges as applicable. Also, in said example, boot segments may be included.

Floor covering panels 2101 customized using the system 10 as described above do not need to be pre-shaped with curves that fit stair noses. That is, they can remain flat and as such, can be stacked and shipped easily. Other advantages include, but are not limited to, having a cohesive layout through the house (same floor covering panels that were used to cover the floor can be used to cover stairs). That is, the system 10 can allow the same floor covering panel material that is used to cover the floors (e.g., subfloors) to cover the stairs, except that the dimensions of the floor covering panel can vary for the stair application.

In some situations, it can be advantageous to provide an individual with a way to capture geometry of a room (e.g., spatial coordinates of corners of the room) (installation area 90) in order to fit the room with a polymer sheet product for flooring material. For example, do-it-yourself (DIY) installers can be enabled to capture and provide room geometry and provide said room geometry to a supplier. The supplier can then provide marked (shown in FIG. 14) or pre-cut custom polymer sheet product (shown in FIG. 13) to the DIY installer for installation.

Figure 15:
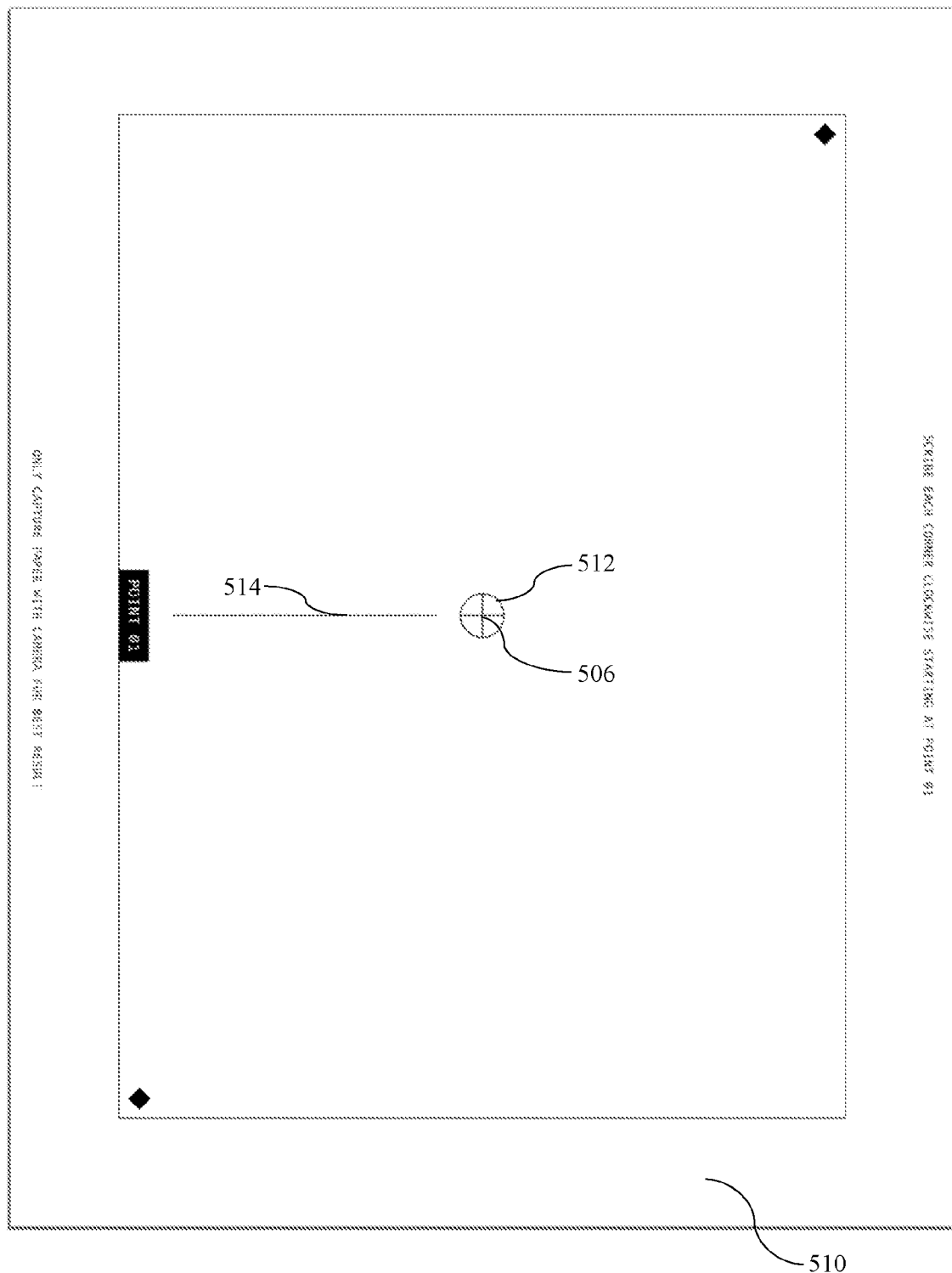
FIG. 15 shows a surface having indicia that marks an origin of an exemplary template as disclosed herein, in accordance with example embodiments of the present disclosure.
Figure 16:
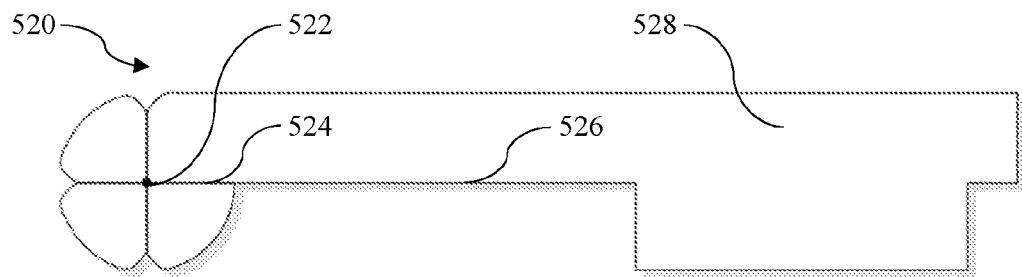
FIG. 16 shows an arm of the template of FIG. 15, in accordance with example embodiments of the present disclosure.
Figure 17:
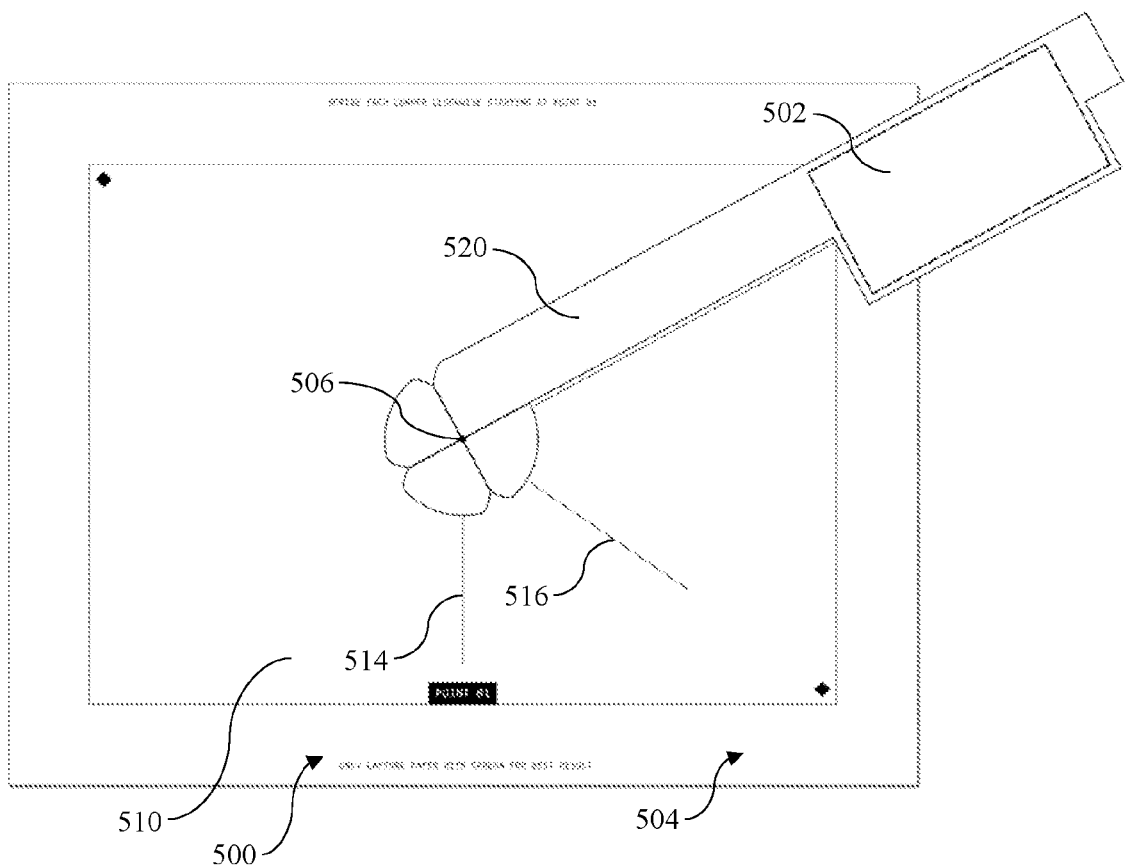
FIG. 17 shows a measuring system for determining the coordinates or geometry of an installation area as disclosed herein, in accordance with example embodiments of the present disclosure.

FIG. 17 illustrates an example measuring system 500 for determining an installation area 90 which in turn is used to determine an edge profile 100 for a custom polymer sheet product 101. Referring also to FIGS. 15 and 16, the measuring system 500 can comprise an optical distance measuring device 502 (shown schematically in broken lines) and a template 504 that orients the optical distance measuring device 502 relative to an origin 506.

The optical distance measuring device 502 (shown schematically as a box having a broken perimeter) can be, for example, a laser distance measuring device. Such devices are known household items that can be purchased at home improvement retail stores, such as, for example, the BOSCH BLAZE Laser Distance Measuring Tool.

The template 504 can comprise a surface 510 having indicia 512 that marks the origin 506 and an arm 520 having a first point 522 that is configured to be positioned at the origin 506. The optical distance measuring device 502 can be coupled to the arm 520, and the arm 520 can be configured to angularly orient the optical distance measuring device 502 relative to the origin 506 and radially offset the optical distance measuring device 502 relative to the origin 506 by a known distance.

In some aspects, the surface 510 and arm 520 can be made from paper or cardboard. In other aspects, the surface 510 and/or arm 520 can comprise polymer or any suitable material. In some optional aspects, the arm 520 can be sturdy enough to inhibit inadvertent tearing, folding, or breaking. Optionally, the surface 510 and arm 520 can be coupled together so that the arm 520 rotates about the origin 506. For example, a cylindrical fastener (e.g., a pushpin) (not shown in the Figures) can extend through the surface 510 and arm 520 and can permit rotation of the arm 520 relative to the surface 510 about the origin 506. In these aspects, it is contemplated that the indicia 512 that marks the origin 506 can comprise the fastener. In other aspects, the arm 520 can have a marker 524 that a user can visually orient relative to the indicia 512 of the surface 510. The arm 520 can define an edge 526 that extends radially from the origin 506 (or first point 522) so that it can be traced to mark the orientation of the arm 520. The arm 520 can further define at least one feature 528 (e.g., a shape) that indicates an orientation of the optical distance measuring device 502 relative to the arm 520 at which the optical distance measuring device 502 is properly aligned with the arm 520.

A method of using the measuring system 500 can comprise coupling the optical distance measuring device 502 to the arm 520. For example, the optical distance measuring device 502 can be taped (or otherwise adhered to) or strapped to the arm 520. The arm 520 can be oriented relative to the origin 506 and a reference line 514 of the surface 510 marking the origin 506 so that the optical distance measuring device 502 is aimed at a first corner of a room. With the optical distance measuring device 502 aimed at the first corner of the room, a first distance measurement can be obtained. For each additional corner of the room, a) the arm 520 can be oriented relative to the origin 506 of the surface 510 having indicia that marks the origin 506 so that the optical distance measuring device 502 is aimed at the respective additional corner of a room, b) the respective angle of the arm 520 can be marked on the surface 510 having indicia that marks the origin 506 (e.g., by tracing the edge 526), and c) a respective distance measurement can be obtained.

In some aspects, an edge profile 100 of a polymer sheet can be determined based on the distance measurements. For example, it is contemplated that the angles of the arm 520 and the respective distance measurements for each corner can be communicated to an edge profile determining device (e.g., edge profile determining server) that can determine the room geometry from the data. In some optional aspects, the edge profile 100 can comprise line segments extending between sequential points of the first corner and each additional corner of the room. Such an edge profile 100 can form a custom polymer sheet product 101 that does not extend up a wall (i.e., omitting a lower radius/curved portion 202 and a flashing 204 that extends up a wall). Accordingly, in some aspects, the system 10 can be used for providing custom cut flooring (determining an edge profile for flooring such as, but not limited to, carpet, LVT, hard surface rigid floors, etc.) for residential and commercial applications where flashing may not be required. In other aspects, the edge profile 100 can comprise pairs of opposed portions 110 that, in an installed position in the room, are configured to meet to form a corner 210 of the formed custom polymer sheet product 200 that extends at least partly up the walls. In some examples, the user may be provided with an option (e.g., in a web interface) to enter the cove radius and flashing height (wall) as input to provide an edge profile 100 which includes the cove and flashing. The cove radius and flashing height may be determined by the user using a suitable measuring tool. In other examples, the web interface/client instance could provide suggestions to the users for the cove radius and/or flashing height. In exemplary aspects, these suggestions can be made based on information obtained from other DIY users (crowdsourced), historical data, or machine learning/artificial intelligence where the computer learns and suggests what flashing height and cove radius works best in certain areas and situations. In other examples, the custom polymer sheet product 101 with an edge profile 100 that includes the cove and flashing may be pre-welded at the factory and transported to the installation site. In other words, the formed custom polymer sheet product 200 may be transported to the installation site. This way, the user or installer does not have to do any welding.

In some aspects, the system 10 can be used for providing custom cut flooring accessories and trim pieces (e.g., length and proper miter angle for cove former, quarter rounds, cove cap, sculpted base, base board, etc.). In some aspects, the system 10 can also be used in other flooring such as composite floors, LVT, etc. The measuring device 20 and/or measuring system 500 can be used to measure a room (corners) or determine a geometry (or other relevant features) of an installation area, input measurements corresponding to the geometry of the installation area to a software/web interface; and/or obtain room (installation area) geometry from the inputted measurements. The system 10 can use the geometry or related measurements to send custom cut flooring (LVT, carpet, etc.) to the customer. This avoids the user having to cut the floor to meet the measurements of the room (e.g., at edges). The system 10 can also be used to determine custom cuts of flooring for different patterns of installation, such as grid, offset, herringbone, diagonal, random, etc. In some examples, the installation pattern can also be printed on an underlayment sheet—not integrated with the floor cover/panel (typically placed under the floor cover for moisture barrier and/or sound insulation and underfoot comfort). Printing the installation pattern on the underlayment sheet can provide a visual guide to a DIY user on where to place the floor panels (full length and custom cut pieces such as flooring pieces that go along the edge of a room in a herringbone pattern installation, for example) and how to install the floors for different patterns. Printing the installation patterns on the underlayment can be useful for sheet vinyl, carpet tiles, and/or hard surface floors (e.g., engineered hardwood, resilient, composite, rigid, etc.), especially for installing pieces adjacent the edges of a room. In some examples, instead of printing the installation pattern on the underlayment sheet, said pattern could be provided via augmented reality, virtual reality, or mixed reality (virtually or digitally overlaid over the subfloor or underlayment through an augmented reality, virtual reality, or mixed reality interaction device).

Figure 18:
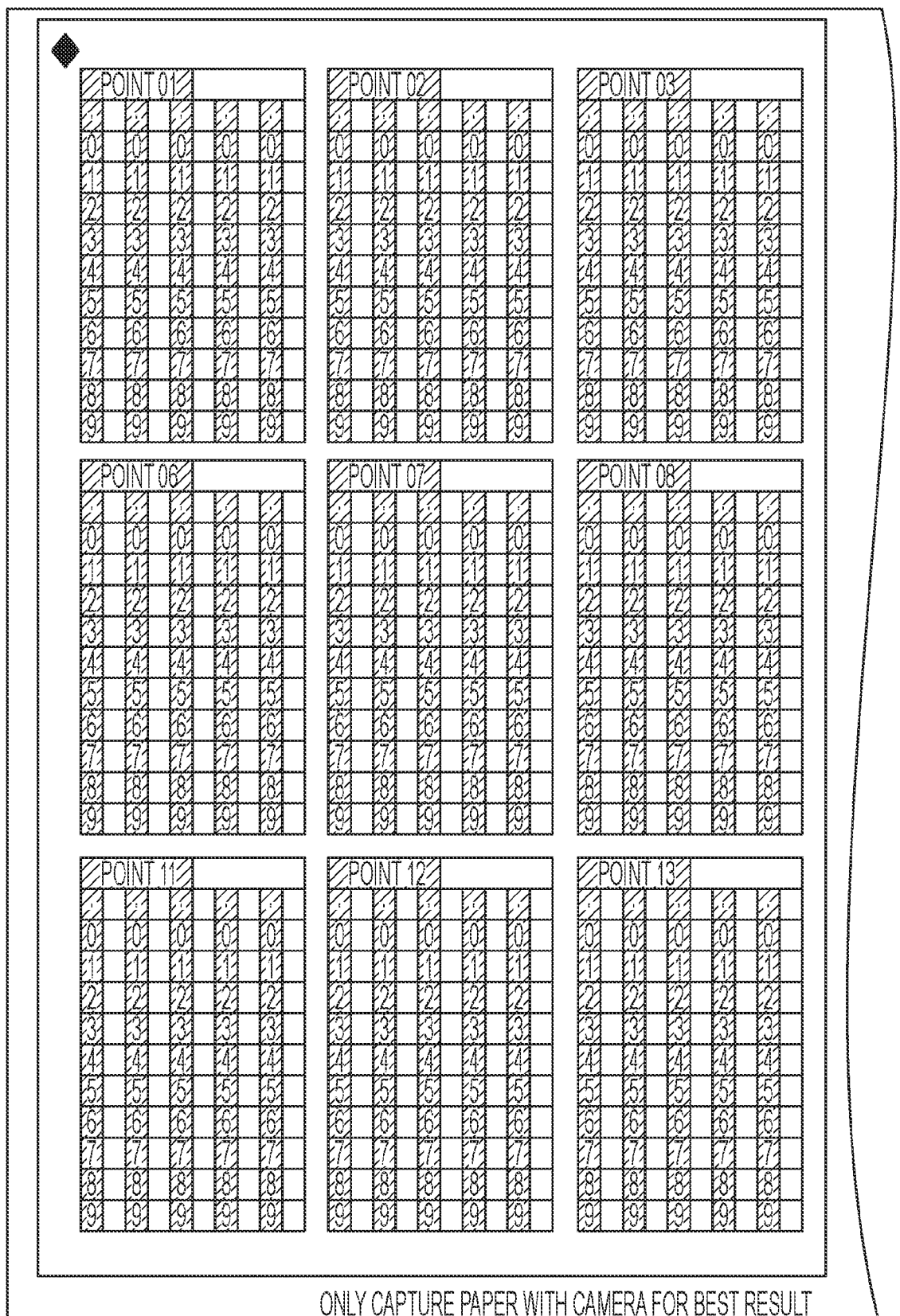
FIG. 18 shows an exemplary bubble sheet form communicating data acquired by the system of FIG. 17, in accordance with example embodiments of the present disclosure.

In one example, a user can provide the surface 510 with the reference line 514 and user-made markings 516 to a polymer sheet supplier or intermediary (e.g., as a scan or photograph). The user can further provide the corresponding distance measurements (e.g., as a bubble sheet, shown in FIG. 18, as a spreadsheet, or via any other suitable means). The distance measurements can be associated with the reference line 514 and the user-made markings 516. For example, it can be understood that the distance measurements correspond to the reference line 514 followed by the user-made markings 516 in sequential clockwise order (or counterclockwise order, depending on communicated specifications). In this way, the captured data can be communicated in polar coordinates to polymer sheet supplier or intermediary. In various aspects, the distance measurements can be provided on a sheet for receiving distance measurements obtained by the optical distance measuring device in a machine-readable format. For example the bubble sheet can permit a computing device to easily extract distance measurements.

In further aspects, a user interface (e.g., web interface) can be provided for a user to input said measurements. The web interface can provide step by step guidance on how to use the measuring system 500 (or the measuring device 20). In some optional aspects, the surface 510 need not be marked. In one example, the web interface can provide a step-by-step guide that can instruct a user to orient the arm in particular directions. The arm offset distance from the origin, angles 516, etc., may be preset (e.g., hard-coded in software). In some example embodiments, the web interface may be interactive. The web interface may be client-side instance of the backend server/edge profile determining device 1001.

In some aspects, a portable computing device (a smartphone or a stand-alone device configured for capturing the measurements as described herein) can be used as the optical distance measuring device 502 provided the portable computing device has the capability for optical distance measurements (or distance and angle measurements or scanning and generating scan lines). In these aspects, the portable computing device can provide the user interface for capturing and providing measurements to a polymer sheet supplier or intermediary.

The known distance i.e., the known radial offset that the arm 520 spaces the optical distance measuring device 502 from the origin 506 can be accounted for (e.g., via an edge profile determining device 1001 as disclosed herein) when determining the geometry of an installation area 90 or when determining the corners 94 of the installation area 90. A plurality of polar measurements corresponding to corners of a room can be received, each polar measurement of the plurality of polar measurements comprising a respective angle and a respective distance. A second plurality of polar measurements can be determined by adjusting the respective distances by the known radial offset. It is noted that the term "installation area" may be interchangeably referred to herein as room without departing from a broader scope of the present disclosure. However, a room is only a non-limiting example of the installation area.

Based on the coordinates (e.g., polar coordinates from measuring system 500) (or room geometry obtained from coordinates), a supplier or intermediary can either: a) cut a source polymer sheet product 1400 to form a custom polymer sheet product 101 having a perimeter comprising lines that extend between sequential polar measurements of the second plurality of polar measurements; or b) mark (e.g., by printing) a source polymer sheet product 1400 to show a perimeter comprising lines that extend between sequential polar measurements of the second plurality of polar measurements. Optionally, the supplier or intermediary can receive the coordinates of the corners of the room and determine the edge profile 100 of the custom polymer sheet product 101, as further disclosed herein. In further aspects, the supplier or intermediary can receive an edge profile 100 from another party that determined said edge profile 100 from the user-provided coordinates. For example, said another party can receive the coordinates; determine the edge profile 100; and then provide said edge profile 100 to the supplier or intermediary.

As stated herein, the plurality of polar measurements can be received by receiving a plurality of marked line segments 516 corresponding to respective angles relative to a reference line 514. Receiving the plurality of polar measurements can further comprise receiving a sequence of distance measurements (e.g., as a bubble sheet, spreadsheet, etc.) corresponding to the reference line 514 and sequential marked line segments 516 of the plurality of marked line segments about the origin 506.

In some aspects, the template 504 (e.g., the surface 510 and the arm 520) can be provided as a kit. In some aspects, the kit can further comprise the optical distance measuring device 502. In some optional aspects, the template 504 can be provided electronically (e.g., as an image or other suitable file type), and a user can print the template using a 3-D printer, on paper, cardboard, polymer, etc., and, optionally, cut out the arm 520. For example, the template 504 can be downloaded by the user from a website (e.g., the interface as described herein). In further aspects, the template 504 can be provided to the user in a tangible form.

It is noted that the system 10 may be configured to determine and generate the edge profiles 100, provide traces (markings/indicia 310) of the edge profile 100, and/or provide custom polymer sheet products 101 that are cut based on the edge profile 100, where the edge profile 100 may or may not include coving and flashing (extension up the wall). In one example, Wien the cove radius and flashing height are set or inputted as zero, the system 10 may generate an edge profile 100 without coving or flashing. That is, in said example, the edge profile 100 of the custom polymer sheet product 101 can be set to fit the floor and not extend up the walls.

While the present disclosure focuses on polymer sheet products, it is noted that the system 10 of the present disclosure is not limited to being used with polymer sheet products and is applicable to other types flooring surface covering products (e.g., LVT, LVP, carpet tiles, broadloom carpet, etc.) without departing from a broader scope of the present disclosure.

Figure 19:
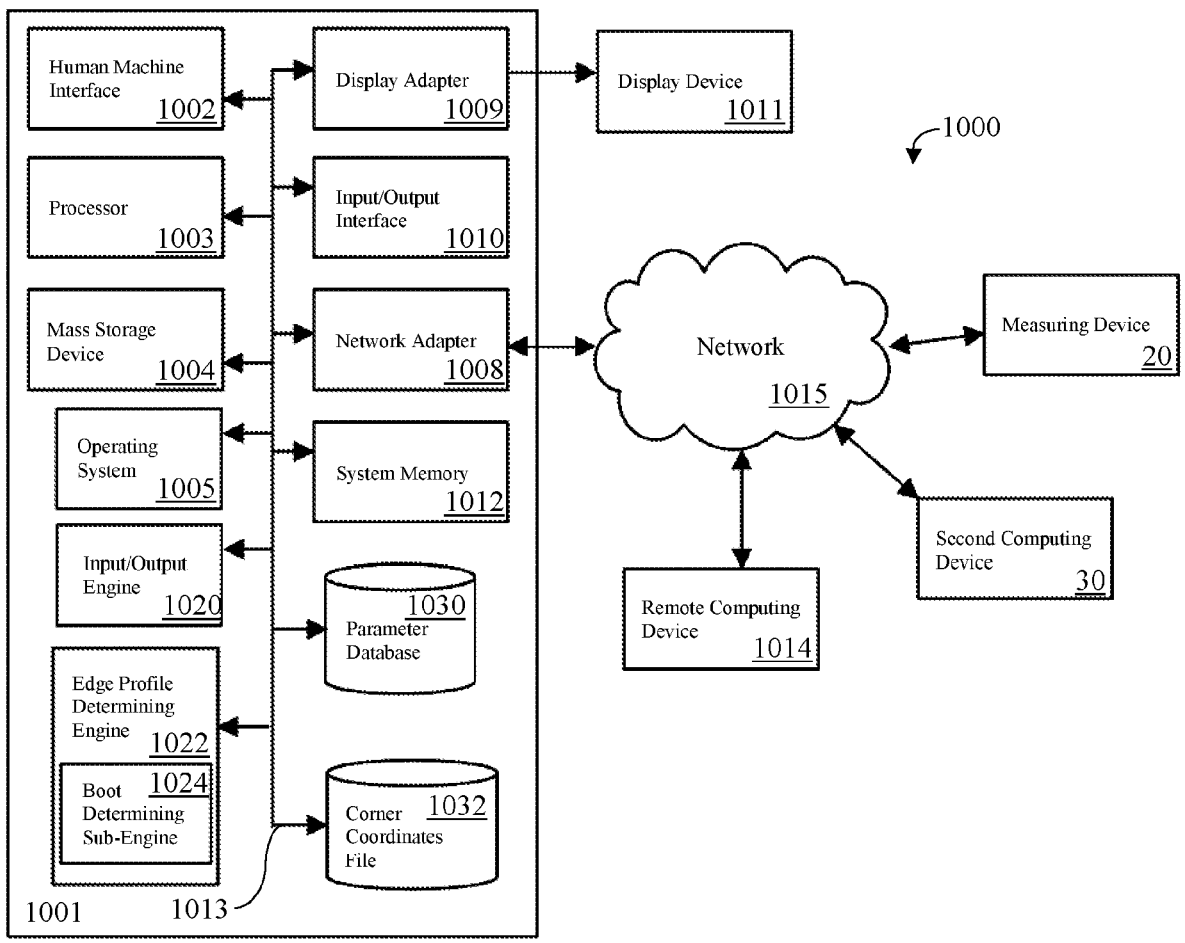
FIG. 19 shows a block diagram of an exemplary operating environment comprising an exemplary profile determination device for use with the exemplary systems as disclosed herein, in accordance with example embodiments of the present disclosure.

FIG. 19 shows an exemplary operating environment 1000 including an exemplary configuration of an exemplary edge profile determining device 1001 such as the edge profile determining server of system 10 (FIG. 1). The edge profile determining device 1001 (e.g., edge profile determining server) can be configured to receive data such as, but not limited to, the flashing height (e.g., the height that the custom polymer sheet product extends up the wall), the radius of the cove, ambient environment conditions at an installation site, etc. Such data can be provided as user input. The edge profile determining device 1001 can interface with the measuring device 20 as well as one or more second (e.g., remote) computing devices 30 that are associated with, for example, printers, plotters, marking devices, or cutting devices. Further, the edge profile determining device 1001 may be communicatively coupled to other computing devices such as remote computing device 1014.

The edge profile determining device 1001 may comprise one or more processors 1003, a system memory 1012, and a bus 1013 that couples various components of the edge profile determining device 1001 including the one or more processors 1003 to the system memory 1012. In the case of multiple processors 1003, the edge profile determining device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The edge profile determining device 1001 may operate on and/or comprise a variety of computer readable media (e.g., non-transitory). Computer readable media ma be any available media that is accessible by the edge profile determining device 1001 and comprises, non-transitory, volatile and/or non-volatile media, removable and non-removable media. The system memory 1012 has computer readable media in the form of volatile memory, such as random access memory (RAM), and/or non-volatile memory, such as, but not limited to read only memory (ROM). The system memory 1012 may store data such as coordinate data, line scans, geometry of an installation area 90 (e.g., data from signals received from the measuring device 20) and/or program modules that are accessible to and/or are operated on by the one or more processors 1003. Some of the above-mentioned data such as the coordinate data, line scans, geometry of the installation area, etc., may be stored in another data repository/database without departing from a broader scope of the present disclosure.

The edge profile determining device 1001 may also comprise other removable/non-removable, volatile/non-volatile computer storage media. The mass storage device 1004 may provide non-volatile storage of computer code, computer readable instructions, data structures, program modules, and other data for the edge profile determining device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system and edge profile determining software may be stored on the mass storage device 1004. One or more of the operating system 1005 and/or edge profile determining software (or some combination thereof) may comprise program modules and the edge profile determining software. The coordinate data may also be stored on the mass storage device 1004. The coordinate data may be stored in any of one or more databases known in the art. The databases may be centralized or distributed across multiple locations within the network 1015.

In some aspects, the edge profile determining device 1001 (server) may be a cloud-based or web-based server without departing from a broader scope of the present disclosure. In some aspects, the remote computing device 1014 may include an implementation of a client instance of the edge profile determining device 1001. As such, a user may interact with the edge profile determining device 1001 through the remote computing device 1014, e.g., the client instance implemented therein. In some aspects, the remote computing device 1014 may include processors, memory, display interfaces/devices, other output devices, sensors, features of the measuring device, etc., without departing from a broader scope of the present disclosure.

In some aspects, a user may enter commands and information into the edge profile determining device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the edge profile determining device 1001 may have more than one display adapter 1009 and the edge profile determining device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the edge profile determining device 1001 using Input/Output Interface 1010. Any step and/or result of the methods may be output (or caused to be output) in any form to an output device. In some aspects, any appropriate output from the edge profile determining device 1001 may be transmitted to the second computing device 30 and/or the remote computing device 1014 for presentation to a user via the client instance of the edge profile determining device 1001. Such output may be any form of visual representation, including, but not limited to, textual, graphical, animation, audio, tactile, and the like. The display device 1011 and edge profile determining device 1001 may be part of one device, or separate devices.

The edge profile determining device 1001 (e.g., edge profile determining server) may operate in a networked environment using logical connections to one or more remote computing devices, such as, for example, the measuring device 20, the second computing device 30, other data repositories (not shown), or other remote computing device 1014. The other remote computing device 1014 may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the edge profile determining device 1001 and the remote computing devices may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices can optionally have some or all of the components disclosed as being part of edge profile determining device 1001. In various further aspects, it is contemplated that some or all aspects of data processing described herein can be performed via cloud computing on one or more servers or other remote computing devices 1014. Accordingly, at least a portion of the system 1000 can be configured with internet connectivity.

Figure 23:
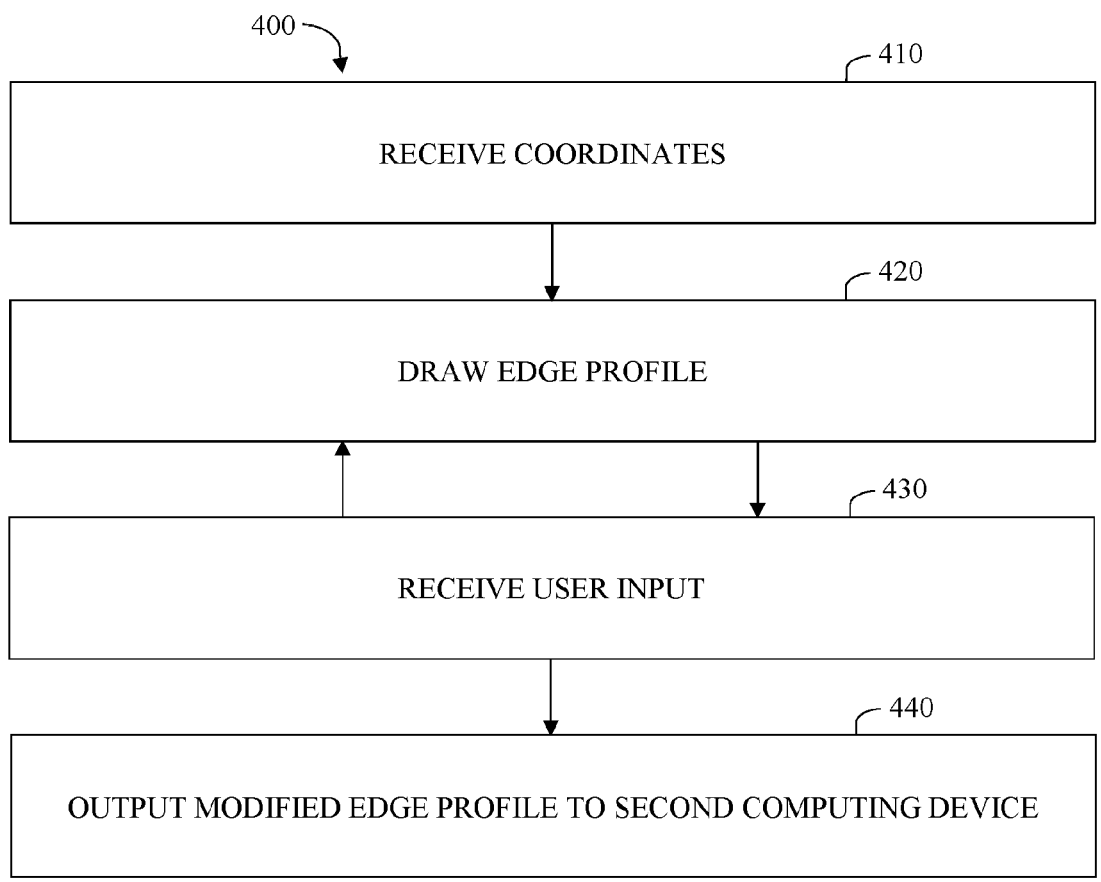
FIG. 23 shows a flowchart of an exemplary method performed by the exemplary edge profile determining device, in accordance with example embodiments of the present disclosure.

Referring also to FIG. 23, the edge profile determining device 1001 (e.g., edge profile determining server) can perform steps of a method 400 for determining and outputting an edge profile 100 of a custom polymer sheet product 101 configured for installation in an installation area 90 (or 2400 as shown in FIG. 24). It is noted that the installation areas (90 or 2400) shown herein as non-limiting examples.

Although specific operations are disclosed in the flowchart illustrated in FIG. 23, such operations are only non-limiting examples. That is, embodiments of the present invention are well suited to performing various other operations or variations of the operations recited in the flowcharts. It is appreciated that the operations in the flowchart illustrated in FIG. 23 may be performed in an order different than presented, and that not all operations in the flowchart may be performed. All, or a portion of, the embodiments or aspects described by the flowchart illustrated in FIG. 23 can be implemented using computer-readable and computer-executable instructions which reside, for example, in a memory of the edge profile determining device 1001 (or computing devices 1014). As described above, certain processes and operations of the present invention are realized, in on embodiment, as a series of instructions (e.g., software programs) that reside within computer readable memory of a computer system and are executed by the processor of the computer system. When executed, the instructions cause the computer system to implement the functionality of the present invention as described below (and also as described above) in association with FIG. 1-29.

In one example embodiment, in step 410, the edge profile determining device 1001 can receive corner coordinates from the measuring device 20 and store the corner coordinates in a corner coordinates file 1032 (data file). In some aspects, the corner coordinates may be received as user input based on the measuring system 500. The edge profile determining device 1001 can comprise an edge profile determining engine 1022 that determines an initial edge profile based on the coordinates received from the corner coordinates file 1032. The initial edge profile can include a pair of opposed portions 110 at each corner and line/linear segments 140. Determining the initial edge profile can include a step of determining a geometry of the installation area 90 (or 2400) based on the received corner coordinates by automatically arranging corners in a particular order (e.g., clockwise or counterclockwise). Then, the edge profile determining software can further use parameters from a parameter database 1030 to determine the initial edge profile. (Optionally, in some aspects, the initial edge profile can be determined only after the order of the corners of the room has been confirmed by a user, as further described herein.) The parameters from the parameter database 1030 can include, for example, flashing height and radius of the lower curved portion. Said parameters can be standardized for various environments and applications and are stored in the parameter database. In additional aspects, said parameters can be custom values provided by a user through a user interface or computing device as further disclosed herein. In some example embodiments, the edge profile determining device 1001 can receive the geometry of the installation area 90 (or 2400) from the measuring device 20 and determine the initial edge profile based on the received geometry, corner coordinates determined from the received geometry, and/or the parameters from the parameter database 1030.

Figure 25:
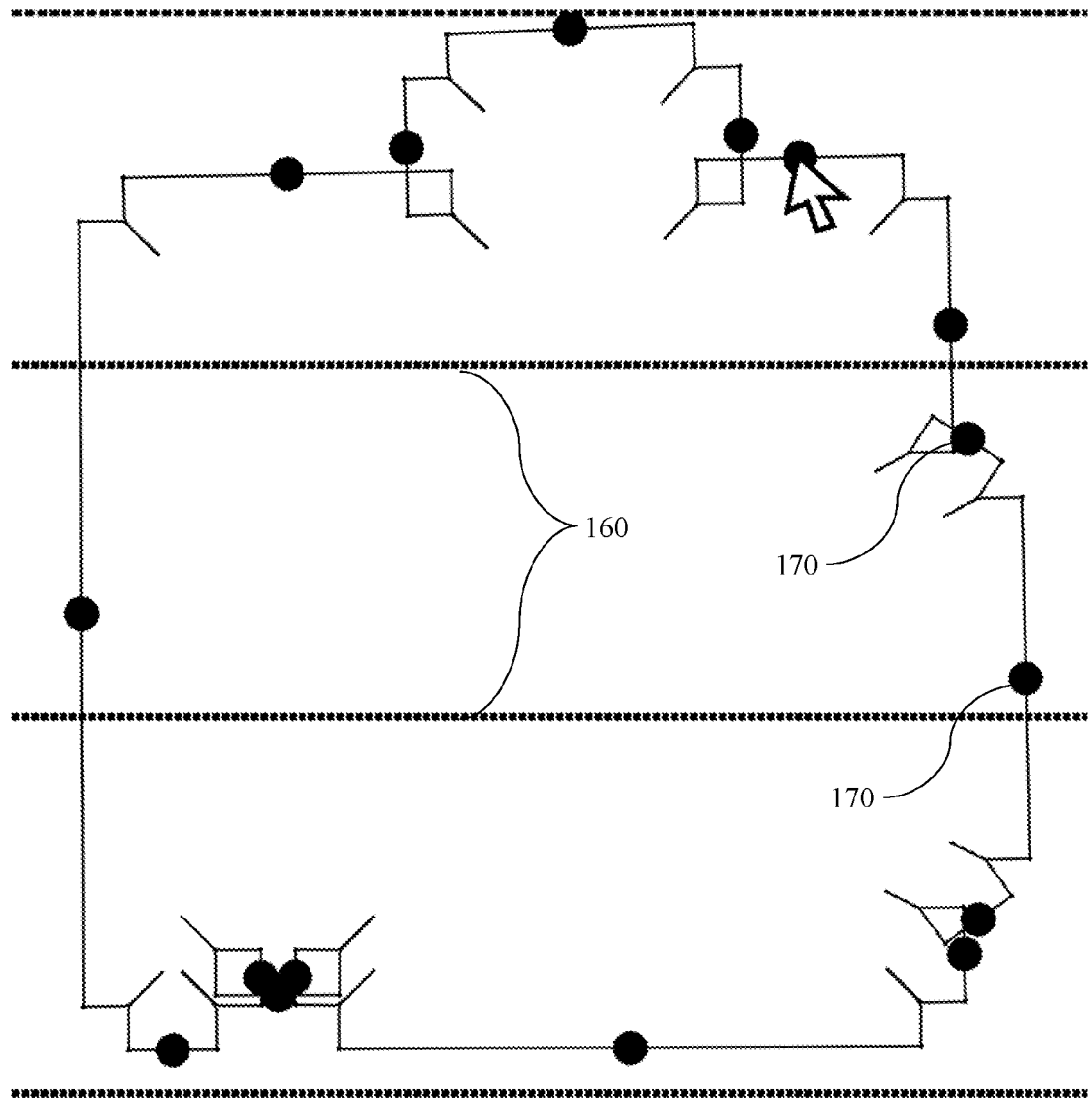
FIG. 25 shows an example output on the exemplary display in communication with the exemplary edge profile determining device, showing an edge profile drawn based on an order of the corners of the room shown in FIG. 24, in accordance with example embodiments of the present disclosure.
Figure 26:
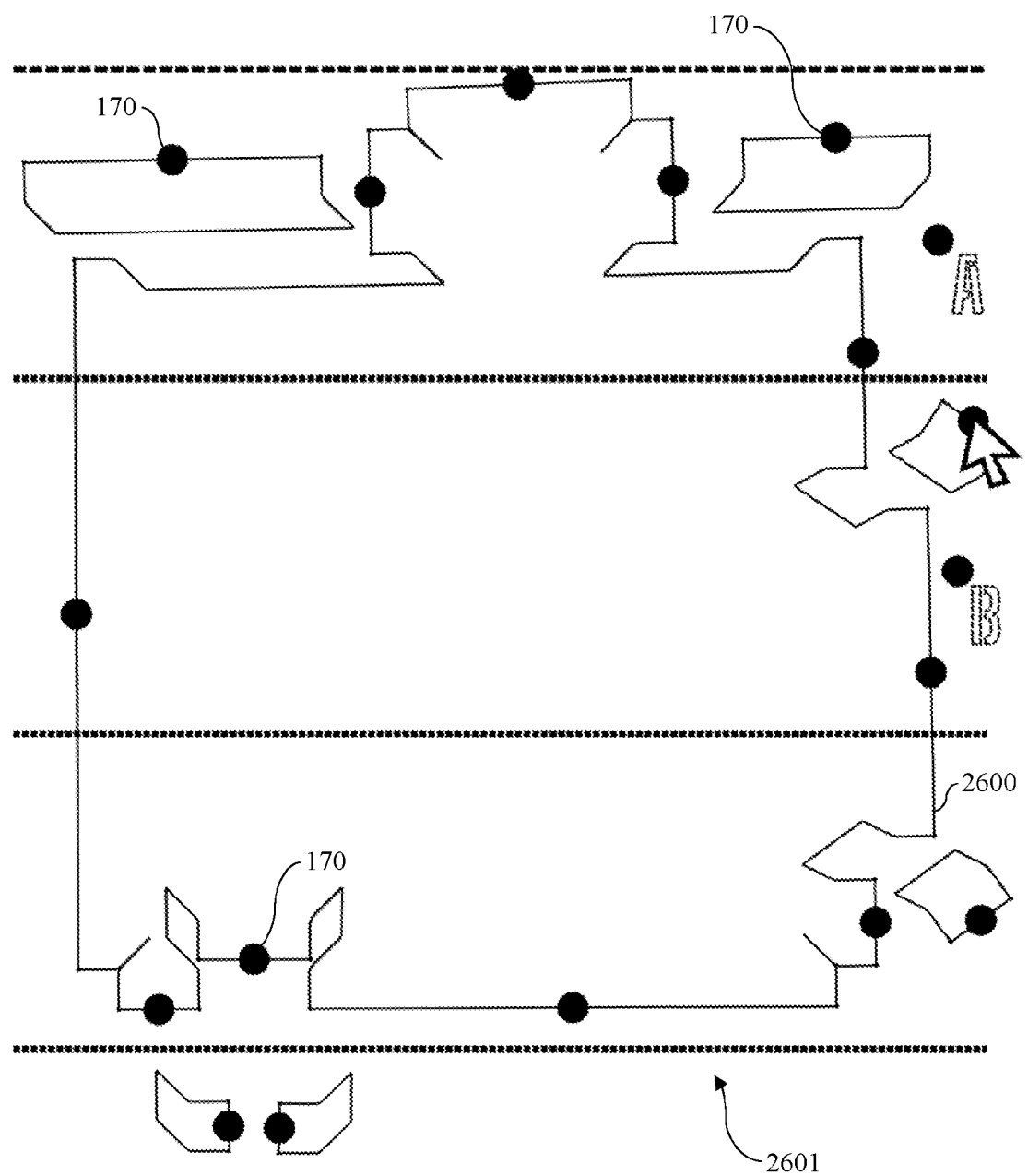
FIG. 26 shows an example output on the exemplary display in communication with the exemplary edge profile determining device, showing boot segments generated via a boot drawings sub-engine of an edge profile determining engine of the exemplary edge profile determining device, in accordance with example embodiments of the present disclosure.

From step 410, the method can proceed to step 420, where the edge profile determining device 1001 (e.g., edge profile determining server) receives user input. In exemplary aspects, the edge profile determining device 1001 can provide an input/output engine 1020 that comprises a graphical user interface (GUI) for receiving user input. In some examples, the input/output engine 1020 can provide one or more input boxes to receive parameters such as flashing height and radius of the lower curved portion from the user for storage and use in the parameter database. In further aspects, the input/output engine 1020 can display the edge profile on the display device 1011, and can permit manipulation of the displayed edge profile via the GUI. For example, the edge profile determining device 1001 can enable a user to modify the order in which adjacent corners are connected (from the initial particular order) in order to correct any errors prior to generating the edge profile 100 of the custom polymer sheet product 101. This can be performed, for example, by displaying a list of points corresponding to the corners, and permitting rearrangement of the points (e.g., by receiving input of a user clicking and dragging a particular point to a desired location in the list). FIG. 24 illustrates an initial order of corners of a room as automatically generated, and FIG. 25 illustrates an edge profile that has been generated based on the order of the corners in FIG. 24. In some examples, the order of the corners as automatically generated can be incorrect. Similarly, false corners (i.e., points of a room incorrectly identified as corners) can be deleted. As another example, the input/output engine 1020 can permit a user to click and drag on the displayed edge profile to manipulate boot segments, as further disclosed herein. In still further aspects, and as described herein in detail, a user interface can display seam line(s) 160 (FIG. 4) corresponding to material widths and can further permit movement of the seam lines 160 to avoid intersection of the seam lines 160 with complex geometry. In some aspects, the edge profile determining device 1001 may be configured to receive user input and/or send output to a client instance of the device 1001 in the remote computing device 1014.

In some optional aspects, after receiving each input via the input/output engine 1020 (or remote computing device 1014), in step 430, the method can proceed to step 420, where the edge profile 100 may be re-determined and re-drawn on a display device 1011 (or remote computing device 1014) for the user. If the corners and/or room geometry has not been modified, then the initial edge profile may not be changed or re-drawn. The input/output engine 1020 can transmit each input to the edge profile determining engine 1022. The edge profile determining engine 1022 can determine the opposed portions 110 as disclosed herein and then determine line segments 140 that connect between adjacent opposed portions 110 according to the order of the corners. The edge profile determining engine 1022 can transmit the determined edge profile 100 to the input/output engine 1020, and the input/output engine 1020 can display the determined edge profile 100 with or without the seam lines 160 corresponding to the linear intersections 302 for further manipulation or confirmation.

Referring to FIGS. 19, and 23-26, the edge profile determining device 1001 (e.g., edge profile determining server) can further comprise a boot determining sub-engine 1024 of the edge profile determining engine 1022. The boot determining sub-engine 1024 can identify boots as portions of the edge profile 100 that intersect, indicating geometry that cannot be provided by a single sheet of material. Referring also to FIGS. 10 and 11, the boot determining sub-engine 1024 can permit clicking and dragging to generate a boot profile and a remaining edge profile with the boot removed. For example, the edge input/output engine 1020 can generate a display of the edge profile 100 in FIG. 10 (or FIG. 25). The boot determining sub-engine 1024 can permit the user to select which portion of the edge profile is extracted to form the boot. For example, the boot determining sub-engine 1024 can provide a first tag to select a first overlapping segment corresponding to a first boot alternative and a second tag to select a second overlapping segment corresponding to a second boot alternative. The boot determining sub-engine 1024 can permit the user to click and drag the first or second tag and drop the boot in a desired location. The desired location can be away from the first segment 130 to prevent overlapping profiles.

Figure 27:
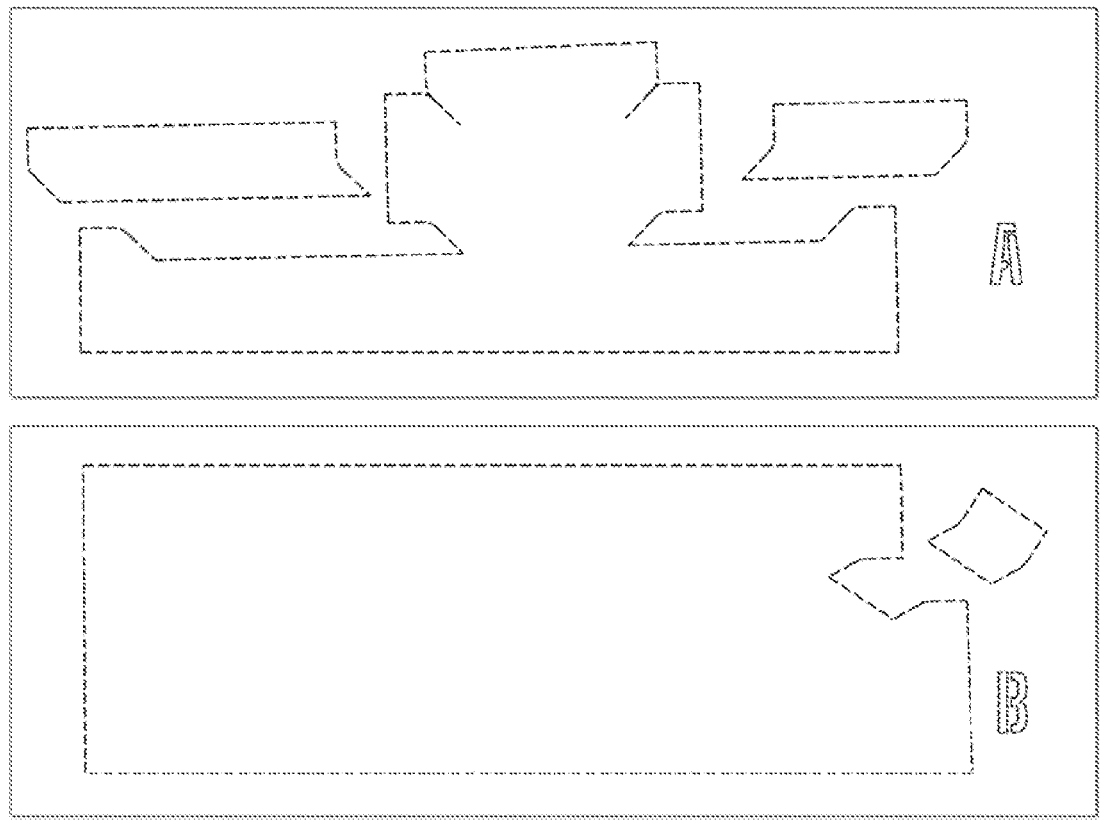
FIG. 27 shows a portion of an exemplary output provided by the exemplary edge profile determining device, in accordance with example embodiments of the present disclosure.

Referring to FIGS. 19, 23, and 27, once the user is satisfied with the edge profile 100, the method can proceed to step 440, where the edge profile determining device 1001 outputs the edge profile 100. For example, the edge profile determining device 1001 can output the edge profile 100 to the second computing device 30 via the network adapter 1008.

The second computing device 30 can be used to create a custom polymer sheet product 101 (or 2600 shown in FIG. 26) as disclosed herein. For example, the second computing device 30 receive the edge profile 100 (or 2600) as a file (e.g., a scalable vector file). In some aspects, the second computing device 30 of a printer can cause the printer to print a pattern of the edge profile on a source polymer sheet product 1400 for subsequent cutting. In other aspects, the second computing device 30 can control a CNC cutter to cut the custom polymer sheet product 101 (or 2601 shown in FIG. 26) from the source polymer sheet product 1400. Optionally, in these aspects, the source polymer sheet product 1400 can be cut in a perforated pattern, as shown in FIG. 27. In other aspects, the computing device 30 can be a computing device of an augmented reality device that can guide a user to cut the pattern.

Although the method 400 describes steps 410-440 as being performed by the edge profile determining device 1001 (e.g., edge profile determining server), it is contemplated that at least one step, or one or more portions of said steps, can be performed by the measurement device 20, the remote computing device 1014 or the second computing device 30. Further, the engines and sub-engines described herein may be hardware engines, software engines, or a combination of both hardware and software engines that are specially configured to determine, generate, and/or provide an edge profile (opposed portions and linear segments) for a custom decorative article such as a polymer sheet flooring article, flexible flooring article, semi-rigid flooring article, etc., as described herein.

It is noted that the system, method, and article of the present disclosure solves problems in existing decorative article solutions, the problems including, but not limited to, (a) installation that is time consuming and requires hiring of professionals, (b) poor seal at corners and thereby limiting ability to provide proper moisture-resistance or moisture barrier and a clean room environment, (c) inability to accommodate for structural imperfections (wall bowing, etc.), (d) effectively providing and installing the decorative article on complex structural elements (e.g., stairs), etc. Further, the system, method, and article of the present disclosure provides a practical solution in the field of decorative articles. The practical solution including, but not limited to, modifying existing decorative articles to provide a custom decorative article as described herein that enables easy, quick, and hassle-free installation of decorative articles by an end user with minimal imperfections, good moisture barrier seals, and without the need of professional expertise.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A method for determining an edge profile of a custom decorative article to be installed in an installation area within a room, wherein the installation area has a perimeter having a plurality of corners, the method comprising:
  receiving, by a computing device, data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area, wherein the second corner is positioned between the first and third coordinates along the perimeter of the installation area;
  determining, by the computing device, based on at least the first, second and third coordinates, dimensional and/or geometric characteristics of a pair of opposed portions of the edge profile that, in an installed position in the room, are configured to meet to form a corner of the custom decorative article when installed at the second corner of the perimeter of the installation area.

Aspect 2: The method of aspect 1, wherein the opposed portions of the pair of opposed portions of the edge profile each comprise an arcuate sub-portion and a straight sub-portion.

Aspect 3: The method of aspect 2, wherein the arcuate sub-portion corresponds to a trace of a portion of a sine curve.

Aspect 4: The method of aspect 3, wherein the arcuate sub-portion corresponds to a trace of a Bezier curve.

Aspect 5: The method of any one of aspects 2-4, wherein the pair of opposed portions of the edge profile cooperate to define a relief cut that extends from the arcuate sub-portions of the opposed portions of the pair of opposed portions of the edge profile opposite the straight sub-portions.

Aspect 6: The method of any one of the preceding aspects, wherein determining dimensional and/or geometric characteristics of the pair of opposed portions of the edge profile comprises:
  determining a first vector parallel to a line between the first and second coordinates;
  determining a second vector parallel to a line between the second and third coordinates; and
  determining an angle between the first and second vectors,
  wherein determining the dimensional and/or geometric characteristics of opposed portions of the edge profile comprises the dimensional and/or geometric characteristics of opposed portions of the edge profile based on the angle between the first and second vectors.

Aspect 7: The method of aspect 6, wherein the angle is an obtuse angle.

Aspect 8: The method of aspect 6, wherein the angle is an acute angle.

Aspect 9: The method of aspect 7 or aspect 8, wherein the pair of opposed portions of the edge profile each comprise an arcuate sub-portion and a straight sub-portion, the method further comprising scaling a trace of a Bezier curve that approximates a portion of a sine curve to define the arcuate sub-portions of the opposed portions of the pair of opposed portions of the edge profile.

Aspect 10: The method of aspect 6, wherein the angle is 90 degrees.

Aspect 11: The method of aspect 7 or aspect 9, wherein the angle is greater than 180 degrees, wherein the pair of opposed portions of the edge profile that are configured to meet to form a corner of the custom decorative article comprise a first opposed portion and a second opposed portion that are respectively provided on a first segment and a boot segment that cooperate to form the corner.

Aspect 12: The method of any one of the preceding aspects, further comprising.
  determining, by the computing device, based on at least the plurality of coordinates corresponding to the plurality of corners of the perimeter of the installation area, dimensional and/or geometric characteristics of respective pairs of opposed portions of the edge profile that, in an installed position in the room, are configured to meet to form respective corners of the custom decorative article when installed at each other corner of the perimeter of the installation area.

Aspect 13: The method of aspect 12, further comprising determining portions of the edge profile that, in an installed configuration of the custom decorative article, correspond to linear segments that extend between ends of the pair of opposed portions of the edge profile of sequential corners of the custom decorative article.

Aspect 14: The method of aspect 13, wherein the pair of opposed portions of the edge profile of each corner of the custom decorative article and the linear segments cooperate to define an entirety of the edge profile of the custom decorative article, the method further comprising:
  determining, based on the plurality of coordinates corresponding to corners of the perimeter of the installation area, that sheet material having a stock roll width cannot provide sufficient material to form the entirety of the edge profile of the custom decorative article; and
  dividing the edge profile of the custom decorative article into at least a first custom decorative article segment and a second custom decorative article segment, wherein the first and second custom decorative article segments meet at a linear intersection and define respective portions of the edge profile of the custom decorative article.

Aspect 15: The method of aspect 14, wherein the linear intersection terminates at an adjoining end of opposed portions of the edge profile that are configured to meet to form a corner of the custom decorative article.

Aspect 16: The method of any one of aspects 2-16, further comprising accounting for a material thickness to determine a profile of the arcuate sub-portion of the opposed portions of the pair of opposed portions of the edge profile.

Aspect 17: The method of any one of the preceding aspects, further comprising:
  determining a plurality of miter vectors corresponding to respective corners of the perimeter of the installation area, wherein each miter vector of the plurality of miter vectors has an angle that bisects the pair of opposed portions of the edge profile, wherein determining the dimensional and/or geometric characteristics of opposed portions of the edge profile comprises mirroring respective traces across a respective miter vector of the plurality of vectors to define the pair of opposed portions of the edge profile.

Aspect 18: A method comprising:
  determining an edge profile of a custom decorative article to fit in a room according to any one of the preceding aspects; and
  cutting polymer sheet with the determined edge profile.

Aspect 19: A method comprising:
  determining an edge profile of a custom decorative article to fit in a room according to any one of aspects 1-17; and
  providing the edge profile to a cutting facility.

Aspect 20: A method comprising:
  determining an edge profile of a custom decorative article to fit in a room according to any one of aspects 1-17; and
  providing the edge profile to a facility for printing the pattern on the custom decorative article.

Aspect 21: A method comprising:
  receiving an edge profile of a custom decorative article to fit in a room according to any one of aspects 1-17; and
  cutting polymer sheet with the determined edge profile.

Aspect 22: An apparatus for determining an edge profile of a custom decorative article to be installed in an installation area within a room, wherein the installation area has a perimeter having a plurality of corners, the apparatus comprising:
  a computing device comprising at least one processor and a memory in communication with the at least one processor, wherein the memory comprises instructions that, when executed by the at least one processor, cause the at least one processor to:
    receive data indicative of a plurality of coordinates corresponding to the plurality of corners of the perimeter of the installation area, the plurality of coordinates comprising at least first, second, and third coordinates respectively corresponding to first, second, and third corners of the plurality of corners of the perimeter of the installation area, wherein the second corner is positioned between the first and third coordinates along the perimeter of the installation area;
    determine, based on at least the first, second and third coordinates, dimensional and/or geometric characteristics of a pair of opposed portions of the edge profile that, in an installed position in the room, are configured to meet to form a corner of the custom decorative article when installed at the second corner of the perimeter of the installation area; and
    output the edge profile to a second computing device.

Aspect 23: The apparatus of aspect 22, wherein the second computing device is associated with a printer that is configured to print the edge profile of the custom decorative article.

Aspect 24: The apparatus of aspect 22, wherein the second computing device is associated with a computer numerical controlled (CNC) cutting device.

Aspect 25: The apparatus of aspect 24, wherein the CNC cutting device is a laser cutter or an ultrasonic cutter.

Aspect 26: The apparatus of aspect 22, wherein the second computing device is associated with an augmented reality router.

Aspect 27: The apparatus of any one of aspects 22-26, wherein the opposed portions of the pair of opposed portions of the edge profile each comprise an arcuate sub-portion and a straight sub-portion.

Aspect 28: The apparatus of aspect 27, wherein the arcuate sub-portion corresponds to a trace of a portion of a sine curve.

Aspect 29: The apparatus of aspect 28, wherein the arcuate sub-portion corresponds to a trace of a Bezier curve.

Aspect 30: The apparatus of any one of aspects 27-29, wherein the pair of opposed portions of the edge profile cooperate to define a relief cut that extends from the arcuate sub-portions of the opposed portions of the pair of opposed portions of the edge profile opposite the straight sub-portions.

Aspect 31: The apparatus of any one of aspects 22-29, wherein the at least one processor is configured to determine the dimensional and/or geometric characteristics of the pair of opposed portions of the edge profile by:
  determining a first vector parallel to a line between the first and second coordinates;
  determining a second vector parallel to a line between the second and third coordinates; and
  determining an angle between the first and second vectors,
  wherein determining the dimensional and/or geometric characteristics of opposed portions of the edge profile comprises the dimensional and/or geometric characteristics of opposed portions of the edge profile based on the angle between the first and second vectors.

Aspect 32: The apparatus of aspect 31, wherein the angle is an obtuse angle.

Aspect 33: The apparatus of aspect 31, wherein the angle is an acute angle.

Aspect 34: The apparatus of aspect 32 or aspect 33, wherein the pair of opposed portions of the edge profile each comprise an arcuate sub-portion and a straight sub-portion, the method further comprising scaling a trace of a Bezier curve that approximates a portion of a sine curve to define the arcuate sub-portions of the opposed portions of the pair of opposed portions of the edge profile.

Aspect 35: The apparatus of aspect 31, wherein the angle is 90 degrees.

Aspect 36: The apparatus of aspect 32 or aspect 34, wherein the angle is greater than 180 degrees, wherein the pair of opposed portions of the edge profile that are configured to meet to form a corner of the custom decorative article comprise a first opposed portion and a second opposed portion that are respectively provided on a first segment and a boot segment that cooperate to form the corner.

Aspect 37: The apparatus of any one of aspects 22-36, wherein the memory comprises instructions that, when executed by the at least one processor, cause the at least one processor to:

determine, by the computing device, based on at least the plurality of coordinates corresponding to the plurality of corners of the perimeter of the installation area, dimensional and/or geometric characteristics of respective pairs of opposed portions of the edge profile that, in an installed position in the room, are configured to meet to form respective corners of the custom decorative article when installed at each other corner of the perimeter of the installation area.

Aspect 38: The apparatus of aspect 37, wherein the memory comprises instructions that, when executed by the at least one processor, cause the at least one processor to determine portions of the edge profile that, in an installed configuration of the custom decorative article, correspond to linear segments that extend between ends of adjacent pairs of opposed portions of the edge profile of sequential corners of the custom decorative article.

Aspect 39: The apparatus of aspect 38, wherein the pair of opposed portions of the edge profile of each corner of the custom decorative article and the linear segments cooperate to define an entirety of the edge profile of the custom decorative article, wherein the memory comprises instructions that, when executed by the at least one processor, causes the at least one processor to:
 determine, based on the plurality of coordinates corresponding to corners of the perimeter of the installation area, that sheet material having a stock roll width cannot provide sufficient material to form the entirety of the edge profile of the custom decorative article; and
 divide the edge profile of the custom decorative article into at least a first custom decorative article segment and a second custom decorative article segment, wherein the first and second custom decorative article segments meet at a linear intersection and define respective portions of the edge profile of the custom decorative article.

Aspect 40: The apparatus of aspect 39, wherein the linear intersection terminates at an adjoining end of opposed portions of the edge profile that are configured to meet to form a corner of the custom decorative article.

Aspect 41: The apparatus of any one of aspects 23-40, wherein the memory comprises instructions that, when executed by the at least one processor, cause the at least one processor to account for a material thickness to determine a profile of the arcuate sub-portion of the opposed portions of the pair of opposed portions of the edge profile.

Aspect 42: The apparatus of any one of aspects 23-41, wherein the memory comprises instructions that, when executed by the at least one processor, cause the at least one processor to:
 determine a plurality of miter vectors corresponding to respective corners of the perimeter of the installation area, wherein each miter vector of the plurality of miter vectors has an angle that bisects the pair of opposed portions of the edge profile, wherein determining the dimensional and/or geometric characteristics of opposed portions of the edge profile comprises mirroring respective traces across a respective miter vector of the plurality of vectors to define the pair of opposed portions of the edge profile.

Aspect 43: A system comprising:
 an apparatus as in any one of aspects 22-42; and
 a scanner that is configured to obtain geometry of a room, wherein the scanner is in communication with the computing device, wherein the scanner is configured to provide the data indicative of the plurality of coordinates corresponding to the plurality of corners of the perimeter of the installation area to the computing device.

Aspect 44: The system of aspect 43, further comprising the second computing device.

Aspect 45: A system for determining an edge profile for polymer sheet, the system comprising:
 an optical distance measuring device; and
 a template that orients the optical distance measuring device relative to an origin, wherein the template comprises:
  a surface having indicia that marks the origin; and
  an arm having a first point that is configured to be positioned at the origin, wherein the optical distance measuring device is coupled to the arm, wherein the arm is configured to angularly orient the optical distance measuring device relative to the origin and radially offset the optical distance measuring device relative to the origin by a known distance.

Aspect 46: A method of using the system of aspect 45, the method comprising:
 coupling the optical distance measuring device to the arm;
 orienting the arm relative to the origin and a reference line of the surface marking the origin so that the optical distance measuring device is aimed at a first corner of a room; and
 with the optical distance measuring device aimed at the first corner of the room, obtaining a first distance measurement; and
 for each additional corner of the room:
  orienting the arm relative to the origin of the surface having indicia that marks the origin so that the optical distance measuring device is aimed at the respective additional corner of a room,
  marking a respective angle of the arm on the surface having indicia that marks the origin, and
  obtaining a respective distance measurement.

Aspect 47: The method of aspect 46, further comprising determining an edge profile based on the distance measurements, wherein the edge profile comprises line segments extending between sequential points of the first corner and each additional corner of the room.

Aspect 48: A method comprising:
 receiving a plurality of polar measurements corresponding to corners of a room, each polar measurement of the plurality of polar measurements comprising a respective angle and a respective distance;
 determining a second plurality of polar measurements by adjusting the respective distances by a known radial offset;
 cutting a polymer sheet to form a custom decorative article having a perimeter comprising lines that extend between sequential polar measurements of the second plurality of polar measurements.

Aspect 49: A method comprising:
 receiving a plurality of polar measurements corresponding to corners of a room, each polar measurement of the plurality of polar measurements comprising a respective angle and a respective distance;
 determining a second plurality of polar measurements by adjusting the respective distances by a known radial offset;
 marking a polymer sheet to show a perimeter comprising lines that extend between sequential polar measurements of the second plurality of polar measurements.

Aspect 50: The method of aspect 48 or aspect 49, wherein receiving the plurality of polar measurements comprises receiving a plurality of marked line segments corresponding to respective angles relative to a reference line.

Aspect 51: The method of aspect 50, wherein receiving the plurality of polar measurements comprises receiving a sequence of distance measurements corresponding to the reference line and sequential marked line segments of the plurality of marked line segments about the origin.

Aspect 52: A kit comprising:
a template that orients an optical distance measuring device relative to an origin, wherein the template comprises:
  a surface having indicia that marks the origin; and
  an arm having a first point that is configured to be positioned at the origin, wherein the arm is configured to couple to the optical distance measuring device, wherein the arm is configured to angularly orient the optical distance measuring device relative to the origin and radially offset the optical distance measuring device relative to the origin by a known distance.

Aspect 53: The kit of aspect 52, further comprising a sheet for receiving distance measurements obtained by the optical distance measuring device in a machine-readable format.

Aspect 54: The kit of aspect 52, wherein the arm provides an outline indicating a location for coupling the optical distance measuring device.

Aspect 55: A custom decorative article comprising:
a body having an edge profile that defines a custom pattern configured to fit in an installation area,
wherein the edge profile of the body comprises at least one pair of opposed portions that are configured to be joined together to form a corner comprising a cove and a flashing, wherein each opposed portion of a respective one of the at least one pair of opposed portions of the edge profile has a first end at which the opposed portions of the respective pair of opposed portions meet and an opposed second end, wherein the opposed second ends of each opposed portion of the respective pair of opposed portions are connected by other portions of the edge profile that do not comprise the respective pair of opposed portions, the other portions of the edge profile comprising at least one of:
  at least one linear segment; or
  at least one other opposed portion of the at least one pair of opposed portions.

Aspect 56: The custom decorative article of aspect 55, wherein the cove has a constant radius.

Aspect 57: The custom decorative article of aspect 55 or aspect 56, wherein the body comprises a polymer sheet.

Aspect 58: The custom decorative article of any one of aspects 55-57, wherein the opposed portions of each respective pair of the at least one pair of opposed portions of the edge profile each comprise an arcuate sub-portion and a straight sub-portion, wherein the arcuate sub-portion is a scaled trace of a Bezier curve that approximates a portion of a sine curve to define the arcuate sub-portions of the respective pair of opposed portions of the edge profile.

Aspect 59: The custom decorative article of any one of aspects 55-57, wherein the opposed portions of each respective pair of the at least one pair of opposed portions of the edge profile cooperate to define a relief cut that extends from the arcuate sub-portions of the respective pair of opposed portions of the edge profile opposite the straight sub-portions of the respective pair of opposed portions of the edge profile.

Aspect 60: The custom decorative article any one of aspects 55-59, wherein the custom decorative article comprises a plurality of custom decorative article segments that are configured to couple together to form the custom pattern configured to fit in the installation area, wherein the body is a first custom decorative article segment of the plurality of custom decorative article segments.

Aspect 61: The custom decorative article of any one of aspects 55-60, wherein the body comprises a first segment and a separate boot segment, wherein the first segment defines a first portion of a first pair of the at least one pair of opposed portions of the edge profile, and wherein the boot segment defines a second portion of the first pair of opposed portions of the edge profile.

Aspect 62: The custom decorative article of any one of aspects 55-61, wherein the at least one pair of opposed portions comprises a plurality of pairs of opposed portions of the edge profile, wherein a linear segment of the at least one linear segment extends between two adjacent pairs of the plurality of pairs of opposed portions of the edge profile.

Aspect 63: The custom decorative article of aspect 62, wherein the edge profile comprises the plurality of pairs of opposed portions and a respective linear segment of the at least one linear segment that extends between each adjacent pair of the plurality of pairs of opposed portions of the edge profile.

Aspect 64: A custom decorative article comprising:
a sheet; and
at least one marking on the sheet, the at least one marking defining a custom pattern of an edge profile configured to fit in an installation area, wherein the edge profile comprises at least one pair of opposed portions that are configured to be joined together to form a corner comprising a cove and a flashing.

Aspect 65: The custom decorative article of aspect 64, wherein the cove has a constant radius.

Aspect 66: The custom decorative article of aspect 64 or aspect 65, wherein the sheet comprises a polymer sheet.

Aspect 67: The custom decorative article of any one of aspects 64-66, wherein the opposed portions of each respective pair of the at least one pair of opposed portions of the edge profile each comprise an arcuate sub-portion and a straight sub-portion, wherein the arcuate sub-portion is a scaled trace of a Bezier curve that approximates a portion of a sine curve to define the arcuate sub-portions of the opposed portions of the respective pair of the at least one pair of opposed portions of the edge profile.

Aspect 68: The custom decorative article of aspect 67, wherein the opposed portions of each respective pair of the at least one pair of opposed portions of the edge profile cooperate to define a relief cut that extends from the arcuate sub-portions of the respective pair of the at least one pair of opposed portions of the edge profile opposite the straight sub-portions of the respective pair of the at least one pair of opposed portions of the edge profile.

Aspect 69: The custom decorative article of any one of aspects 64-68, wherein the at least one marking on the sheet comprises a marking for a plurality of segments that are configured to couple together to form the custom pattern configured to fit in the installation area.

Aspect 70: The custom decorative article of any one of aspects 64-69, wherein the at least one marking is printed on the sheet.

Aspect 71: The custom decorative article of any one of aspects 64-69, wherein the at least one marking comprises a cut formed into the sheet.

Aspect 72: The custom decorative article of any one of aspects 64-69, wherein the at least one marking is printed on a material that is overlaid on the sheet.

Aspect 73: The custom decorative article of any one of aspects 55-72, wherein the edge profile is determined by a computing device based on a plurality of coordinates corresponding to a perimeter of the installation area.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A custom decorative article comprising:
   a body having an edge profile that defines a custom pattern configured to fit in an installation area,
   wherein the edge profile of the body comprises at least one pair of opposed portions that are configured to be joined together to form a corner comprising a cove and a flashing, wherein each opposed portion of a respective one of the at least one pair of opposed portions of the edge profile has a first end at which the opposed portions of the respective pair of opposed portions meet and an opposed second end, wherein the opposed second ends of each opposed portion of the respective pair of opposed portions are connected by other portions of the edge profile that do not comprise the respective pair of opposed portions, the other portions of the edge profile comprising at least one of:
   at least one linear segment; or
   at least one other opposed portion of the at least one pair of opposed portions,
   wherein the opposed portions of each respective pair of the at least one pair of opposed portions of the edge profile each comprise an arcuate sub-portion and a straight sub-portion, wherein the arcuate sub-portion is a scaled trace of a Bezier curve that approximates a portion of a sine curve to define the arcuate sub-portions of the respective pair of opposed portions of the edge profile,
   wherein the opposed portions of each respective pair of the at least one pair of opposed portions of the edge profile cooperate to define a relief cut that extends from the arcuate sub-portions of the respective pair of opposed portions of the edge profile opposite the straight sub-portions of the respective pair of opposed portions of the edge profile.

2. The custom decorative article of claim 1, wherein the cove has a constant radius.

3. The custom decorative article of claim 1, wherein the body comprises a polymer sheet.

4. The custom decorative article of claim 1, wherein the custom decorative article comprises a plurality of custom decorative article segments that are configured to couple together to form the custom pattern configured to fit in the installation area, wherein the body is a first custom decorative article segment of the plurality of custom decorative article segments.

5. The custom decorative article of claim 1, wherein the body comprises a first segment and a separate boot segment, wherein the first segment defines a first portion of a first pair of the at least one pair of opposed portions of the edge profile, and wherein the boot segment defines a second portion of the first pair of opposed portions of the edge profile.

6. The custom decorative article of claim 1, wherein the at least one pair of opposed portions comprises a plurality of pairs of opposed portions of the edge profile, wherein a linear segment of the at least one linear segment extends between two adjacent pairs of the plurality of pairs of opposed portions of the edge profile.

7. The custom decorative article of claim 6, wherein the edge profile comprises the plurality of pairs of opposed portions and a respective linear segment of the at least one linear segment that extends between each adjacent pair of the plurality of pairs of opposed portions of the edge profile.

* * * * *